US012118603B2

(12) United States Patent
Angeli et al.

(10) Patent No.: US 12,118,603 B2
(45) Date of Patent: Oct. 15, 2024

(54) CUSTOMIZED E-COMMERCE TAGS IN REALTIME MULTIMEDIA CONTENT

(71) Applicant: Block, Inc., San Francisco, CA (US)

(72) Inventors: Gabor Angeli, Redwood City, CA (US); Marsal Gavalda, Sandy Springs, GA (US); James Webb, San Francisco, CA (US)

(73) Assignee: Block, Inc., Oakland, CA (US)

( * ) Notice: Subject to any disclaimer, the term of this patent is extended or adjusted under 35 U.S.C. 154(b) by 30 days.

(21) Appl. No.: 17/873,603

(22) Filed: Jul. 26, 2022

(65) Prior Publication Data
US 2023/0020632 A1 Jan. 19, 2023

Related U.S. Application Data

(63) Continuation of application No. 17/014,250, filed on Sep. 8, 2020, now Pat. No. 11,403,692.

(51) Int. Cl.
*G06Q 30/00* (2023.01)
*G06F 3/0481* (2022.01)
(Continued)

(52) U.S. Cl.
CPC ....... *G06Q 30/0631* (2013.01); *G06F 3/0481* (2013.01); *G06Q 10/087* (2013.01);
(Continued)

(58) Field of Classification Search
CPC .................. G06F 3/167; G06F 3/0481; G06Q 30/0631; G06Q 10/087; G06Q 30/0257;
(Continued)

(56) References Cited

U.S. PATENT DOCUMENTS 9,505,554 B1   11/2016   Kong et al.
9,589,535 B2    3/2017   Poon et al.
(Continued)

FOREIGN PATENT DOCUMENTS

| JP | 2019-113894 A | 7/2019 |
| WO | 2019/171128 A1 | 9/2019 |
| WO | 2022/055723 A1 | 3/2022 |

OTHER PUBLICATIONS

P. Angotra, A. Kuwadekar and K. Al-Begain, "Media Share—An IPTV Service Development, Deployment and Delivery Platform," 2010 Fourth International Conference on Next Generation Mobile Applications, Services and Technologies, Amman, Jordan, 2010, pp. 30-33, doi: 10.1109/NGMAST.2010.18. (Year: 2010).*

(Continued)

*Primary Examiner* — Sun M Li
(74) *Attorney, Agent, or Firm* — Lee & Hayes, P.C.

(57) ABSTRACT

Techniques described herein are directed to receiving audio input during playback of multimedia content to trigger purchase and payment for an item represented in the multimedia content. In an example, multimedia content is sent to a user device. The multimedia content may contain a representation of an item and an indication that the item can be purchased. Based on receipt of an indication that trigger words were spoken during playback, a recording is initiated. A purchase intent of the user for the item is determined based on the recording. A graphical user interface is displayed via the user device to initiate payment by the user for the item.

20 Claims, 14 Drawing Sheets

(51) Int. Cl.
  *G06Q 10/087* (2023.01)
  *G06Q 30/0251* (2023.01)
  *G06Q 30/0272* (2023.01)
  *G06Q 30/0601* (2023.01)

(52) U.S. Cl.
  CPC ..... *G06Q 30/0257* (2013.01); *G06Q 30/0269* (2013.01); *G06Q 30/0272* (2013.01); *G06Q 30/0633* (2013.01); *G06Q 30/0641* (2013.01)

(58) Field of Classification Search
  CPC ........... G06Q 30/0269; G06Q 30/0272; G06Q 30/0633; G06Q 30/0641
  See application file for complete search history.

(56) References Cited

U.S. PATENT DOCUMENTS

| | | | |
|---|---|---|---|
| 9,614,894 | B1 | 4/2017 | Tripathy et al. |
| 10,803,486 | B1* | 10/2020 | Dalen ................. G06Q 30/0255 |
| 11,051,067 | B1* | 6/2021 | Baxter ............... H04N 21/8545 |
| 11,301,916 | B1* | 4/2022 | Hayes ..................... H04L 51/02 |
| 11,494,824 | B2* | 11/2022 | Buzzell .............. G06Q 30/0641 |
| 2004/0075670 | A1 | 4/2004 | Bezine et al. |
| 2008/0195664 | A1 | 8/2008 | Maharajh et al. |
| 2009/0048860 | A1 | 2/2009 | Brotman et al. |
| 2009/0265740 | A1 | 10/2009 | Mullen |
| 2009/0276305 | A1 | 11/2009 | Clopp |
| 2009/0292599 | A1 | 11/2009 | Rampell et al. |
| 2010/0070529 | A1 | 3/2010 | Gokturk et al. |
| 2010/0259559 | A1 | 10/2010 | Schneider |
| 2011/0137753 | A1 | 6/2011 | Moehrle |
| 2012/0078899 | A1* | 3/2012 | Fontana ................. G06F 16/739 707/E17.014 |
| 2012/0102993 | A1 | 5/2012 | Hortin |
| 2012/0166960 | A1 | 6/2012 | Salles |
| 2013/0080242 | A1 | 3/2013 | Alhadeff et al. |
| 2013/0174007 | A1 | 7/2013 | Demarco et al. |
| 2013/0246183 | A1 | 9/2013 | Ramer et al. |
| 2014/0074629 | A1 | 3/2014 | Rathod |
| 2014/0087700 | A1 | 3/2014 | Gudlavenkatasiva et al. |
| 2014/0178029 | A1 | 6/2014 | Raheman et al. |
| 2014/0258029 | A1* | 9/2014 | Thierry ............... G06Q 30/0643 705/26.8 |
| 2015/0379606 | A1* | 12/2015 | Vaidyanathan ....... G06F 16/955 705/26.62 |
| 2016/0048831 | A1 | 2/2016 | Ongchin |
| 2016/0071194 | A1 | 3/2016 | Proulx |
| 2016/0077677 | A1 | 3/2016 | Valdes |
| 2016/0086257 | A1 | 3/2016 | Collins et al. |
| 2016/0103606 | A1 | 4/2016 | Huang et al. |
| 2016/0139775 | A1* | 5/2016 | Segal .................... G06F 3/0488 715/716 |
| 2016/0164958 | A1 | 6/2016 | Sharan |
| 2017/0178223 | A1 | 6/2017 | Ranasinghe et al. |
| 2018/0053253 | A1 | 2/2018 | Gokhale et al. |
| 2019/0297390 | A1 | 9/2019 | Grusd |
| 2019/0340700 | A1 | 11/2019 | Haas et al. |
| 2020/0026805 | A1 | 1/2020 | Dasgupta et al. |
| 2020/0065607 | A1 | 2/2020 | Jouhikainen et al. |
| 2020/0211051 | A1 | 7/2020 | Pillemer et al. |
| 2020/0213478 | A1* | 7/2020 | Beckett, III .......... G06F 40/279 |
| 2021/0201380 | A1* | 7/2021 | Belcher .............. G06Q 30/0631 |
| 2021/0295046 | A1 | 9/2021 | Gupta |
| 2022/0070514 | A1 | 3/2022 | Li |
| 2022/0076315 | A1 | 3/2022 | Angeli et al. |
| 2022/0076323 | A1 | 3/2022 | Angeli et al. |
| 2022/0414743 | A1 | 12/2022 | Angeli et al. |

OTHER PUBLICATIONS

A. Kraft, S. Pitsch and M. Vetter, "Agent-driven online business in virtual communities," Proceedings of the 33rd Annual Hawaii International Conference on System Sciences, Maui, HI, USA, 2000, pp. 10 pp. vol. 2—, doi: 10.1109/HICSS.2000.926995. (Year: 2000).*
Chung-Sheng Li, "Media commerce," in IEEE Circuits and Systems Magazine, vol. 2, No. 1, pp. 4-22, 2002, doi: 10.1109/MCAS.2002.999700. (Year: 2002).*
K. Koumpis and S. Renals, "Content-based access to spoken audio," in IEEE Signal Processing Magazine, vol. 22, No. 5, pp. 61-69, Sep. 2005, doi: 10.1109/MSP.2005.1511824. (Year: 2005).*
R. V. Cox, B. G. Haskell, Y. LeCun, B. Shahraray and L. Rabiner, "On the applications of multimedia processing to communications," in Proceedings of the IEEE, vol. 86, No. 5, pp. 755-824, May 1998, doi: 10.1109/5.664272. (Year: 1998).*
K. Koumpis and S. Renals, "Content-based access to spoken audio," in IEEE Signal Processing Magazine, vol. 22, No. 5, pp. 61-69, Sep. 2005, doi: 10.1109/MSP.2005.1511824. (Year: 2005) (Year: 2005).*
S. Sun, W. Zhou, Q. Tian, M. Yang and H. Li, "Assessing Image Retrieval Quality at the First Glance," in IEEE Transactions on Image Processing, vol. 27, No. 12, pp. 6124-6134, Dec. 2018, doi: 10.1109/TIP.2018.2864919. (Year: 2018) (Year: 2018).*
Goergen et al., "A Session Model for Cross-Domain Interactive Multi-User IPTV," 2010 7th IEEE Consumer Communications and Networking Conference, 2010, pp. 1-6, DOI: 10.1109/CCNC.2010.5421792. (Year: 2010).
R. Kernchen et al., "Intelligent Multimedia Presentation in Ubiquitous Multidevice Scenarios," in IEEE Multi Media, vol. 17, No. 2, pp. 52-63, Apr.-Jun. 2010, DOI: 10.1109/MMUL.2009.75. (Year: 2010).
S. Sun, W. Zhou, Q. Tian, M. Yang and H. Li, "Assessing Image Retrieval Quality at the First Glance", in IEEE Transactions onImage Processing, vol. 27, No. 12, pp. 6124-6134, Dec. 2018, DOI: 10.1109/TIP.2018.2864919. (Year: 2018).
Amazon Screen captures to show website viewed and discussed in the interview from https://www.amazon.com/, Search Term: "Paintcolors Women's Summer Short Sleeve Button Down Pockets Belted Elastic Waist Solid Color Jumpsuits Rompers", Retrieved on Jun. 5, 2023, 5 pages.
Sudibyo et al., "Perceived Risk in Online Purchase Intention," 2020 International Conference on Information Management and Technology (ICIMTech), Year: 2020, pp. 87-92.
Wang et al., "Online financing service for Chinese medicines transactions," 2016 IEEE 20th International Conference on Computer Supported Cooperative Work in Design (CSCWD), Year:2016, pp. 481-485.
Kshetri, N., "5G in E-commerce Activities," in IT Professional, vol. 20, No. 4, pp. 73-77, Jul./Aug. 2018, doi: 10.1109/MITP.2018.043141672. (Year: 2018).
Räck, C., et al., "Featured Media: Nonlinear, Clickable Multimedia Content for an Interactive Video Experience," 2010 Second International Conferences on Advances in Multimedia, 2010, pp. 39-43, doi: 10.1109/MMedia.2010.18 (Year: 2010).
Sun, S., et al., "Assessing Image Retrieval Quality at the First Glance," in IEEE Transactions on Image Processing, vol. 27, No. 12, pp. 6124-6134, Dec. 2018, doi: 10.1109/TIP.2018.2864919. (Year: 2018).
Ruxandra Paun, "Methods, Systems, and Media for PresentingTicker Content With Video Content", Publication Date: May 2, 2014, 36 pages.

* cited by examiner

CUSTOMIZED E-COMMERCE TAGS IN REALTIME MULTIMEDIA CONTENT

CROSS-REFERENCE TO RELATED APPLICATION(S)

This application is a continuation of and claims priority to, U.S. patent application Ser. No. 17/014,250, filed on Sep. 8, 2020, and issued as U.S. Pat. No. 11,403,692, on Aug. 2, 2022, which is incorporated by reference herein in its entirety.

TECHNICAL FIELD

The presence of multimedia content, such as videos that include a series of images and related audio, has become ubiquitous. While such multimedia content may be prerecorded, in some instances, the multimedia content may be provided in a live or near-live fashion to a given audience. Such multimedia content may be utilized for various purposes, such as to inform consumers of the availability of items for purchase and to provide details about such items.

BRIEF DESCRIPTION OF THE DRAWINGS

Features of the present disclosure, its nature and various advantages, will be more apparent upon consideration of the following detailed description, taken in conjunction with the accompanying drawings. The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
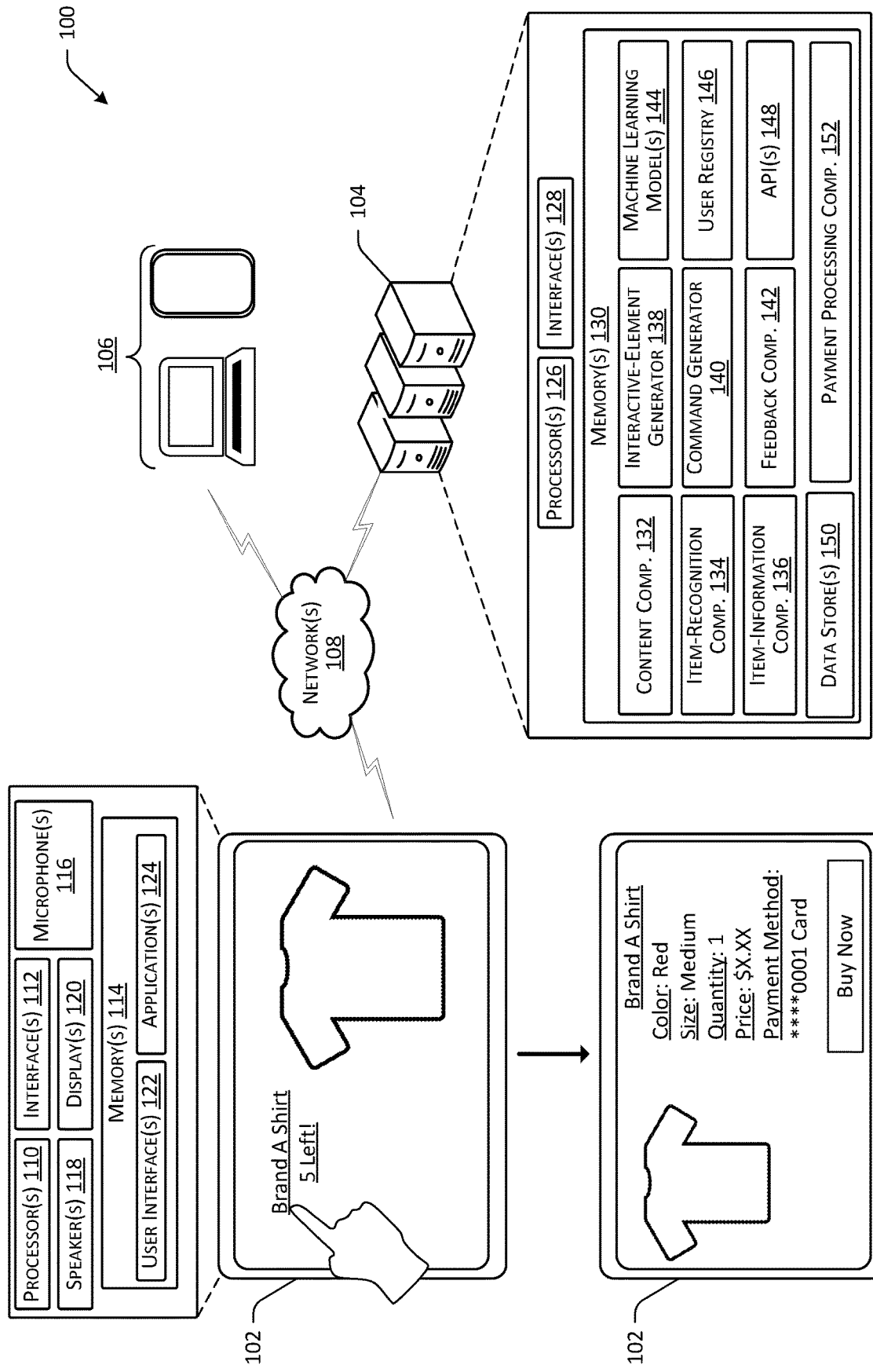
FIG. 1 illustrates an example environment for electronic commerce ("e-commerce") tags in multimedia content and customized e-commerce tags in real-time multimedia content.

Techniques described herein are directed to, among other things, the generation of, association of, and/or use of e-commerce tags in multimedia content, and more generally, improve the use of electronic devices with the multimedia content. E-commerce tags can be selectable portions associated with multimedia content that may include e-commerce specific actions, such as purchasing actions, item information actions, and/or other shopping related actions, for example. Interactive elements may include any selectable element that may be presented to a user and be configured to receive user input indicating selection. Multimedia content may be any content that includes image data and/or audio data, for example. The multimedia content may be considered video having a sequence of images, and in examples audio that accompanies the images. For example, a user (e.g., a merchant) can post an image, video, or the like (hereinafter "content") via a platform. Such content can depict item(s) (e.g., goods and/or services). In some examples, the content can be associated with an intent to sell an item depicted in the content (e.g., text associated with an image indicating that the user is looking to sell an item depicted in the image, speech associated with a video indicating that the user is looking to sell an item depicted in the video, etc.). In other examples, the content may not be associated with an intent to sell (e.g., no explicit or implicit indication that the user desires to sell anything depicted in the content). In at least one example, techniques described herein alleviate the need for users interested in selling via certain platforms to perform any action that they usually wouldn't perform prior to posting content to such platforms. That is, users interested in selling via these platforms can post content to one or more platforms and techniques described herein are directed to creating selling opportunities and facilitating transactions based on such content. In one implementation, such platforms are "pure" multimedia content platforms, such as YouTube Videos, YouTube Live, Instagram Videos, Live Instagram Feed, and so on. In such cases, the disclosed methods and systems can communicatively couple with the content platforms to offer interactive elements and e-commerce tags. In another implementation, an e-commerce platform can provide functionalities to publish content for sale and/or process payments.

Take, for example, a merchant that has created or is otherwise associated with multimedia content that references one or more items. The multimedia content may include a visual representation of the items and/or speech associated with the multimedia content may audibly present a description of the items. In examples, such multimedia content may be created for the purpose of exposing potential customers to the items referenced in the multimedia content with the hopes of those customers purchasing the items. It should be understood that when "items" are discussed herein, those items may include one or more goods (e.g., physical products) and/or one or more services (e.g., provided in-person or virtual) that may be offered by a merchant. It should also be understood that when an item is described as being "referenced," the item may be visually (e.g., through gestures) shown in the multimedia content and/or audibly discussed or otherwise referred to. While presenting multimedia content to customers, such as via one or more online platforms, may peak interest in certain customers, if customers desire to purchase the referenced items, they may need to navigate to a website or other platform that allows the customers to manually add the referenced items to a "cart" and proceed with a typical checkout process to purchase the items. That is, customers often are required to leave content they are currently viewing to access another online platform (e.g., website, or the like) to view additional information, add item(s) to a cart, and/or otherwise engage in a payment flow to purchase the item(s). This friction in the purchasing process detracts from buyer engagement with the merchant, and could potentially lead to loss of sale opportunities for the merchant. Additionally, while merchants may be adept at generating commercials and other forms of multimedia content, they may not be skilled in generating user interfaces, surfacing items that may be relevant to particular consumer of the content, and formatting displayable interactive elements that ease a customer's ability to purchase the referenced items.

Techniques described herein are directed to the generation of, in examples, on-the-fly interactive elements, e.g., e-commerce tags, and the overlay of those interactive elements on the multimedia content when output to a customer. In one implementation, such interactive elements are generated and intelligently positioned without merchant intervention. Utilizing the techniques described herein, a merchant can post multimedia content to a given platform, and a payment processing service provider may perform operations that result in the generation of item and/or user-centric interactive elements that may be overlaid on the multimedia content when output to the customer. For example, the payment processing service provider may receive an instance of the multimedia content. The multimedia content may be received from a system associated with a given merchant and/or from one or more third-party systems, such as systems associated with platforms such as social media platforms. The payment processing service provider system may be utilized to receive the multimedia content and generate the interactive elements as described herein.

For example, the payment processing service provider system may be configured to receive the multimedia content and/or to retrieve the multimedia content. For example, a merchant system or other system may push the multimedia content to the payment processing service provider system without a specific request for such content. In other examples, the content component may query one or more other systems for the multimedia content. In still other examples, the payment processing service provider system may receive an indication that multimedia content associated with a given merchant has been requested to be output on a user device associated with a customer. In these examples, the payment processing service provider system may query for an instance of the multimedia content and perform the techniques for generating an interactive element overlay, such as prior to the multimedia content being output on the user device. In this way, techniques described herein can intelligently generate interactive element overlays based at least in part on the multimedia content without, or with minimal, input from merchants.

The payment processing service provider system may analyze the multimedia content and/or related data to identify one or more items referenced in the multimedia content. For example, the payment processing service provider system may utilize image data of the multimedia content to identify items depicted in the image data. Such analysis may include the use of computer vision techniques to identify the presence of objects in given image data and then to identify the objects themselves and/or object categories to which the objects belong (e.g., shirt, pants, hat, watch, etc.). Additional details on the use of computer vision techniques is provided below. Additionally, or alternatively, when the multimedia content includes user speech, speech recognition and natural language understanding techniques may be utilized to identify the speech, generate text data representing the speech, and then determine an intent and/or purpose of the speech. By doing so, the payment processing service provider system may identify items referenced in the multimedia content as well as, in examples, attributes of the items (e.g., color, size, brand, quality (such as new/consigned), fulfillment method, etc.). Additionally, or alternatively, the payment processing service provider system may utilize metadata associated with the multimedia content and/or the merchant from which the content was provided to identify the items. For example, the merchant system may provide metadata indicating the items referenced in the multimedia content. In examples, one or more other users may have commented on or otherwise provided information in relation to the multimedia content. In these and other examples, some or all of this data may be utilized by the payment processing service provider system to identify the items and/or attributes associated with the items referenced in the multimedia content. That is, techniques described herein can utilize machine-trained models to intelligently identify item(s) referenced in multimedia content. This can streamline the generation of interactive multimedia content, thereby providing accurate interactive elements for display with minimal or no merchant involvement.

The payment processing service provider system may receive and/or determine item information associated with the items referenced in the multimedia content. For example, the merchant system may provide data indicating information associated with the referenced items. That information may include information related to attributes of the item (e.g., sizes, colors, brands, item types, item options, etc.). Additionally, or alternatively, the item-information component may query one or more systems for item information. By way of example, the payment processing service provider system may query the merchant system for inventory data indicating a current inventory of the item(s), such as at a time that the multimedia content is being output. In examples, the merchant system may return the inventory data and that inventory data may be utilized to inform a customer of a current inventory of items as available from the merchant. In other examples, such as where the inventory data indicates the item is out of stock and/or when user preferences indicate that a different merchant is preferred by the customer, an indication of the current inventory of one or more other merchants may be retrieved and displayed on the user device. The payment processing service provider system may also receive item information. In examples where an item is no longer available, the system may be configured to alter the multimedia content to remove the portion of the multimedia content that references the no-longer-available item. In this way, techniques described herein can identify item attributes specific to given multimedia content without needing human input on those item attributes and in a way that can be used for generating specific interactive elements.

In at least one example, operations performed by the payment processing service provider system can leverage a multi-party merchant ecosystem. That is, in some examples, a payment processing service provider (e.g., server(s) associated therewith) can communicate with end users (e.g., customers and/or merchants) via respective user computing devices, and over one or more networks. Such a remote, network-connected multi-party merchant ecosystem can enable the payment processing service provider to access data associated with multiple, different merchants and/or customers, and use such data for intelligently generating interactive elements, in some examples, in real time or near-real time. Having a payment processing service provider, which may have access to multiple disparate merchants and multiple disparate platforms, perform the processes described herein allows for the unique generation and use of merchant-related data and multimedia content to generate interactive elements to be displayed intelligently with multimedia content.

In examples, the identifying information about the item may be utilized to construct a three-dimensional representation of an item that is displayed with respect to the multimedia content. The three-dimensional representation of the item may also be displayed to the user, such as with an interactive element.

The payment processing service provider system may be configured to utilize the item recognition data and/or the item information data to generate data representing an interactive element. The interactive element may be configured such that, when the multimedia content is output on the user device, the interactive element is also presented, such as in the form of an overlay. The interactive element may be, in examples, specific to the multimedia content, the items referenced therein, the item attributes, and/or user preferences. For example, utilizing the data received and/or determined as described herein, the payment processing service provider system may determine a type of interactive element to generate. Interactive element types may include, for example, a selectable link, a quick response code ("QR code") and/or other scannable code, an indicator that voice input for selection of the interactive element is enabled, an indicator that gesture input for selection of the interactive element is enabled, etc. It should be understood that while several examples of element types have been provided herein, this disclosure includes any element type that allows user input to be received. Determining the type of interactive element to associate with given multimedia content may be based at least in part on a device type of the user device. For example, if the device type indicates that the device includes a camera, gesture-based interactive elements may be utilized, or if the device type indicates the device does not include a touchscreen, the interactive element may be configured to accept user input other than touchscreen input. Additionally, or alternatively, purchase history associated with a user profile that is being utilized to view the multimedia content may be utilized to determine past user input types, and that information may be utilized to determine the type of interactive element to be generated. In this way, techniques described herein can generate new data on the fly that may be configured to cause user devices to change displayed content in a time sensitive manner.

In addition to the type of interactive element, the payment processing service provider system may be configured to determine one or more other aspects associated with the interactive element, such as when to display the interactive element with respect to the multimedia content, where to display the interactive element with respect to a viewable window of a user device, an amount and/or type of item detail to display, and/or functionality that occurs when the interactive element is selected, for example. By way of example, the payment processing service provider system may determine when to display the interactive element based at least in part on data indicating when the item begins being referenced in the multimedia content and when the item ceases being referenced. For example, given content may be two minutes in length, but the item may not start being referenced until the 30-second mark and then ceases being referenced at the 1-minute mark. Utilizing the item-recognition data described herein, the payment processing service provider system may generate the interactive element to be configured to be displayed only during the time frame when the item is referenced. With respect to determining where to display the interactive element, the payment processing service provider system may determine, utilizing the item-recognition data, a relative location of the item as depicted in the multimedia content with respect to a viewable window of the user device. For example, the item-recognition data may indicate a location of the object as identified in the image data, and the interactive element may be generated such that, when displayed, the interactive element may be positioned near the object but not, in examples, over top of the object. This will allow a user to see both the object and the interactive element, and perceive that the object and the interactive element are associated with each other, while the multimedia content is output.

With respect to determining an amount and/or type of item detail to display, the payment processing service provider system may utilize the item information to determine attributes associated with the referenced item. In some examples, all of the attributes may be included in the interactive element. However, in other examples, only a portion of the attributes may be included. For example, utilizing the historical data associated with the user profile, one or more user preferences may be received and/or determined, and those user preferences may inform the selection of which item information to include in the interactive element. For example, the historical data may indicate that the user associated with the user profile at issue purchases more items with a certain degree of item detail and/or certain types of item detail provided. By way of additional example, the historical data may be data associated with more than (or other than) the user profile at issue, such as historical data associated with customers of the merchant, customers of different merchants, and/or customers in general. In other examples, the user preferences may be utilized to upsell or otherwise bundle items based at least in part on prior bundled purchases by the user.

With respect to determining the functionality that will occur upon selection of the interactive element, the payment processing service provider system may receive and/or determine data indicating user preferences for selection functionality. Those user preferences may indicate that a user desires to have a purchasing user interface displayed upon selection of an interactive element. Those user preferences may, in other examples, indicate that a user desires to have the purchasing user interface displayed only after cessation of the multimedia content or otherwise at some time after selection of a given interactive element. This functionality may allow the user to select multiple interactive elements corresponding each to different items before being presented with a purchasing user interface. In these examples, the interactive elements may be configured to be selected and then data indicating those selections may be saved until cessation of the multimedia content. Additionally, the user preference information described herein may be utilized to recommend additional multimedia content to display to the user and/or to influence how users navigate between multimedia content.

The payment processing service provider system may be configured to generate commands that, among other things, cause devices such as user devices to perform actions. For example, the payment processing service provider system may generate a command to cause the interactive element to be presented along with the multimedia content. The payment processing service provider system may also generate a command to cause the user device to display a purchasing user interface in response to selection of one or more interactive elements. The payment processing service provider system may also generate a command to cause the user device to display information in the user interface. For example, one or more user-input fields of the purchasing user interface may be prepopulated based at least in part on some or all of the data discussed herein. For example, data from the user profile may be utilized to prepopulate attributes and/or options associated with a selected item. Additionally, or alternatively, the item information determined from the multimedia content may be utilized to prepopulate the item attributes. Additionally, payment information from past transactions associated with the user profile may be utilized to prepopulate payment options, delivery addresses, etc. on the purchasing user interface. In this way, upon selection of the interactive element(s), the purchasing user interface may be automatically displayed and prepopulated with item and payment instrument information such that a user may need to only confirm the purchase without providing any additional input to acquire the item. It should be understood that when the purchasing user interface is displayed, this user interface may be associated with the merchant, such as a merchant website that would allow for purchasing, and/or the user interface may be associated with the payment processing service provider, such as a web-based and/or application-based user interface that would allow for purchasing. In this way, techniques described herein can cause applications of user devices to activate and cause display of user interfaces with time-sensitive, secure data prepopulated in those interfaces for use by the user.

The payment processing service provider system may be configured to receive feedback data associated with the interactive elements. The feedback data may indicate positive and/or negative comments about the interactive elements, display of the interactive elements, and/or functionality associated with selection of the interactive elements. This feedback data may be collected and utilized to improve the generation of interactive elements and/or related functionality. For example, the feedback data may be formatted as input data (or otherwise training data) to one or more machine learning models. This input may be utilized to train the machine learning models, which may be utilized by the various components of the systems described herein to perform one or more of the operations described with respect to those systems. In this way, techniques described herein can utilize data provided by users or otherwise commenters for generating new, more accurate interactive elements.

It should be understood that the operations described herein may be performed on prerecorded multimedia content and/or on live and/or near-live streaming content. When live and/or near-live streaming content is utilized, the content may be received at the payment processing service provider system and may be utilized for item recognition and interactive element generation. This may be performed before the multimedia content is sent to the user device and/or while the user device is outputting the multimedia content. With respect to the live and/or near-live examples, the platform associated with the streaming content may be any platform that allows for customer interaction, such as conference calling platforms, social media platforms, etc. In these examples, functionality associated with the interactive elements may be in the form of a downloadable widget or otherwise an application that may allow for interactive elements to be displayed.

It should be noted that the exchange of data and/or information as described herein may be performed only in situations where a user has provided consent for the exchange of such information. For example, upon setup of devices and/or initiation of applications, a user may be provided with the opportunity to opt in and/or opt out of data exchanges between devices and/or for performance of the functionalities described herein. Additionally, when one of the devices is associated with a first user account and another of the devices is associated with a second user account, user consent may be obtained before performing some, any, or all of the operations and/or processes described herein. Additionally, the operations performed by the components of the systems described herein may be performed only in situations where a user has provided consent for performance of the operations.

The embodiments described herein relate to the generation of new "embedded data," such as links which may be generated on-the-fly in some embodiments, that is used to display selectable links, quick reference codes, tags, etc. while multimedia content is being output on a screen of a user device. Additionally, the dynamic display of purchasing information (such as sizes, colors, inventory, price, etc.) both during video output and after a user clicks, scans, or otherwise selects the link are computer-centric solutions that utilize disparate data sources to produce anew and useful result specific to computing environments. Further, the techniques described herein include the generation of new data, such as the link data described herein which is specific to given multimedia content and is configured to be displayed, in examples, differently for different user devices, for example customized based on user profiles. By doing so, online platform marketplaces may be augmented such that information displayed to potential customers is more accurate, tailored to the specific customer, is presented in a time sensitive manner, and provides functionality that could only exist in a computer-centric environment. Commands to display selectable elements as described herein may also be configured to cause applications on user devices to initiate and/or activate and cause display of time-sensitive information, such as without user input. By so doing, a material change in the user devices themselves is achieved such that the user devices may perform functions that otherwise would not have been possible absent the computer-centric solutions described herein. Additionally, given the incredible amount of information on all items available for sale, even with respect to a single merchant, and the possible item options and payment options, the innovations described herein may be utilized to filter internet content such that only relevant selectable links are displayed (and only in specific screen locations and for specific times in given examples) and only relevant item and purchasing information is provided when a selectable element is displayed. By so doing, the present methods and systems provide filtering internet content in a manner that is new and increases the functionality of user devices and merchant devices alike.

The embodiments described herein use information about the multimedia content similarities including but not limited to spatial and temporal similarities in the multimedia content; specifically, collecting and using subject-specific information about the speaker that is featured in the multimedia, e.g., video. In one embodiment, the disclosed methods and systems leverage the fact that usually one participant of a video conference speaks at a time and that the video displayed in a main window generally focusses on the speaker and not on the other non-speaking participants (whose videos may also be displayed but typically in smaller sidebar windows and not in the main window), filtering video information according to one embodiment is performed in a participant-specific manner. The participant-specific video filtering is based at least on the manner in which a particular speaker speaks, e.g., the speaker's facial expressions, movement of the head and eyes, hand gestures, etc., generally indicate or otherwise point to item information. In various examples described below, such participant-specific knowledge is learned via machine learning, and that knowledge is used to minimize redundancies in video transmission in addition to (or instead of) spatial and temporal redundancies. This allows for the focus to be on one speaker and or related items as opposed to other speakers and other items in the video. This also allows for a higher compression ratio than that achieved using standardized video filtering and recognition schemes. The learned participant-specific knowledge is used in decoding or reconstructing the encoded video as well, so that a high or desired perception quality can be maintained despite the higher compression ratio. Since the compression ratio is generally higher relative to standardized encoding, the frame rate of video transmission need not be lowered when the available bandwidth is low. Thus, a high or desired perception quality can be maintained in video conferencing, where buffering to accommodate variable frame transmission rates is not available. More specifically, such techniques allow more accurate tagging and identification of relevant items for commerce.

Examples of multimedia content include multimedia transmissions, which are broadly classified into two categories, namely, stored video transmission and live streaming. Stored video transmission can be used to transmit videos that are produced at one time and are transmitted and viewed at a later time. Examples of such videos include movies, previously recorded TV shows, previously recorded sports events, etc. In live streaming, on the other hand, production, transmission, reception, and display of the video occur in real time. Examples of live streaming include video chats, video conferences, live transmission of news, live shopping events, live social media feeds, live infomercials, etc. One main difference between stored video transmission and live streaming is the availability of buffering in the former, and lack thereof in the latter. The embodiments described herein provide generation of e-commerce tags in any kind of multimedia transmission. In case of stored or previously buffered videos, the disclosed methods and systems can analyze and then generate the tags to be associated with relevant sections of the media. In case of live multimedia, the methods and systems can analyze the content in real-time or near-real time and generate tags on the fly with the most current information regarding the items.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates an example environment for electronic commerce ("e-commerce") tags in multimedia content and customized e-commerce tags in real-time multimedia content. In FIG. 1, server(s) 104 can be associated with a payment processing service provider, which can communicate with user computing devices, such as a merchant device 106 (also described herein as a merchant device and/or a merchant system) and a buyer device 102 (also described herein as a user device), via network(s) 108. That is, the merchant device 106 and the buyer device 102 are network-connected devices that enable end users (e.g., a merchant and a buyer, respectively) to access services provided by the payment processing service provider (e.g., via the server(s) 104). Additional details associated with the server(s) 104, the user computing devices (e.g., 102, 106), and the network(s) 108 are described below with reference to FIGS. 13 and 14.

In at least one example, the server(s) 102 can include a payment processing component 152. The payment processing component 152 can, among other things, process transactions. That is, in at least one example, the payment processing component 152 can access payment data associated with a user, send a request for authorization of the payment data to a payment service provider, and process a transaction based on a response from the payment service provider. In other examples, the payment processing component 152 can access an account maintained by the payment processing service provider and can use funds associated with the account to process a transaction. Additional details associated with the payment processing component 152 are described below.

In at least one example, the payment processing service provider can expose functionality and/or services via one or more APIs 148, thereby enabling functionality and/or services described herein to be integrated into various functional components of the environment 100. The API(s) 148, which can be associated with the server(s) 104, can expose functionality described herein and/or avail payment processing services to various functional components associated with the environment 100. At least one of the API(s) 148 can be a private API, thereby availing services and/or functionalities to functional components (e.g., applications, etc.) that are developed internally (e.g., by developers associated with the payment processing service provider). At least one of the API(s) 148 can be an open or public API, which is a publicly available API that provides third-party developers (e.g., social media service providers described herein) with programmatic access to a proprietary software application or web service of the payment processing service provider. That is, the open or public API(s) can enable functionality and/or services of the payment processing service provider to be integrated into multimedia content platforms. The API(s) 148 can include sets of requirements that govern how applications, or other functional components, can interact with one another.

In some examples, the payment processing service provider can provide third-party entities with a software developer kit ("SDK") that may utilize functionality exposed by the API(s) 148. The SDK can include software development tools that allow a third-party developer (i.e., a developer that is separate from the payment processing service provider) to include functionality and/or avail services as descried herein. The SDK and/or the API(s) 148 may include one or more libraries, programming code, executables, other utilities, and documentation that allows a developer to directly include functionality and/or avail services described herein within an application, such as third-party applications providing social networking services, as described herein.

In at least one example, the server(s) 104 can include, or otherwise have access to, data store(s) 150. The data store(s) 150 can store, among other types of data, user profiles and inventory records. Additionally, the server(s) 104 can include a user registry 146, which may also include user profiles and/or include associations between user profiles and merchant profiles. For instance, a user profile of the buyer can store payment data associated with payment instrument(s) of the buyer. In some examples, an account maintained by the payment processing service provider on behalf of the buyer can be mapped to, or otherwise associated with, the user profile of the buyer. Such an account can store funds received from peer-to-peer payment transactions, deposits from employers, transfers from other accounts of the buyer, and so on. Additionally or alternatively, a user profile of the merchant can be mapped to, or otherwise associated with, an account of the merchant (which can be maintained by the payment processing service provider, a bank, or another payment service). Additional details are provided below.

As illustrated in FIG. 1, the buyer device 102 is associated with user interface(s) 122 that enable the buyer to interact with the buyer device 102. The user interface(s) 122 can be presented via web browsers, applications (e.g., desktop or otherwise dedicated, provided by the payment processing provider, provided by a third-party, etc.), or the like to enable the buyer to access functionality and/or services as described herein. Similarly, the merchant device 106 can be associated with user interface(s) which can be presented via web browsers, applications (e.g., desktop or otherwise dedicated, provided by the payment processing provider, provided by a third-party, etc.), or the like to enable the merchant to interact with the merchant device 106 and access functionality and/or services as described herein.

In at least one example, a user interface of the user interface(s) 122 can be presented via a multimedia platform (e.g., website, application, etc.) associated with a provider of multimedia content. Functionality and/or services of the payment processing service provider can be integrated into the social media platform via the API(s) 148 and/or SDKs. In at least one example, the merchant can post content via the platform. In FIG. 1, the content is multimedia content, but in additional or alternative examples, the content can be any other type of content. In at least one example, the buyer can access and/or consume the content via a user interface of the user interface(s) 122 that is presented via the platform. That is, the merchant and the buyer can each access the platform via user interfaces presented via their respective devices.

In at least one example, one or more users can respond to content, for example, via comments (which can include text, images, emojis, etc.), interactions with a button or other actuation mechanism (e.g., like, dislike, funny, love, etc.), and so on. Such responses can be posted in near real-time. For instance, one or more users can respond to the multimedia content posed by the merchant.

As illustrated above, the environment 100 may include the buyer device 102, the server(s) 104, and/or the merchant device 106. The buyer device 102, in addition to the components discussed above, may include one or more components such as one or more processors 110, one or more network interfaces 112, memory 114, one or more microphones 116, one or more speakers 118, and/or one or more displays 120. The microphones 116 may be configured to receive audio from the environment 100 may generate corresponding audio data, which may be utilized as discussed herein. The speakers 118 may be configured to output audio, such as audio corresponding to at least a portion of the multimedia content output by the buyer device 102. The displays 120 may be configured to present images (which may be described as video) corresponding to at least a portion of the multimedia content output by the buyer device 102. The memory 114 may include one or more components such as the user interface(s) 122 (discussed above), and one or more applications 124. The applications 124 may be associated with content providers, merchants, and/or the payment processing service provider. The merchant device 106 may include the same or similar components that may perform the same or similar functions. It should be noted that the merchant device 106, like the other devices and systems described herein, may take one or more forms, such as a computing device, a laptop computer, a phone, and/or components thereof, for example.

The server(s) 104 may include one or more components including, for example, one or more processors 126, one or more network interfaces 128, and/or memory 130. The memory 130 may include one or more components such as, for example, a content component 132, an item-recognition component 134, an item-information component 136, an interactive-element generator 138, a command generator 140, a feedback component 142, one or more machine learning models 144, a user registry 146, one or more APIs 148, one or more datastores 150, and/or the payment processing component 152. The user registry 146, APIs 148, datastores 150, and payment processing component 152 have been described above. The other components will be described below by way of example.

For example, the content component 132 may be configured to receive the multimedia content and/or to retrieve the multimedia content. For example, the merchant device 106 or other system may push the multimedia content to the payment processing service provider without a specific request for such content. In other examples, the content component 132 may query one or more other systems for the multimedia content. In still other examples, the content component 132 may receive an indication that multimedia content associated with a given merchant has been requested to be output on a buyer device 102 associated with a customer. In these examples, the content component 132 may query for an instance of the multimedia content and perform the techniques for generating an interactive element overlay, such as prior to the multimedia content being output on the buyer device 102.

The item-recognition component 134 may analyze the multimedia content and/or related data to identify one or more items referenced in the multimedia content. For example, the item-recognition component 134 may utilize image data of the multimedia content to identify items depicted in the image data. Such analysis may include the use of computer vision techniques to identify the presence of objects in given image data and then to identify the objects themselves and/or object categories to which the objects belong (e.g., shirt, pants, hat, watch, etc.). Additionally, or alternatively, when the multimedia content includes user speech, speech recognition and natural language understanding techniques may be utilized to identify the speech, generate text data representing the speech, and then determine an intent and/or purpose of the speech. By doing so, the item-recognition component 134 may identify items referenced in the multimedia content as well as, in examples, attributes of the items (e.g., color, size, brand, etc.). Additionally, or alternatively, the item-recognition component 134 may utilize metadata associated with the multimedia content and/or the merchant from which the content was provided to identify the items. For example, the merchant device 106 may provide metadata indicating the items referenced in the multimedia content. In examples, one or more other users may have commented on or otherwise provided information in relation to the multimedia content. In these and other examples, some or all of this data may be utilized by the item-recognition component 134 to identify the items and/or attributes associated with the items referenced in the multimedia content. It should be understood that when voice recognition is described herein as being usable to identify items, voice recognition may be utilized, in examples, along with image recognition as described herein for item recognition.

With respect to computer vision techniques, computer vision includes methods for acquiring, processing, analyzing, and understanding images and, in general, high-dimensional data from the real world in order to produce numerical or symbolic information, e.g., in the form of decisions. Computer vision seeks to duplicate the abilities of human vision by electronically perceiving and understanding an image. Understanding in this context means the transformation of visual images (the input of the retina) into descriptions of the world that can interface with other thought processes and elicit appropriate action. This image understanding can be seen as the disentangling of symbolic information from image data using models constructed with the aid of geometry, physics, statistics, and learning theory. Computer vision has also been described as the enterprise of automating and integrating a wide range of processes and representations for vision perception. As a scientific discipline, computer vision is concerned with the theory behind artificial systems that extract information from images. The image data can take many forms, such as video sequences, views from multiple cameras, or multi-dimensional data from a scanner. As a technological discipline, computer vision seeks to apply its theories and models for the construction of computer vision systems.

One aspect of computer vision comprises determining whether or not the image data contains some specific object, feature, or activity. Different varieties of computer vision recognition include: Object Recognition (also called object classification)—One or several pre-specified or learned objects or object classes can be recognized, usually together with their 2D positions in the image or 3D poses in the scene. Identification—An individual instance of an object is recognized. Examples include identification of a specific person's face or fingerprint, identification of handwritten digits, or identification of a specific vehicle. Detection—The image data are scanned for a specific condition. Examples include detection of possible abnormal cells or tissues in medical images or detection of a vehicle in an automatic road toll system. Detection based on relatively simple and fast computations is sometimes used for finding smaller regions of interesting image data that can be further analyzed by more computationally demanding techniques to produce a correct interpretation.

Several specialized tasks based on computer vision recognition exist, such as: Optical Character Recognition (OCR)—Identifying characters in images of printed or handwritten text, usually with a view to encoding the text in a format more amenable to editing or indexing (e.g., ASCII). 2D Code Reading—Reading of 2D codes such as data matrix and QR codes. Facial Recognition. Shape Recognition Technology (SRT)—Differentiating human beings (e.g., head and shoulder patterns) from objects.

Some functions and components (e.g., hardware) found in many computer vision systems are described here. For example, a digital image is produced by one or several image sensors, which, besides various types of light-sensitive cameras, may include range sensors, tomography devices, radar, ultra-sonic cameras, etc. Depending on the type of sensor, the resulting image data may be a 2D image, a 3D volume, or an image sequence. The pixel values may correspond to light intensity in one or several spectral bands (gray images or color images), but can also be related to various physical measures, such as depth, absorption or reflectance of sonic or electromagnetic waves, or nuclear magnetic resonance. Before a computer vision method can be applied to image data in order to extract some specific piece of information, it is usually beneficial to process the data in order to assure that it satisfies certain assumptions implied by the method. Examples of pre-processing include, but are not limited to re-sampling in order to assure that the image coordinate system is correct, noise reduction in order to assure that sensor noise does not introduce false information, contrast enhancement to assure that relevant information can be detected, and scale space representation to enhance image structures at locally appropriate scales. Image features at various levels of complexity are extracted from the image data. Typical examples of such features are: Lines, edges, and ridges; Localized interest points such as corners, blobs, or points; More complex features may be related to texture, shape, or motion. At some point in the processing a decision may be made about which image points or regions of the image are relevant for further processing. Examples are: Selection of a specific set of interest points; Segmentation of one or multiple image regions that contain a specific object of interest; Segmentation of the image into nested scene architecture comprising foreground, object groups, single objects, or salient object parts (also referred to as spatial-taxon scene hierarchy). At this point, the input may be a small set of data, for example a set of points or an image region that is assumed to contain a specific object. The remaining processing may comprise, for example: verification that the data satisfy model-based and application-specific assumptions; estimation of application-specific parameters, such as object pose or object size; classifying a detected object into different categories; and comparing and combining two different views of the same object. Making the final decision required for the application, for example match/no-match in recognition applications, may then be performed.

The item-information component 136 may receive and/or determine item information associated with the items referenced in the multimedia content. For example, the merchant device 106 may provide data indicating information associated with the referenced items. That information may include information related to attributes of the item (e.g., sizes, colors, brands, item types, item options, etc.). Additionally, or alternatively, the item-information component 136 may query one or more systems for item information. By way of example, the item-information component 136 may query the merchant device 106 for inventory data indicating a current inventory of the item(s), such as at a time that the multimedia content is being output.

The inventory data may indicate one or more attributes and/or conditions of items. For example, the inventory data may include a stock count or other indication of a number of the item in question that is currently in stock. The inventory data may also include information about items that are currently in stock, such as item color, item size, item type, a physical location and/or location association of the item, and/or the availability of the item. In examples, the merchant device 106 may return the inventory data and that inventory data may be utilized to inform a customer of a current inventory of items as available from the merchant. In other examples, such as where the inventory data indicates the item is out of stock and/or when user preferences indicate that a different merchant is preferred by the customer, an indication of the current inventory of one or more other merchants may be retrieved and displayed on the buyer device 102. The item-information component 136 may also receive item information from the item-recognition component 136, such as when the item-recognition component 136 determines one or more attributes of the item utilizing the techniques described herein. When determining item inventory, machine learning models, such as those described herein, may be utilized to determine what items are likely to sell or not sell, and when the inventory amount is displayed as described herein, such as part of the interactive element, the inventory amount may be a predicted inventory based at least in part on the output of the machine learning models.

The interactive-element generator 138 may be configured to utilize the data received and/or determined by the item-recognition component 134 and/or the item-information component 136 to generate data representing an interactive element. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example. Multimedia content may be any content that includes image data and/or audio data, for example. The interactive element may be configured such that, when the multimedia content is output on the buyer device 102, the interactive element is also presented, such as in the form of an overlay. The interactive element may be, in examples, specific to the multimedia content, the items referenced therein, the item attributes, and/or user preferences. For example, utilizing the data received and/or determined as described herein, the interactive-element generator 138 may determine a type of interactive element to generate. Interactive element types may include, for example, a selectable link, a quick response code ("QR code"), a barcode or other scannable element, an indicator that voice input for selection of the interactive element is enabled, an indicator that gesture input for selection of the interactive element is enabled, etc. It should be understood that while several examples of element types have been provided herein, this disclosure includes any element type that allows user input to be received. Determining the type of interactive element to associate with given multimedia content may be based at least in part on a device type of the buyer device 102. For example, if the device type indicates that the device includes a camera, gesture-based interactive elements may be utilized, or if the device type indicates the device does not include a touchscreen, the interactive element may be configured to accept user input other than touchscreen input. Additionally, or alternatively, purchase history associated with a user profile that is being utilized to view the multimedia content may be utilized to determine past user input types, and that information may be utilized to determine the type of interactive element to be generated.

In addition to the type of interactive element, the interactive-element generator 138 may be configured to determine one or more other aspects associated with the interactive element, such as when to display the interactive element with respect to the multimedia content, where to display the interactive element with respect to a viewable window of a buyer device 102, an amount and/or type of item detail to display, and/or functionality that occurs when the interactive element is selected, for example. By way of example, the interactive-element generator 138 may determine when to display the interactive element based at least in part on data indicating when the item begins being referenced in the multimedia content and when the item ceases being referenced. For example, given content may be two minutes in length, but the item may not start being referenced until the 30-second mark and then ceases being referenced at the 1-minute mark. Utilizing the item-recognition data described herein, the interactive-element generator 138 may generate the interactive element to be configured to be displayed only during the time frame when the item is referenced. With respect to determining where to display the interactive element, the interactive-element generator 138 may determine, utilizing the item-recognition data, a relative location of the item as depicted in the multimedia content with respect to a viewable window of the buyer device 102. For example, the item-recognition data may indicate a location of the object as identified in the image data, and the interactive element may be generated such that, when displayed, the interactive element may be positioned near the object but not, in examples, over top of the object. This will allow a user to see both the object and the interactive element, and perceive that the object and the interactive element are associated with each other, while the multimedia content is output.

With respect to determining an amount and/or type of item detail to display, the interactive-element generator 138 may utilize the item information from the item-information component 136 to determine attributes associated with the referenced item. In some examples, all of the attributes may be included in the interactive element. However, in other examples, only a portion of the attributes may be included. For example, utilizing the historical data associated with the user profile, one or more user preferences may be received and/or determined, and those user preferences may inform the selection of which item information to include in the interactive element. For example, the historical data may indicate that the user associated with the user profile at issue purchases more items with a certain degree of item detail and/or certain types of item detail provided. By way of additional example, the historical data may be data associated with more than (or other than) the user profile at issue, such as historical data associated with customers of the merchant, customers of different merchants, and/or customers in general. Additionally, in examples where device functionality will allow for display of augmented reality and/or virtual reality representations of the multimedia data, the interactive elements may be configured to also be displayed in virtual reality and/or in an augmented reality setting. This may allow for different orientations and/or views of the interactive element, such as when orientations and/or views of the items in the multimedia content change.

With respect to determining the functionality that will occur upon selection of the interactive element, the interactive-element generator 138 may receive and/or determine data indicating user preferences for selection functionality. Those user preferences may indicate that a user desires to have a purchasing user interface 122 displayed upon selection of an interactive element. Those user preferences may, in other examples, indicate that a user desires to have the purchasing user interface 122 displayed only after cessation of the multimedia content or otherwise at some time after selection of a given interactive element. This situation may allow the user to select multiple interactive elements corresponding each to different items before being presented with a purchasing user interface 122. In these examples, the interactive elements may be configured to be selected and then data indicating those selections may be saved until cessation of the multimedia content.

In the examples provided above, the interactive-element generator 138 is described as generating specific interactive elements for specific items referenced in multimedia content. In other examples, the interactive-element generator 138 may generate a default and/or generic interactive element that indicates an item is available but does not provide specific details about the item. When the generic interactive element is selected, the payment processing service provider system may resolve what is known about the item and/or the user profile associated with the user to utilize more specific information for prepopulating a purchasing user interface.

The command generator 140 may be configured to generate commands that, among other things, cause devices such as user devices to perform actions. For example, the command generator 140 may generate a command to cause the interactive element to be presented along with the multimedia content. The command generator 140 may also generate a command to cause the buyer device 102 to display the purchasing user interface 122 in response to selection of one or more interactive elements. The command generator 140 may also generate a command to cause the buyer device 102 to display information in the user interface 102. For example, one or more user-input fields of the purchasing user interface 122 may be prepopulated based at least in part on some or all of the data discussed herein. For example, data from the user profile may be utilized to prepopulate attributes and/or options associated with a selected item. Additionally, or alternatively, the item information determined from the multimedia content may be utilized to prepopulate the item attributes. Additionally, payment information from past transactions associated with the user profile may be utilized to prepopulate payment options, delivery addresses, etc. on the purchasing user interface 122. In this way, upon selection of the interactive element(s), the purchasing user interface 122 may be automatically displayed and prepopulated with item and payment instrument information such that a user may need to only confirm the purchase without providing any additional input to acquire the item. In addition to the avoid, the user may select a "save for later" functionality that allows the information associated with the purchasing user interface to be saved so the user may utilize that information for purchasing the item(s) at a later time. In other examples, instead of a purchasing user interface, selection of the interactive element may allow the user to enter into an auction for the item where bidding may occur. This may allow for multiple users to bid on the same item at the same time. As described above, selection of the interactive element may cause the purchasing user interface 122 to be displayed. In examples, the purchasing user interface 122 may be associated with the merchant. However, in other examples, at least a portion of the purchasing functionality may be provided by the payment processing service provider system 104. In these examples, the payment processing service provider system 104 may be associated with an application, that may be stored and/or be accessible on the customer's devices, to allow for purchasing of the item(s) utilizing the application. In other examples, selection of interactive elements may allow for users to engage with items in a video and, when the interactive elements are selected, a request may be sent to specific merchants with those associated items to either engage directly with the customer, or allows the customer to directly buy the most relevant item. In these examples, interactive elements may be associated with certain portions of the multimedia content (such as portions where information about described items in the multimedia content is available), while the other portions are not interactive and therefore do not have any "buyable" items associated therewith. Additionally, user preference information described herein may be utilized to recommend additional multimedia content to display to the user and/or to influence how users navigate between multimedia content.

In examples, a virtual cart and/or cart data structure may be generated based at least in part on selection of interactive elements and/or other interaction by a customer with the purchasing user interface. In these examples, the virtual cart may include details about the selected interactive element, item(s) associated with the interactive element, payment and/or cost information associated with the item(s), and/or other data associated with the item(s) and/or a payment transaction for the item(s). The cart data structure may be configured to generate and/or make available payment links and/or to make subsequent interaction by the user easier and/or more efficient. For example, the cart data structure may be saved or otherwise stored such that the user may return to the virtual cart at a later time to continue purchasing the item(s) without having to select the items again and/or without having to input information that has already been input and/or prepopulated. Messages may also be sent to device and/or user profiles associated with the user utilizing the cart data structure. These messages may represent reminders of the item(s) in the virtual cart and/or requests to complete purchases. In examples, the virtual cart may include a fully defined item or a suggestion and/or item class that may be refined at a later time. As such, the virtual cart may act as a "bookmark" and/or may otherwise save data associated with the item(s) and/or the user's interaction with the items via the multimedia content, interactive elements, applications, or otherwise.

Additionally, the models 144 may be trained based on transaction information and/or other information associated with payment transactions. For example, transaction information of transactions performed between multiple merchants and multiple buyers may be received at the payment processing service provider system 104. This information may be received from merchant computing devices associated with the merchants. In these examples, the merchant computing devices may have respective instances of a merchant application installed thereon for configuring the merchant computing devise as point-of-sale (POS) terminals, respectively. The respective instances of the merchant application may configure the POS terminals to communicate the transaction information over one or more networks to the payment processing service provider system 104. In some examples, the POS terminals could be online terminals. Utilizing the transaction information, the payment processing service provider system 104 may generate profiles, using a model trained using at least one of merchant information, buyer information, and/or the transaction information.

In some implementations, the methods and systems described herein can be integrated with voice services (e.g. Amazon's ALEXA®, Apple's SIRI®, or Microsoft's CORTANA®) through specific API calls to such services from within the multimedia interface. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein. The determined user profile may be utilized to customize the interactive elements described herein, functionality that occurs when an interactive element is selected, and/or the information that is displayed in the purchasing user interface. In examples, geographic location of the viewing device may also be utilized to customize the interactive elements and/or the availability of the multimedia content, interactive elements, and/or items. The voice interface may also be utilized to provide the user inputs described herein. In addition, the voice interface may be associated with an online platform, and that platform may be utilized to fulfill item purchasing.

In examples, a merchant dashboard may be utilized to allow the merchant to view interactions with the multimedia content and/or data associated with the interactions. The merchant may be able to provide input for dynamic pricing of the items based at least in part on the interactions. Additional functionality may include on the fly question answering, incentive provision, and other functionality that allows the merchant to interact with customers. Additionally, the merchant dashboard may allow a merchant to interact live with customers and process payments with different users.

The feedback component 142 may be configured to receive feedback data associated with the interactive elements. The feedback data may indicate positive and/or negative comments about the interactive elements, display of the interactive elements, and/or functionality associated with selection of the interactive elements. This feedback data may be collected and utilized to improve the generation of interactive elements and/or related functionality. For example, the feedback data may be formatted as input data (or otherwise training data) to the one or more machine learning models 144. This input may be utilized to train the machine learning models 144, which may be utilized by the various components of the systems described herein to perform one or more of the operations described with respect to those systems.

The embodiments described herein use information about the multimedia content similarities including but not limited to spatial and temporal similarities in the multimedia content; specifically, collecting and using subject-specific information about the speaker that is featured in the multimedia, e.g., video. In one embodiment, the disclosed methods and systems leverage the fact that usually one participant of a video conference speaks at a time and that the video displayed in a main window generally focusses on the speaker and not on the other non-speaking participants (whose videos may also be displayed but typically in smaller sidebar windows and not in the main window), filtering video information according to one embodiment is performed in a participant-specific manner. The participant-specific video filtering is based at least on the manner in which a particular speaker speaks, e.g., the speaker's facial expressions, movement of the head and eyes, hand gestures, etc., generally indicate or otherwise point to item information. In various examples described below, such participant-specific knowledge is learned via machine learning, and that knowledge is used to minimize redundancies in video transmission in addition to (or instead of) spatial and temporal redundancies. This allows for the focus to be on one speaker and or related items as opposed to other speakers and other items in the video. This also allows for a higher compression ratio than that achieved using standardized video filtering and recognition schemes. The learned participant-specific knowledge is used in decoding or reconstructing the encoded video as well, so that a high or desired perception quality can be maintained despite the higher compression ratio. Since the compression ratio is generally higher relative to standardized encoding, the frame rate of video transmission need not be lowered when the available bandwidth is low. Thus, a high or desired perception quality can be maintained in video conferencing, where buffering to accommodate variable frame transmission rates is not available. More specifically, such techniques allow more accurate tagging and identification of relevant items for commerce.

Figure 2:
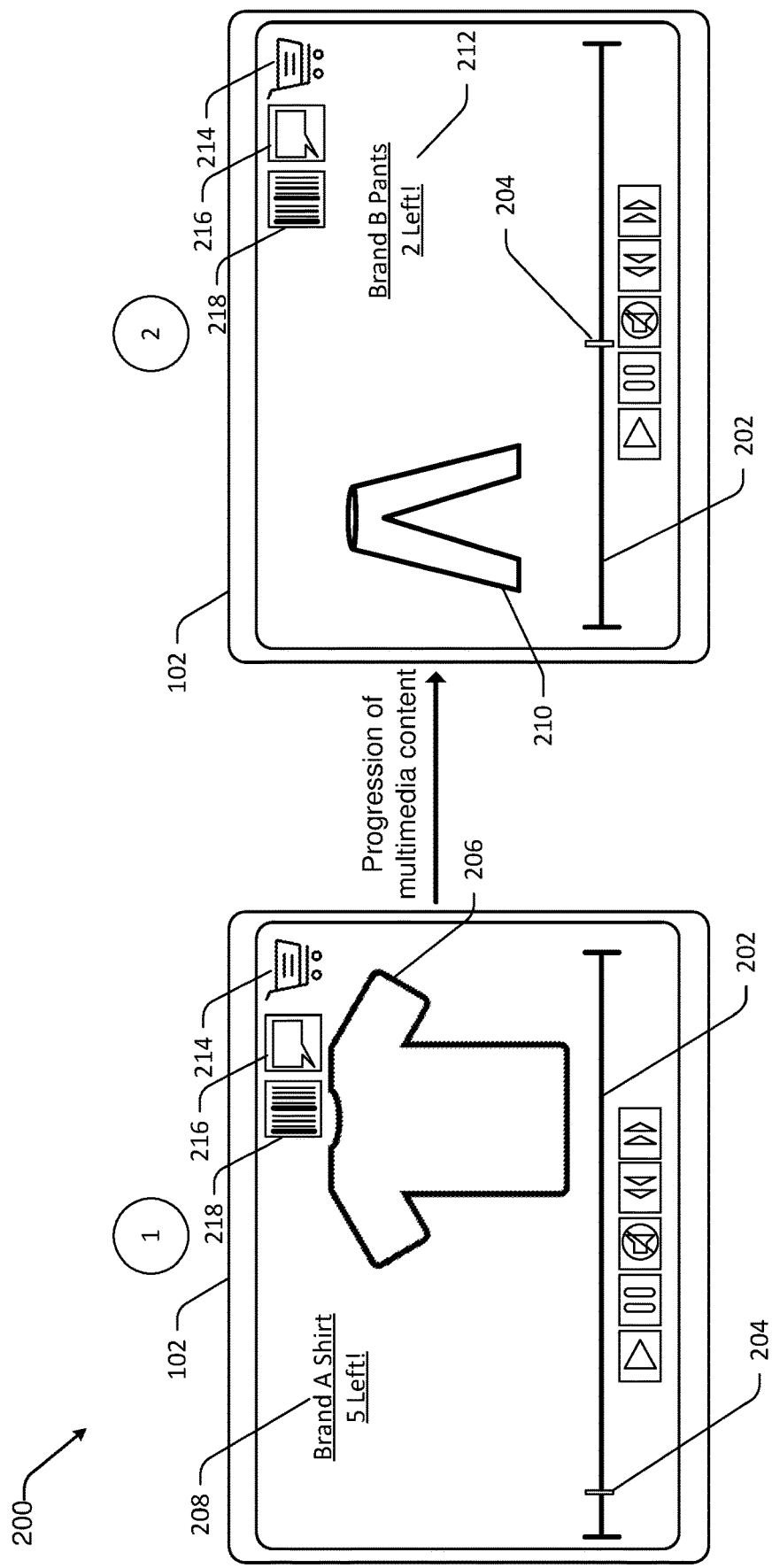
FIG. 2 illustrates an example conceptual diagram showing the output of multimedia content over time and changes in displayed interactive elements while the multimedia content is presented.

FIG. 2 illustrates an example conceptual diagram showing the output of multimedia content over time and changes in displayed interactive elements while the multimedia content is presented. The environment 200 of FIG. 2 may include a buyer device 102 that is being caused to display multimedia content as well as interactive elements displayed as an overlay on the multimedia content.

Specifically with respect to FIG. 2, the multimedia content may reference a first item 206, herein depicted as a shirt. The first item 206 may be identified utilizing the one or more techniques described elsewhere herein. The buyer device 102 may also display or otherwise be associated with a time bar 202 and a progression element 204. The time bar 202 may provide an indication of an overall length of the multimedia content, such as in minutes and seconds, for example. The progression element 204 may provide an indication of where the currently-displayed content is with respect to the overall length of the multimedia content. As shown in step 1 of FIG. 2, the progression element 204 indicates that the first item 206 is displayed early on in the multimedia content. Also as shown in step 1, an interactive-element generator has generated a first interactive element 208 to be displayed in association with the first item 206. The first interactive element 208 may be generated and customized utilizing the techniques described elsewhere in this disclosure, for example with reference to FIG. 1. As shown in step 1 of FIG. 2, the first interactive element 208 has been generated and caused to be displayed at a given location with respect to an interactive window of the buyer device 102, and the first interactive element 208 includes certain item details. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example.

As shown in FIG. 2, the item details include the item type (e.g., "shirt"), a brand (e.g., "Brand A"), and an inventory count (e.g., "5") for the item. It should be understood that any other item information may also or alternatively be displayed as part of the interactive element. Additionally or alternatively the displayed information can be customized according to real time or near real time contextual information, such as time, location, viewing audience, inventory status, etc. When content is described herein as being in real time, that content may be considered live streaming content as described above. Near real time content may represent content that is not necessarily live streamed, but is presented without being previously recorded. The contextual information may be determined based at least in part on one or more signals indicates the context of the multimedia content, the presented item(s), and/or the user device viewing the content. For example, location tracking information, internet protocol address information, historical customer interaction data, customer preferences, behavioral data, merchant preferences, etc. may be utilized to determine a context and information associated with that context may be utilized as described herein. With respect to determining where to display the interactive element 208, the payment processing service provider system may determine, utilizing item-recognition data, a relative location of the item as depicted in the multimedia content with respect to a viewable window of the user device. For example, the item-recognition data may indicate a location of the object as identified in the image data, and the interactive element 208 may be generated such that, when displayed, the interactive element 208 may be positioned near the object but not, in examples, over top of the object. This will allow a user to see both the object and the interactive element 208, and perceive that the object and the interactive element 208 are associated with each other, while the multimedia content is output. In examples, the first interactive element 208 may be placed as an interstitial within the same application in which the item is presented. In another example, the information regarding the item may be sent as an electronic message such as a text message or electronic mail, as an interstitial within another mobile and/or web application, as a pop-up notification, or on a display discoverable with a gesture (e.g., pinch gesture) or specific keypad, audio, visual, or haptic inputs.

As shown in FIG. 2, the multimedia content may continue to be output from step 1 or may otherwise progress. At step 2, the multimedia content may have progressed to a point where the first item 206 is no longer referenced (herein not displayed), and instead a second item 210 is referenced. Utilizing the item recognition techniques as described elsewhere herein, a time value associated with when the first item 206 ceases being referenced and when the second item 208 starts being referenced may be determined, and that information may be utilized to determine when to cease displaying the first interactive element 208 and when to start displaying a second interactive element 212 associated with the second item. It should also be appreciated that the location of the second item 210 with respect to the interactive window has changed from the location of the first item 206. This information may be utilized to configure the second interactive element 212 to be displayed in a different location than where the first interactive element 208 was displayed. By so doing, multiple interactive elements may be generated for multiple items in the same multimedia content, and each of the interactive elements may be specifically configured for the items associated with those interactive elements.

As shown in FIG. 2, the user interface may also include a "shopping cart" icon 214. The icon 14 may be utilized to provide a visual indication of a number of selected icons and/or other details about items that have been selected for at least potential purchase. The icon 214 may be selected to cause a purchasing user interface to be displayed. When displayed, item information, as described more fully herein, may be displayed for the selected items. Additionally, in examples, purchasing information associated with a user account of the user may also be displayed. Additionally, the user interface may include a "chat" icon 216, which may be utilized to allow for live chatting with a merchant, such as a merchant associated with the multimedia content. In these examples, the merchant may add an item, such as to a cart, using a physical sensor, e.g., barcode reader. Additionally, the user interface may include a barcode icon 218, which may be utilized to allow the user to use a barcode reader, such as a barcode reader associated with the user's phone, to scan, for example, coupons or other information associated with the items in question.

It should be understood that while the two items referenced in the multimedia content for the example shown in FIG. 2 are referenced at different times, this disclosure includes the ability to recognize two or more item referenced concurrently and the generation and display of multiple interactive elements at the same time.

FIG. 2 also depicts functionality associated with playback of multimedia content. That functionality may include selectable elements to control how and when the multimedia content is output via a user device. For example, the selectable elements may include a play element configured to cause the multimedia content to be output, a pause element configured to stop the multimedia content from being output, such as temporarily in examples, a volume element configured to control the volume of audio output and/or to mute audio output, and/or one or more playback speed elements configured to increase or decrease playback speed of the multimedia content and/or to output the multimedia content in reverse.

It should also be understood that while the example of FIG. 2 shows two interactive elements displayed at different times, this disclosure includes the generation and/or display of two interactive elements concurrently, such as when multiple items are depicted and/or described at the same time. In these examples, the item identification and location processes described herein may be utilized to determine where the multiple interactive elements will be located at the same time.

Figure 3:
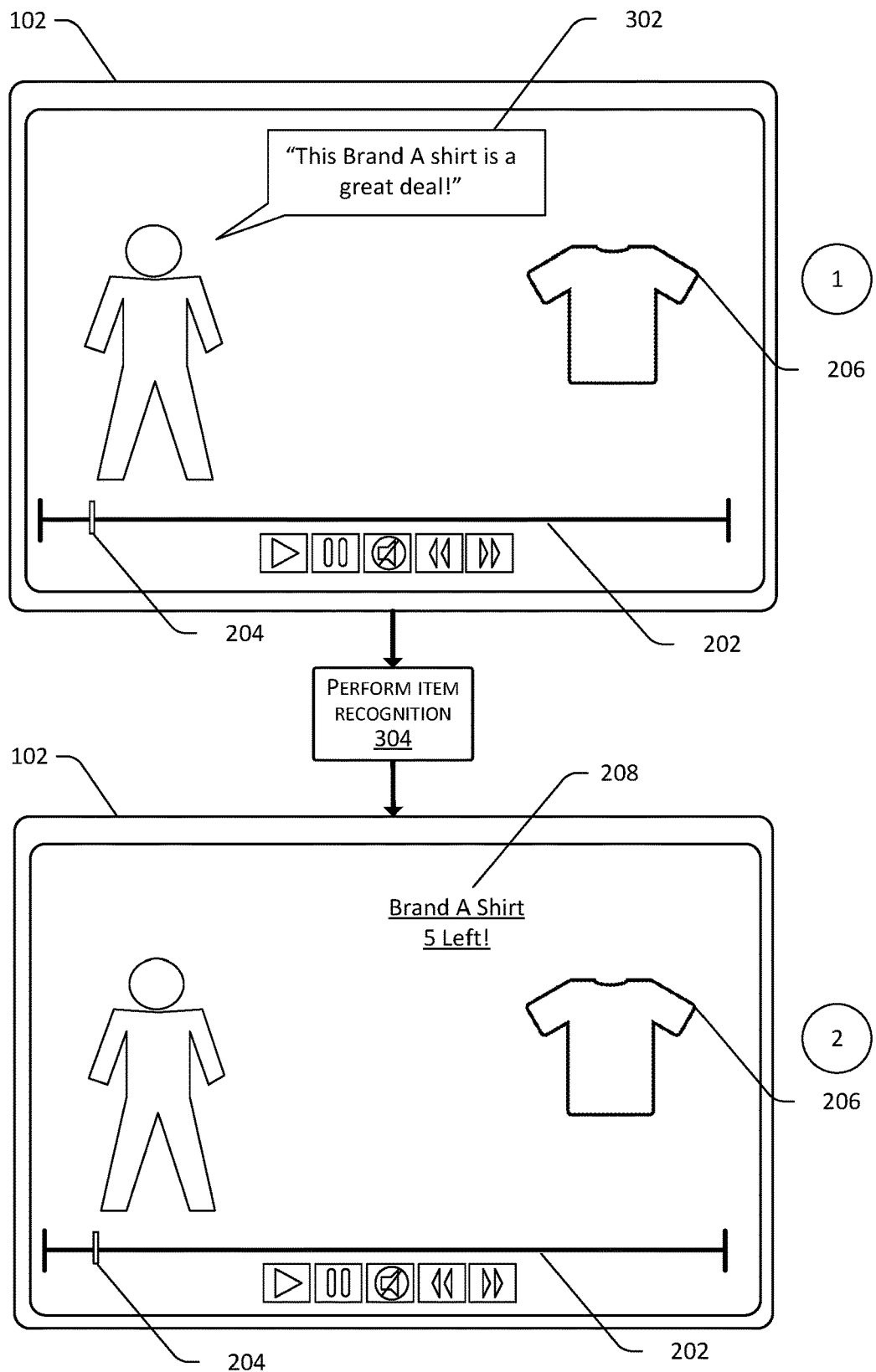
FIG. 3 illustrates an example conceptual diagram showing examples for item recognition for items referenced in multimedia content.

FIG. 3 illustrates an example conceptual diagram showing examples for item recognition for items referenced in multimedia content. FIG. 3 shows a buyer device 102, which may include the same or similar components and perform the same or similar functions as the buyer device 102 from FIG. 1.

At step 1, the buyer device 102 may be presenting multimedia content. As shown in FIG. 3, the multimedia content depicts a first item 206 along with a person that is speaking. The speech, in this example, is "this Brand A shirt is a great deal!" An item-recognition component may be utilized to identify the first item 206. For example, the item-recognition component may analyze the multimedia content and/or related data to identify one or more items referenced in the multimedia content. The item-recognition component may utilize image data of the multimedia content to identify items depicted in the image data. Such analysis may include the use of computer vision techniques to identify the presence of objects in given image data and then to identify the objects themselves and/or object categories to which the objects belong (e.g., shirt, pants, hat, watch, etc.). Additionally, or alternatively, when the multimedia content includes user speech, speech recognition and natural language understanding techniques may be utilized to identify the speech, generate text data representing the speech, and then determine an intent and/or purpose of the speech. By doing so, the item-recognition component 134 may identify items referenced in the multimedia content as well as, in examples, attributes of the items (e.g., color, size, brand, etc.). Additionally, or alternatively, the item-recognition component 134 may utilize metadata associated with the multimedia content and/or the merchant from which the content was provided to identify the items. For example, the merchant device 106 may provide metadata indicating the items referenced in the multimedia content. In examples, one or more other users may have commented on or otherwise provided information in relation to the multimedia content. In these and other examples, some or all of this data may be utilized by the item-recognition component 134 to identify the items and/or attributes associated with the items referenced in the multimedia content.

With respect to computer vision techniques, computer vision includes methods for acquiring, processing, analyzing, and understanding images and, in general, high-dimensional data from the real world in order to produce numerical or symbolic information, e.g., in the form of decisions. These techniques are described in more detail above with respect to FIG. 1. With respect to speech recognition, audio data corresponding to the user speech may be processed by an automatic speech recognition component, which may compare attributes of the audio data to reference attributes to determine that given sounds correspond to given words. In this way, the automatic speech recognition component may generate text data that represents the words of the user speech. A natural language understanding component may utilize the text data to determine keywords or other elements of the text data that correspond to a purpose for the speech. In the example in FIG. 3, this process may result in the system determining that the user speech of "this Brand A shirt is a great deal!" indicates that there is an item being displayed and that item is a shirt, with one of the shirt attributes being "Brand A." This information may be utilized to recognize the item and/or attributes associated with the item. In addition to the image analysis described above, computer vision techniques may be utilized to identify gestures of people depicted in multimedia content. These gestures may indicate that the person is describing a given item and/or identifying that item as being available for purchase. This information may be utilized to recognize items and/or to determine which items are available for purchase.

At step 2, the item-recognition data may be utilized by an interactive-element generator to generate and place an interactive element 208 associated with the first item 206. The interactive element 208 may include or otherwise reference some or all of the item-recognition data, such as the "Brand A" attribute, the item type "shirt," as well as other information such as current inventory count. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example.

Figure 4:
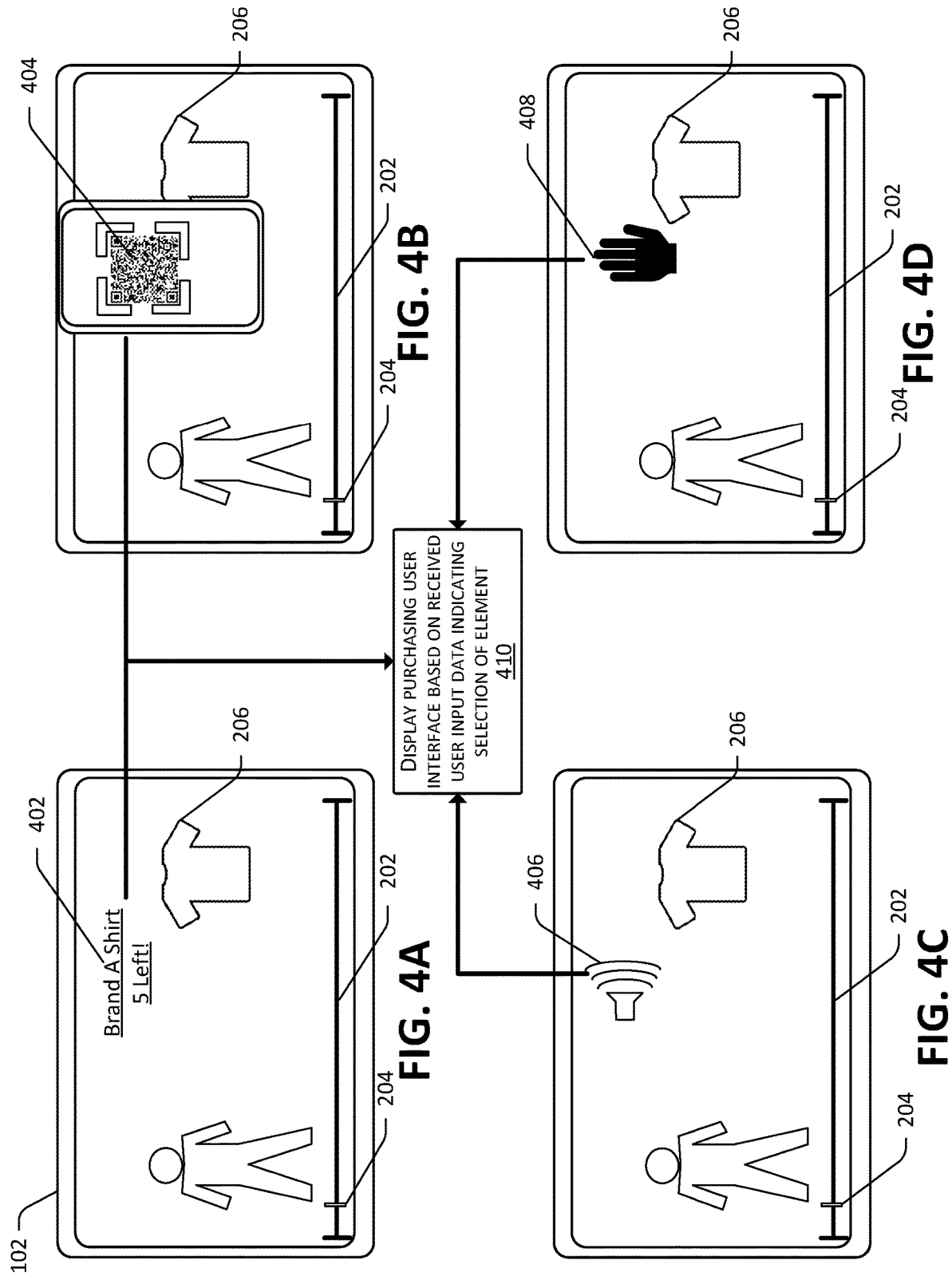
FIG. 4A illustrates an example user device displaying a first example interactive element overlaid on multimedia content.
FIG. 4B illustrates an example user device displaying a second example interactive element overlaid on multimedia content.
FIG. 4C illustrates an example user device displaying a third example interactive element overlaid on multimedia content.
FIG. 4D illustrates an example user device displaying a fourth example interactive element overlaid on multimedia content.

FIG. 4A illustrates an example user device 102 displaying a first example interactive element overlaid, or otherwise embedded, on multimedia content while the users are viewing the multimedia content. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example. In examples, the interactive element may be placed as an interstitial within the same application in which the item is presented. In another example, the information regarding the item may be sent as an electronic message such as a text message or electronic mail, as an interstitial within another mobile and/or web application, as a pop-up notification, or on a display discoverable with a gesture (e.g., pinch gesture) or specific keypad, audio, visual, or haptic inputs. The example provided in FIG. 4A shows a first interactive element 402 overlaid on multimedia content referencing a shirt. The first interactive element 402 may be a selectable element, such as a link, that may cause one or more actions to be performed when selected. In some examples, the first interactive element 402 may be considered selected when touch input is received at the user device 102 on a portion of the display of the user device 102 corresponding to where the first interactive element 402 is displayed. Other forms of user input such as clicking or keyboard navigation to the first interactive element 402 may also be received. In one embodiment, after the action is performed, the multimedia content may automatically and immediately be replaced with a summary image displaying the corresponding summary information on initiation of the swiping or dragging motion, such as the cart, with an optional link for the user to return to the multimedia content after reviewing the summary or otherwise performing other actions. In another embodiment, the cart may be shown as a picture in picture mode while the user navigates the multimedia content, or as a separate window alongside the multimedia content with the multimedia content adjusted to accommodate the separate window showing cart information. In yet another embodiment, the multimedia content is not replaced with another window and the summary information may be tracked as a background process and in a separate data structure with user and merchant identity and displayed after the multimedia content is over, for example. In one example, the cart information can also be sent as an electronic message, such as email or text, or within a mobile application of the user or merchant. The merchant may be interested in seeing such information to offer incentives to the customer and encourage the user to finalize the purchase.

The first interactive element 402 having the input type described in FIG. 4A may be selected and utilized for presentation of interactive elements based at least in part on a device type of the user device 102, user preference data, and/or as requested by a merchant and/or a provider of the multimedia content. For example, when the user device 102 has user input capabilities such as a touchscreen, a mouse, and/or a keyword, the first interactive element 402 may be selected for display on the user device 102. By way of additional example, user preference data may indicate that the user typically provides certain user input types that indicate the first interactive element 402 would be favorable for use as opposed to one or more other interactive element types.

FIG. 4B illustrates an example user device 102 displaying a second example interactive element overlaid on multimedia content. The example provided in FIG. 4B shows a second interactive element 404 overlaid on multimedia content referencing a shirt. The second interactive element 404 may be a readable element, such as a quick response code or a barcode, that may cause one or more actions to be performed when scanned and/or when another device indicates that it has scanned the quick reference code. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example. When generating such interactive elements 404, the actions can be defined and customized based on the device or user identity scanning the element. In some examples, the second interactive element 404 may be considered selected when the user device 102 and/or another device indicates that the quick response code has been scanned. For example, the quick response code may be displayed on a first device that is also displaying the multimedia content. A second device may scan the quick response code and the indication that the quick response code has been scanned may be received from the second device, in examples. It should be understood that while quick response codes are utilized here as an example, and other type of scannable, readable, and/or identifiable element may be utilized. In one embodiment, after the action is performed, the multimedia content may automatically and immediately be replaced with a summary image displaying the corresponding summary information on initiation of the swiping or dragging motion, such as the cart, with an optional link for the user to return to the multimedia content after reviewing the summary or otherwise performing other actions. In another embodiment, the cart may be shown as a picture in picture mode while the user navigates the multimedia content, or as a separate window alongside the multimedia content with the multimedia content adjusted to accommodate the separate window showing cart information. In yet another embodiment, the multimedia content is not replaced with another window and the summary information may be tracked as a background process and in a separate data structure with user and merchant identity and displayed after the multimedia content is over, for example. In one example, the cart information can also be sent as an electronic message, such as email or text, or within a mobile application of the user or merchant. The merchant may be interested in seeing such information to offer incentives to the customer and encourage the user to finalize the purchase.

The second interactive element 404 having the input type described in FIG. 4B may be selected and utilized for presentation of interactive elements based at least in part on a device type of the user device 102, user preference data, and/or as requested by a merchant and/or a provider of the multimedia content. For example, when the user device 102 lacks certain capabilities such as a touchscreen, a mouse, and/or a keyword, the second interactive element 404 may be selected for display on the user device 102. To this end, in one implementation, the second interactive element 404 is generated based on device characteristics of the device on which the content is displayed and/or another device used for reading the interactive element and thereby determining whether factors, such as form factor, operating system, reading capabilities, user preferences, etc., and accordingly configuring the second interactive element for that device. By way of additional example, user preference data may indicate that the user typically provides certain user input types that indicate the second interactive element 404 would be favorable for use as opposed to one or more other interactive element types.

FIG. 4C illustrates an example user device 102 displaying a third example interactive element overlaid on multimedia content. The example provided in FIG. 4C shows a third interactive element 406 overlaid on multimedia content referencing a shirt. The third interactive element 406 may be an indicator that voice input may be received to cause one or more actions to be performed. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example. In one embodiment, after the action is performed, the multimedia content may automatically and immediately be replaced with a summary image displaying the corresponding summary information on initiation of the swiping or dragging motion, such as the cart, with an optional link for the user to return to the multimedia content after reviewing the summary or otherwise performing other actions. In another embodiment, the cart may be shown as a picture in picture mode while the user navigates the multimedia content, or as a separate window alongside the multimedia content with the multimedia content adjusted to accommodate the separate window showing cart information. In yet another embodiment, the multimedia content is not replaced with another window and the summary information may be tracked as a background process and in a separate data structure with user and merchant identity and displayed after the multimedia content is over, for example. In one example, the cart information can also be sent as an electronic message, such as email or text, or within a mobile application of the user or merchant. The merchant may be interested in seeing such information to offer incentives to the customer and encourage the user to finalize the purchase.

In some examples, the third interactive element 406 may be considered selected when the user device 102 and/or a remote system such as a speech-processing system indicates that voice input indicates an intent to select the third interactive element 406. The audio input may include specific trigger words created specifically to enable an ecommerce experience between the merchant and the customers. For example, the audio input may only be received when the interactive element 406 is displayed on the device. The audio then is recorded from that time stamp to a future timestamp (e.g., end of the video or end of the indicator identifying the interactive element 406). Such time stamps may define respective time offsets from the start of an audio recording or from another particular position in the audio recording. During the recording, it is identified whether the customer provides an intent to purchase, e.g., through use of trigger words, such as "Add this item to my cart," "buy in green size small" and accordingly maps those trigger words to the specific interactive element, adds those specific items to an online shopping cart. The trigger words can also be predefined by the merchant or customer and stored in respective profiles, and algorithm that analyzes the audio recording to create an online shopping cart. In another example, the trigger words can also be counted or further filtered to determine additional specifics, such as how many items does the customer want, what color, what size, etc.

In some implementations, the methods and systems described herein can be integrated with voice services (e.g. Amazon's ALEXA®, Apple's SIRI®, or Microsoft's CORTANA®) through specific API calls to such services from within the multimedia interface. The present methods and systems can integrate with the "wake words" for invoking their respective voice service, ecommerce and fulfillment channels. For example, speaker recognition techniques may be utilized to determine user profiles associated with users that provide user utterances to user devices for performing one or more of the operations described herein. The determined user profile may be utilized to customize the interactive elements described herein, functionality that occurs when an interactive element is selected, and/or the information that is displayed in the purchasing user interface. The voice interface may also be utilized to provide the user inputs described herein. In addition, the voice interface may be associated with an online platform, and that platform may be utilized to fulfill item purchasing.

The third interactive element 406 having the input type described in FIG. 4C may be selected and utilized for presentation of interactive elements based at least in part on a device type of the user device 102, user preference data, and/or as requested by a merchant and/or a provider of the multimedia content. For example, when the user device 102 lacks certain capabilities such as a touchscreen, a mouse, and/or a keyword, the third interactive element 406 may be selected for display on the user device 102. By way of additional example, user preference data may indicate that the user typically provides certain user input types that indicate the third interactive element 406 would be favorable for use as opposed to one or more other interactive element types.

FIG. 4D illustrates an example user device 102 displaying a fourth example interactive element overlaid on multimedia content. The example provided in FIG. 4D shows a fourth interactive element 408 overlaid on multimedia content referencing a shirt. The fourth interactive element 408 may be an indicator that gesture input, when received, may cause one or more embedded actions to be performed. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example. The gesture may be a swiping or pinching gesture swiping gesture in which the interactive element is grabbed (e.g., by a finger press on a touchscreen or a cursor click and hold via mouse input) and dragged, swiped, clicked or tapped in a specific direction, to allow the embedded action (for example add item to a cart) to be initialized. In one embodiment, after the action is performed, the multimedia content may automatically and immediately be replaced with a summary image displaying the corresponding summary information on initiation of the swiping or dragging motion, such as the cart, with an optional link for the user to return to the multimedia content after reviewing the summary or otherwise performing other actions. In another embodiment, the cart may be shown as a picture in picture mode while the user navigates the multimedia content, or as a separate window alongside the multimedia content with the multimedia content adjusted to accommodate the separate window showing cart information. In yet another embodiment, the multimedia content is not replaced with another window and the summary information may be tracked as a background process and in a separate data structure with user and merchant identity and displayed after the multimedia content is over, for example. In one example, the cart information can also be sent as an electronic message, such as email or text, or within a mobile application of the user or merchant. The merchant may be interested in seeing such information to offer incentives to the customer and encourage the user to finalize the purchase.

In some examples, the fourth interactive element 408 may be considered selected when the user device 102 indicates that image data collected, for example, by a camera of the user device 102, depicts movement of a user in a pattern that corresponds to a reference pattern associated with selection of the fourth interactive element 408.

The fourth interactive element 408 having the input type described in FIG. 4D may be selected and utilized for presentation of interactive elements based at least in part on a device type of the user device 102, user preference data, and/or as requested by a merchant and/or a provider of the multimedia content. For example, when the user device 102 lacks certain capabilities such as a touchscreen, a mouse, and/or a keyword, the fourth interactive element 408 may be selected for display on the user device 102. By way of additional example, user preference data may indicate that the user typically provides certain user input types that indicate the fourth interactive element 408 would be favorable for use as opposed to one or more other interactive element types.

As can be seen in FIGS. 4A-4D, a user may provide user input indicating selection of the interactive elements 402-408. Regardless of the type of interactive element utilized, when user input data indicates selection of such interactive elements, a process may include displaying a purchasing user interface based at least in part on the received user input data indication selection of the interactive element. Additionally, the interactive elements may be adjusted for visibility, positioning, etc. and/or may be customized for content and interpreted when selected based on customer authentication. The modified view of interactive elements can be based on what we know about the customer, such as from historical account data, from cookie sessions of the consumer and the device they're using, etc. In this way the presentation of interactive elements may be customizable for the user in question.

FIGS. 5-12 illustrate processes for e-commerce tags in multimedia content and customized e-commerce tags in real-time multimedia content. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-4D, 13, and 14, although the processes may be implemented in a wide variety of other environments, architectures and systems.

Figure 5:
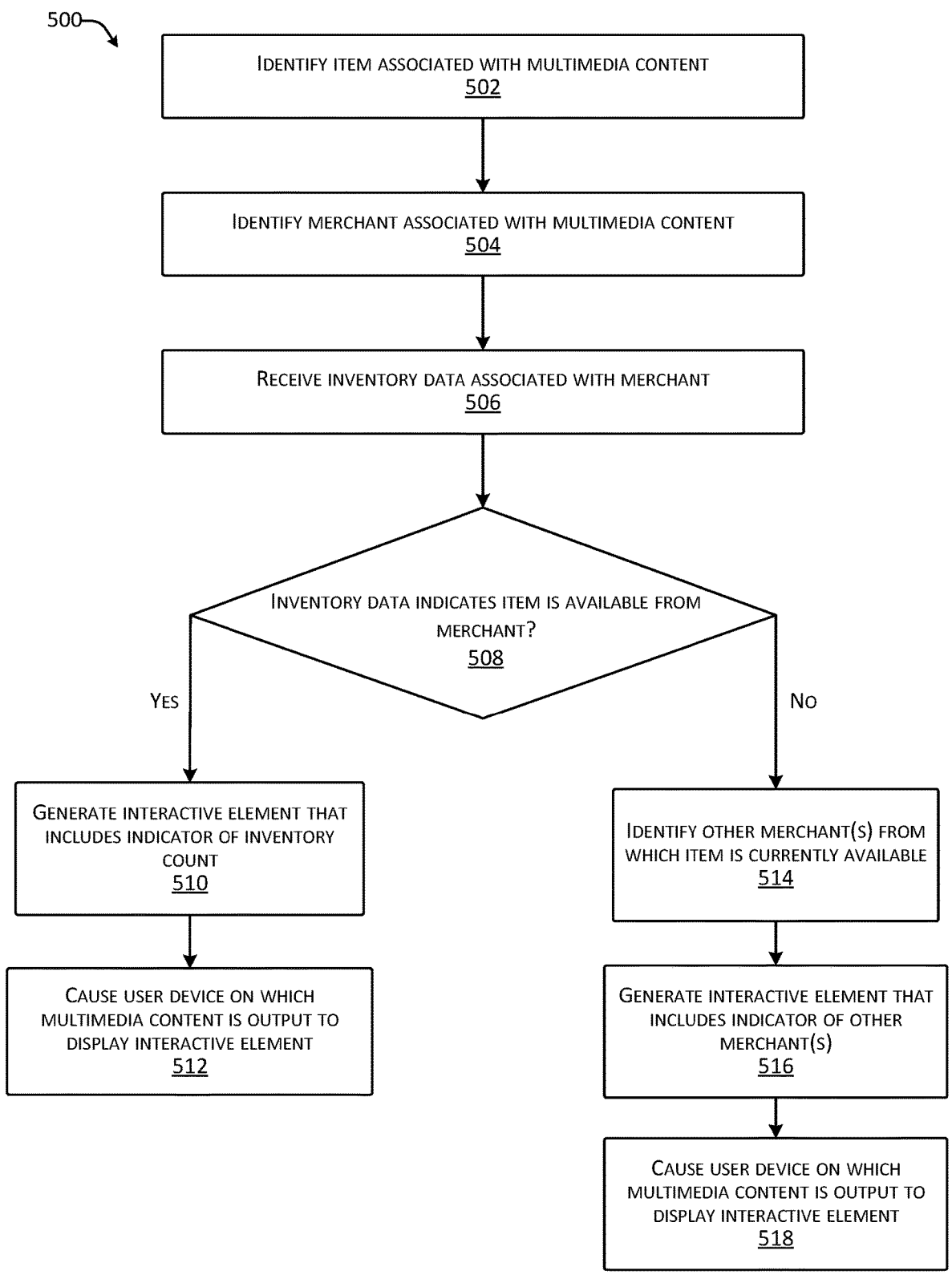
FIG. 5 illustrates an example process for determining and utilizing inventory data in real time in association with multimedia content representing an item.

FIG. 5 illustrates an example process 500 for determining and utilizing inventory data in real time in association with multimedia content representing an item. The order in which the operations or steps are described is not intended to be construed as a limitation, and any number of the described operations may be combined in any order and/or in parallel to implement process 500.

At block 502, the process 500 may include identifying an item associated with multimedia content. For example, an item-recognition component may analyze the multimedia content and/or related data to identify one or more items referenced in the multimedia content. For example, the item-recognition component may utilize image data of the multimedia content to identify items depicted in the image data. Such analysis may include the use of computer vision techniques to identify the presence of objects in given image data and then to identify the objects themselves and/or object categories to which the objects belong (e.g., shirt, pants, hat, watch, etc.). Additionally, or alternatively, when the multimedia content includes user speech, speech recognition and natural language understanding techniques may be utilized to identify the speech, generate text data representing the speech, and then determine an intent and/or purpose of the speech. By doing so, the item-recognition component may identify items referenced in the multimedia content as well as, in examples, attributes of the items (e.g., color, size, brand, etc.). Additionally, or alternatively, the item-recognition component may utilize metadata associated with the multimedia content and/or the merchant from which the content was provided to identify the items. For example, a merchant device may provide metadata indicating the items referenced in the multimedia content. In examples, one or more other users may have commented on or otherwise provided information in relation to the multimedia content. In these and other examples, some or all of this data may be utilized by the item-recognition component to identify the items and/or attributes associated with the items referenced in the multimedia content.

At block 504, the process 500 may include identifying a merchant associated with the multimedia content. For example, the multimedia content may include metadata and/or otherwise an indication of a source of the multimedia content, and that source may be associated with the merchant. In one implementation, the service provider provides the platform for one or more of: processing payments for one or more merchants, including this merchant, maintaining inventory, providing payroll services, providing lending services, etc.

At block 506, the process 500 may include receiving inventory data associated with the merchant. For example, a payment processing service provider may store inventory data associated with the merchant and/or a system associated with the merchant may provide the inventory data in real time or near real time to the payment processing service provider. In another example, the payment processing service provider may, through API calls or through webscraping, access third party inventory databases to obtain the most current inventory status.

At block 508, the process 500 may include determining whether the inventory data indicates the item is available from the merchant. For example, an item-information component may query the merchant system for inventory data indicating a current inventory of the item(s), such as at a time that the multimedia content is being output. In examples, the merchant system may return the inventory data and that inventory data may be utilized to inform a customer of a current inventory of items as available from the merchant. In other examples, such as where the inventory data indicates the item is out of stock and/or when user preferences indicate that a different merchant is preferred by the customer, an indication of the current inventory of one or more other merchants may be retrieved and displayed on the user device. In some examples, items comparable to the items being references may also be searched for availability at this merchant or comparable merchants, and/or, and appropriate substitutions at the same merchant or a different merchant may be recommended accordingly In instances where the inventory data indicates the item is available from the merchant, the process 500 may include, at block 510, generating an interactive element that includes an indicator of an inventory count of the item. For example, the interactive element may be generated as described herein and may include information associated with the item, such as identifying information about the item. In addition, an indicator of the current inventory count may also be displayed. In examples, the inventory count may be "live" or may otherwise change as customers purchase an instance of the item from the merchant. In this way, customer may perceive how quickly the item is selling. The generation and/or placement of interactive elements is described in more detail with respect to FIGS. 2 and 3, above. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example.

At block 512, the process 500 may include causing a user device on which the multimedia content is output to display the interactive element. The interactive element may be displayed, such as by way of an overlay, and may be displayed while the item is being referenced by the multimedia content, when output.

Returning to block 508, in instances where the inventory data indicates the item is not available from the merchant, the process 500 may include, at block 514, identifying one or more other merchants from which the item is currently available. For example, the payment processing service provider may have access to inventory data from one or more other merchants. An identifier of the item may be utilized to query inventory data from the one or more other merchants, and that information may be utilized by the payment processing service provider to determine which of the other merchants have the item currently in stock.

In other examples, the link associated with the interactive element may be broken or otherwise not available. In these examples, the item information may be utilized to find substitute items and/or merchants and links to purchasing user interfaces associated with those substitute merchants may be provided.

At block 516, the process 500 may include generating the interactive element that includes an indicator of the one or more other merchants. For example, the interactive element may provide an indication that the item is not currently in stock from the merchant associated with the multimedia content and may direct the customer to select the interactive element to see other merchants that do have the item in stock. In other examples, the interactive element may include an identifier of at least one of the other merchants that have the item in stock.

At block 518, the process 500 may include causing the user device on which the multimedia content is output to display the interactive element. For example, the interactive element may be displayed, such as by way of an overlay, and may be displayed while the item is being referenced by the multimedia content, when output.

Figure 6:
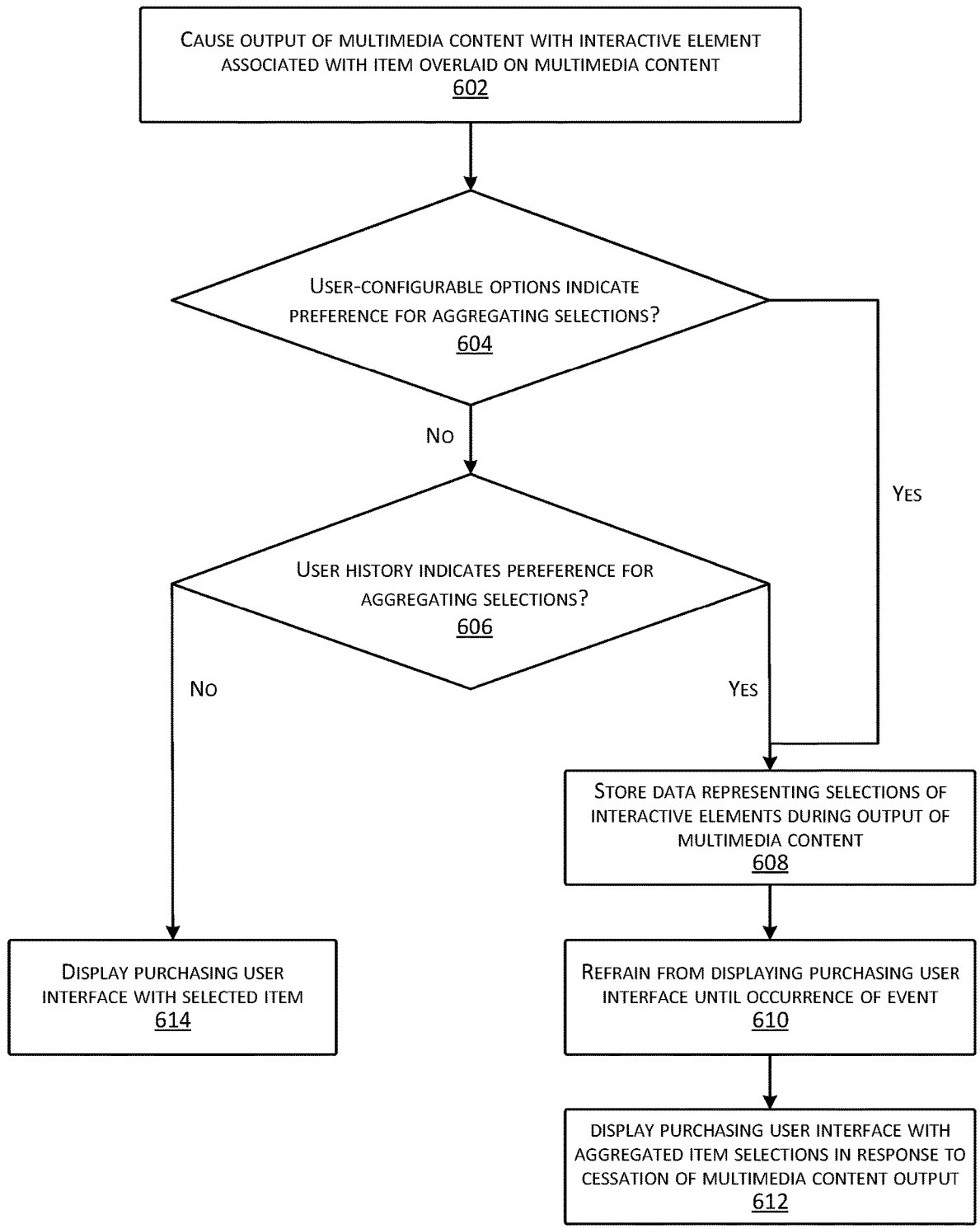
FIG. 6 illustrates an example process for determining whether to aggregate item selections during presentation of multimedia content.

FIG. 6 illustrates an example process 600 for determining whether to aggregate item selections during presentation of multimedia content. The order in which the operations or steps are described is not intended to be construed as a limitation, and any number of the described operations may be combined in any order and/or in parallel to implement process 600.

At block 602, the process 600 may include causing output of multimedia content with an interactive element associated with an item such that the interactive element is overlaid on the multimedia content. For example, the multimedia content may be output and may include images and/or audio that reference one or more items. While the multimedia content is output, or during at least a portion of the output multimedia content, the interactive element may also be displayed, for example as an overlay to the content, such that a user may see the multimedia content and the interactive element. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example.

At block 604, the process 600 may include determining whether one or more user-configurable options indicate a preference for aggregating item selections. For example, user-provided preferences may be utilized to determine whether a user desires to wait until the cessation of the multimedia content to have a purchasing user interface displayed.

In instances where the user-configurable options do not indicate the preference for aggregating item selections, the process 600 may include, at block 606, determining whether user history indicates a preference for aggregating selections. For example, historical transaction data may be utilized to determine if the user typically purchases more than one item referenced in the same multimedia content.

In instances where the user history indicates the preference for aggregating selections and/or where the user-configurable options indicate the preference for aggregating item selections, the process 600 may include, at block 608, storing data representing engagement with interactive elements during output of the multimedia content. For example, the system may determine to refrain from causing a purchasing user interface to be displayed in response to selection of an interactive element. Instead, the system may store data representing the selection(s) of interactive element(s) while the multimedia content is output. In still other examples, the purchasing interface may be displayed but may not interfere with the output of the multimedia content. In some examples, multiple multimedia content may be displayed, even in instances where the multimedia content is associated with different merchants and/or content providers, such as multiple videos, before the purchasing user interface is displayed.

At block 610, the process 600 may include refraining from displaying a purchasing user interface until occurrence of an event, such as cessation of the multimedia content, a request is received, a spending limit is exceeded, a designated time, etc. For example, instead of stopping the multimedia content from being output and/or causing another window to open that hinders the customer's ability to view the remainder of the multimedia content, the system may refrain from doing so, and may instead, in examples, cause an indictor to be presented while the multimedia content is displayed that indicates the item has been selected and/or a number of selected items.

At block 612, the process 600 may include displaying the purchasing user interface with aggregated item selections in response to cessation of the multimedia content. In this example, identifying information associated with each of the selected items may be displayed and/or may be available for display such that a customer may purchase all of the selected items at the same time.

Returning to block 606, in instances where the user history does not indicate the preference for aggregating selections, the process 600 may include, at block 614, displaying the purchasing user interface with the selected item. In this example, upon selection of the interactive element, the purchasing user interface may be displayed with identifying information for the item that was selected. The multimedia content may be caused to stop being output, or, in examples, the focus on the user device may be on the purchasing user interface instead of the multimedia content. Even though the user interface is described to be a purchase user interface with functionalities to allow payment for the selected items, it will be understood that the user interface can be configured to offer other views, such as summary information regarding selected items, additional information links regarding the selected items, separate purchase links for each of the selected items, etc.

Figure 7:
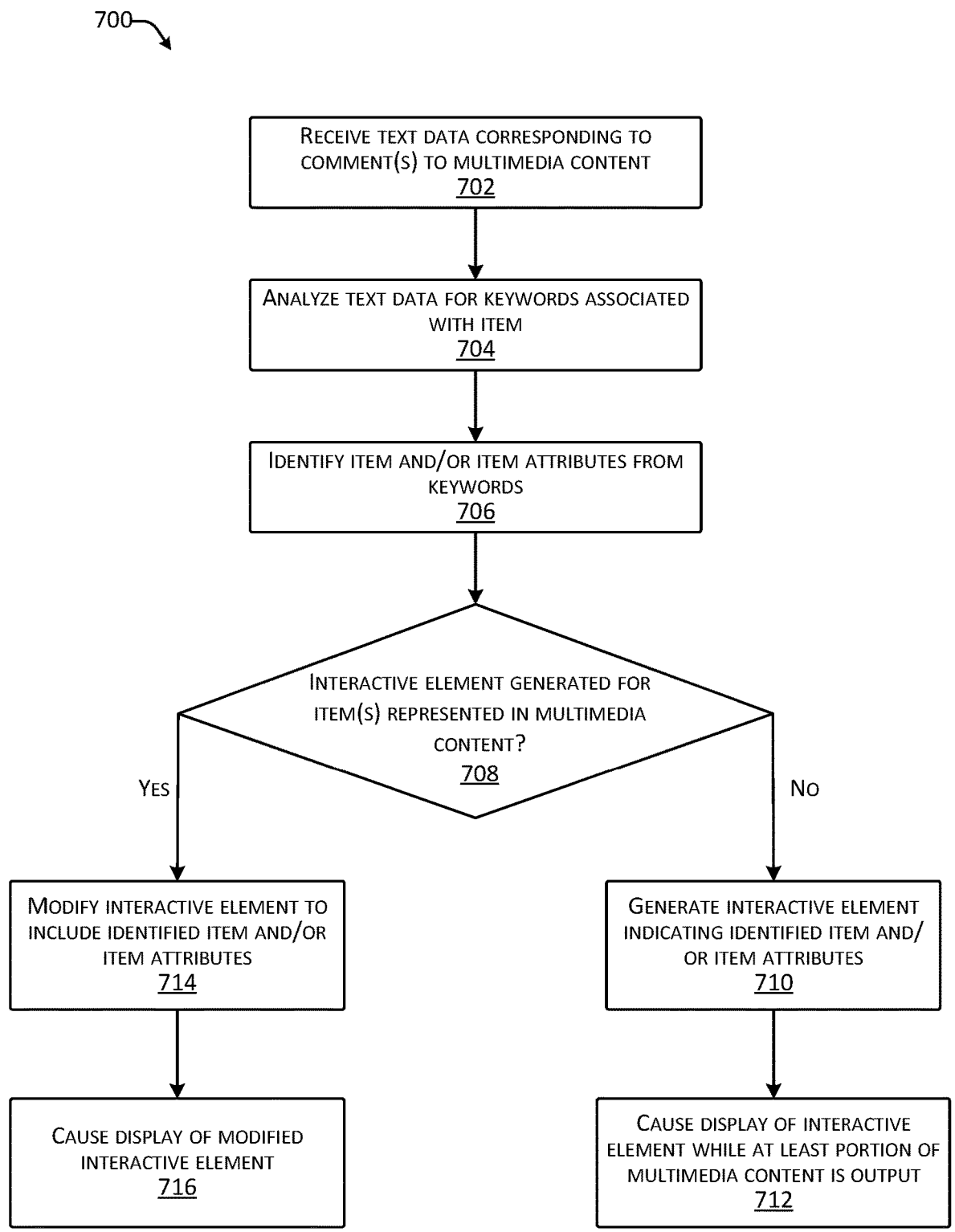
FIG. 7 illustrates an example process for modifying interactive elements based at least in part on user preference data.

FIG. 7 illustrates an example process 700 for modifying interactive elements based at least in part on user preference data. The order in which the operations or steps are described is not intended to be construed as a limitation, and any number of the described operations may be combined in any order and/or in parallel to implement process 700.

At block 702, the process 700 may include receiving text data corresponding to one or more comments to multimedia content. For example, a feedback component of the payment processing service provider system may be configured to receive feedback data associated with the interactive elements. In at least one example, one or more users can respond to content and provide feedback, for example, via comments (which can include text, images, emojis, etc.), interactions with a button or other actuation mechanism (e.g., like, dislike, funny, love, etc.), and so on, for example on a content provider's media platform (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The content provider can enable users of the media platform to interact with one another, (e.g., through creating messages, posting comments, etc.). In some embodiments, the content media platform may also refer to an application or webpage of an e-commerce or retail organization that offers products and/or services. Such websites can provide an online "form" to complete before or after the products or services are added to a virtual cart. The online form may include one or more fields to receive user interaction and engagement, such as questions regarding the order, feedback on previous orders. Such responses can be posted in near real-time. The feedback data may indicate positive and/or negative comments about the interactive elements, display of the interactive elements, and/or functionality associated with selection of the interactive elements. The feedback data may include the text data corresponding to such feedback.

At block 704, the process 700 may include analyzing the text data for keywords associated with the item. For example, natural language understanding techniques may be utilized to parse the text data and identify words that may be important to the context of the comment(s) and the multimedia content. By way of example, the comment "this shirt also comes in green" may be processed and annotated with tags to determine the semantic interpretation of the comment and that the comment is about an attribute of the shirt, here color, and the specific attribute is "green." Further additional identifiers can be used to determine identity of "this shirt."

At block 706, the process 700 may include identifying the item and/or attributes associated with the item from the keywords. For example, keywords that are associated with reference attributes of items may be identified and utilized to determine one or more of the attributes of the items. Those attributes may include any physical detail about the items and/or one or more details associated with the items.

At block 708, the process 700 may include determining whether an interactive element has been generated for one or more items represented in the multimedia content. For example, the multimedia content may have already been analyzed by the payment processing service provider system, which may have already generated the interactive element. In other examples, the multimedia content may not yet have been analyzed and/or an interactive element is not associated with the multimedia content.

In instances where the interactive element has not been generated, the process 700 may include, at block 710, generating the interactive element indicating the identified item and/or the item attributes. For example, an interactive-element generator of the payment processing service provider system may be configured to utilize the data received and/or determined by the item-recognition component and/or the item-information component to generate data representing an interactive element. The interactive element may be configured such that, when the multimedia content is output on the user device, the interactive element is also presented, such as in the form of an overlay. The interactive element may be, in examples, specific to the multimedia content, the items referenced therein, the item attributes, and/or user preferences. For example, utilizing the data received and/or determined as described herein, the interactive-element generator may determine a type of interactive element to generate. Interactive element types may include, for example, a selectable link, a quick response code ("QR code"), an indicator that voice input for selection of the interactive element is enabled, an indicator that gesture input for selection of the interactive element is enabled, etc. It should be understood that while several examples of element types have been provided herein, this disclosure includes any element type that allows user input to be received. Determining the type of interactive element to associate with given multimedia content may be based at least in part on a device type of the user device. For example, if the device type indicates that the device includes a camera, gesture-based interactive elements may be utilized, or if the device type indicates the device does not include a touchscreen, the interactive element may be configured to accept user input other than touchscreen input. Additionally, or alternatively, purchase history associated with a user profile that is being utilized to view the multimedia content may be utilized to determine past user input types, and that information may be utilized to determine the type of interactive element to be generated. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example.

In addition to the type of interactive element, the interactive-element generator may be configured to determine one or more other aspects associated with the interactive element, such as when to display the interactive element with respect to the multimedia content, where to display the interactive element with respect to a viewable window of a user device, an amount and/or type of item detail to display, and/or functionality that occurs when the interactive element is selected, for example. By way of example, the interactive-element generator may determine when to display the interactive element based at least in part on data indicating when the item begins being referenced in the multimedia content and when the item ceases being referenced. For example, given content may be two minutes in length, but the item may not start being referenced until the 30-second mark and then ceases being referenced at the 1-minute mark. Utilizing the item-recognition data described herein, the interactive-element generator may generate the interactive element to be configured to be displayed only during the time frame when the item is referenced. With respect to determining where to display the interactive element, the interactive-element generator may determine, utilizing the item-recognition data, a relative location of the item as depicted in the multimedia content with respect to a viewable window of the user device. For example, the item-recognition data may indicate a location of the object as identified in the image data, and the interactive element may be generated such that, when displayed, the interactive element may be positioned near the object but not, in examples, over top of the object. This will allow a user to see both the object and the interactive element, and perceive that the object and the interactive element are associated with each other, while the multimedia content is output.

At block 712, the process 700 may include causing display of the interactive element while at least a portion of the multimedia content s output. For example, the interactive element may be displayed, such as by way of an overlay, and may be displayed while the item is being referenced by the multimedia content, when output.

Returning to block 708, in instances where the interactive element has not been generated, the process 700 may include, at block 714, modifying the interactive element to include the identified item and/or the item attributes. For example, one or more portions of the interactive element may be dynamically changed and/or updated to include the identifier item and/or the item attributes. By way of example, an original interactive element may have included that the item was "black shirt," but with the information gathered and/or determined as described above, the interactive element may be changed to "black Brand A t-shirt." It should be understood that when this disclosure discusses an interactive element changing and/or being modified, such disclosure includes generating data representing an interactive element with the changed information. In some implementations, the modification may be triggered by inventory or availability status of the item, for example, if the t-shirt is not available in black, the color is updated to alternate colors. In another implementation, the modification may be triggered by customer or merchant-based rules (either explicitly specified by such parties or implicitly determined based on historical transactions) to modify item descriptions. For example, customer purchase history may be used to dynamically modify the item description to the size that the customer (viewing the content) usually buys. Alternatively, the merchant preferences may be used to modify the item description to the color the merchant wants to sell first. In another implementation, the modification can be initiated based on the contextual rules, where the context is derived from factors, such as location of the merchant, location of the customer, time of the day, what customers are currently buying, what merchants are currently selling, items with incentives such as coupons, and so on.

As described herein, the generation and/or modification of new interactive elements, which may be generated on-the-fly in some embodiments, that are used to display selectable links, quick reference codes, tags, etc. while multimedia content is being output on a screen of a user device represents a computer-centric solution to the computer-centric problem of online platform utilization. Further, the techniques described herein include the generation of new data, such as the link data described herein which is specific to given multimedia content and is configured to be displayed, in examples, differently for different user devices. By doing so, online platform marketplaces may be augmented such that information displayed to potential customers is more accurate, tailored to the specific customer, is presented in a time sensitive manner, and provides functionality that could only exist in a computer-centric environment. Commands to display selectable elements as described herein may also be configured to cause applications on user devices to initiate and/or activate and cause display of time-sensitive information, such as without user input. By so doing, a material change in the user devices themselves is achieved such that the user devices may perform functions that otherwise would not have been possible absent the computer-centric solutions described herein.

At block 716, the process 700 may include causing display of the modified interactive element. For example, the modified interactive element may be displayed, such as by way of an overlay, and may be displayed while the item is being referenced by the multimedia content, when output.

Figure 8:
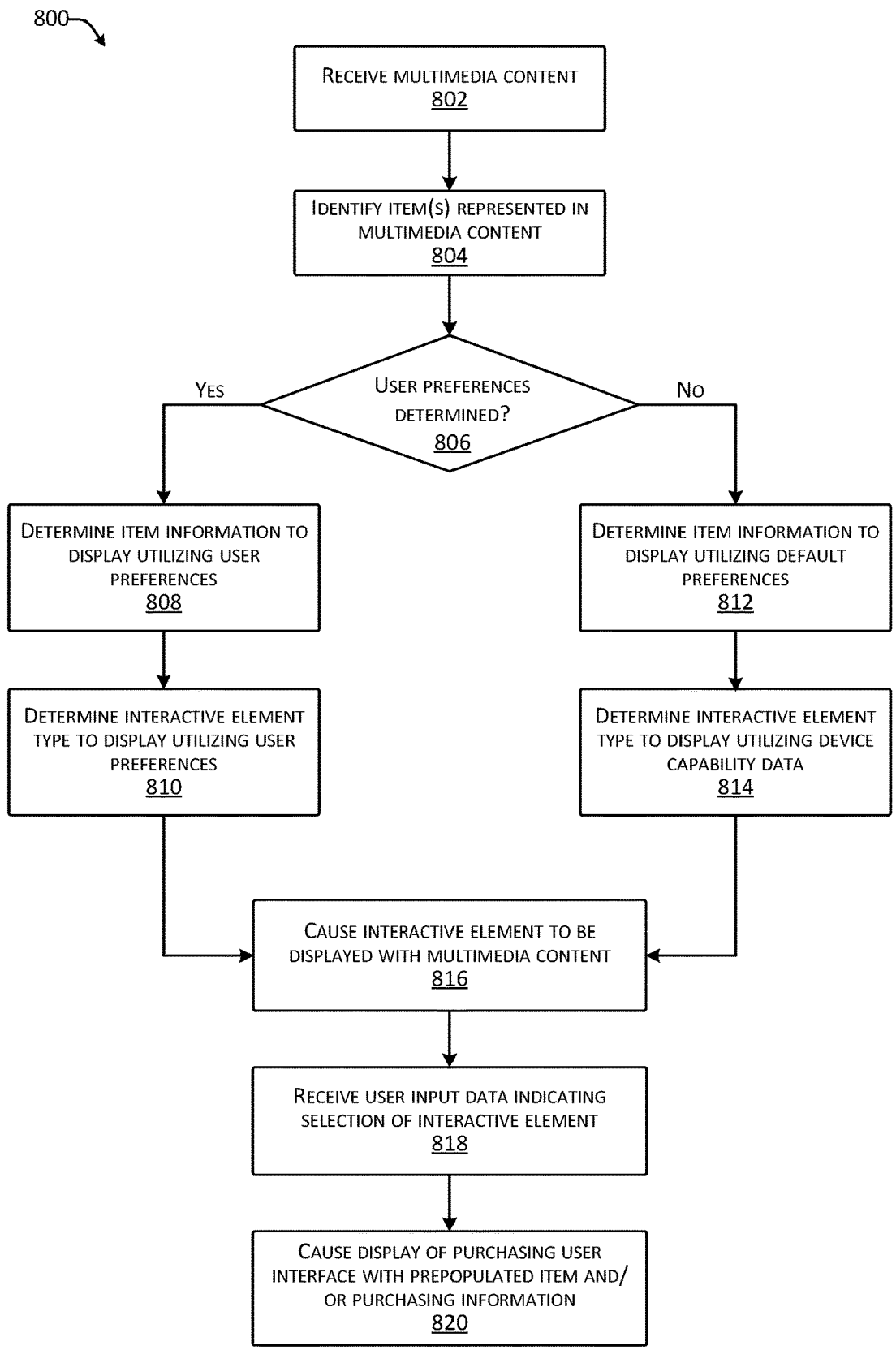
FIG. 8 illustrates an example process for utilizing user preferences for modifying display of item information and for pre-populating purchasing user interfaces.

FIG. 8 illustrates an example process 800 for utilizing user preferences for modifying display of item information and for pre-populating purchasing user interfaces. The order in which the operations or steps are described is not intended to be construed as a limitation, and any number of the described operations may be combined in any order and/or in parallel to implement process 800.

At block 802, the process 800 may include receiving multimedia content. For example, a content component of the payment processing service provider system may be configured to receive the multimedia content and/or to retrieve the multimedia content. For example, a merchant system or other system may push the multimedia content to the payment processing service provider system without a specific request for such content. In other examples, the content component may query one or more other systems for the multimedia content. In still other examples, the content component may receive an indication that multimedia content associated with a given merchant has been requested to be output on a user device associated with a customer. In these examples, the content component may query for an instance of the multimedia content and perform the techniques for generating an interactive element overlay, such as prior to the multimedia content being output on the user device.

At block 804, the process 800 may include identifying one or more items represented in the multimedia content. For example, an item-recognition component of the payment processing service provider system may analyze the multimedia content and/or related data to identify one or more items referenced in the multimedia content. For example, the item-recognition component may utilize image data of the multimedia content to identify items depicted in the image data. Such analysis may include the use of computer vision techniques to identify the presence of objects in given image data and then to identify the objects themselves and/or object categories to which the objects belong (e.g., shirt, pants, hat, watch, etc.). Additional details on the use of computer vision techniques is provided below. Additionally, or alternatively, when the multimedia content includes user speech, speech recognition and natural language understanding techniques may be utilized to identify the speech, generate text data representing the speech, and then determine an intent and/or purpose of the speech. By doing so, the item-recognition component may identify items referenced in the multimedia content as well as, in examples, attributes of the items (e.g., color, size, brand, etc.). Additionally, or alternatively, the item-recognition component may utilize metadata associated with the multimedia content and/or the merchant from which the content was provided to identify the items. For example, the merchant system may provide metadata indicating the items referenced in the multimedia content. In examples, one or more other users may have commented on or otherwise provided information in relation to the multimedia content. In these and other examples, some or all of this data may be utilized by the item-recognition component to identify the items and/or attributes associated with the items referenced in the multimedia content.

At block 806, the process 800 may include determining whether user preferences have been determined for a user profile being utilized to view the multimedia content. For example, user input and/or past transactions associated with a user profile may indicate one or more user preferences.

In instances where user preferences have been determined, the process 800 may include, at block 808, determining item information to display utilizing the user preferences. With respect to determining an amount and/or type of item detail to display, an interactive-element generator may utilize the item information from the item-information component to determine attributes associated with the referenced item. In some examples, all of the attributes may be included in the interactive element. However, in other examples, only a portion of the attributes may be included. For example, utilizing the historical data associated with the user profile, one or more user preferences may be received and/or determined, and those user preferences may inform the selection of which item information to include in the interactive element. For example, the historical data may indicate that the user associated with the user profile at issue purchases more items with a certain degree of item detail and/or certain types of item detail provided. By way of additional example, the historical data may be data associated with more than (or other than) the user profile at issue, such as historical data associated with customers of the merchant, customers of different merchants, and/or customers in general.

At block 810, the process 800 may include determining an interactive element type to display utilizing the user preferences. For example, utilizing the data received and/or determined as described herein, the interactive-element generator may determine a type of interactive element to generate. Interactive element types may include, for example, a selectable link, a QR code, an indicator that voice input for selection of the interactive element is enabled, an indicator that gesture input for selection of the interactive element is enabled, etc. It should be understood that while several examples of element types have been provided herein, this disclosure includes any element type that allows user input to be received. Determining the type of interactive element to associate with given multimedia content may be based at least in part on a device type of the user device. For example, if the device type indicates that the device includes a camera, gesture-based interactive elements may be utilized, or if the device type indicates the device does not include a touchscreen, the interactive element may be configured to accept user input other than touchscreen input. Additionally, or alternatively, purchase history associated with a user profile that is being utilized to view the multimedia content may be utilized to determine past user input types, preferred payment options (such as previously recorded payment card on file) and that information may be utilized to determine the type of interactive element to be generated. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example.

Returning to block 806, in instances where user preferences have not been determined, the process 800 may include, at block 812, determining item information to display utilizing default preferences. For example, a set of default preferences may be utilized to provide a given amount and/or type of item detail.

At block 814, the process 800 may include determining the interactive element type to display utilizing device capability data. This may be performed in the same or a similar manner to the operations described at block 810.

At block 816, the process 800 may include causing the interactive element to be displayed with the multimedia content. For example, the interactive element may be displayed, such as by way of an overlay, and may be displayed while the item is being referenced by the multimedia content, when output.

At block 818, the process 800 may include receiving user input data indicating selection of the interactive element. For example, a user may provide input to the user device, which may generate user input data indicating selection of the interactive element.

At block 820, the process 800 may include causing display of a purchasing user interface with prepopulated item information and/or purchasing information. For example, one or more user-input fields of the purchasing user interface may be prepopulated based at least in part on some or all of the data discussed herein. For example, data from the user profile may be utilized to prepopulate attributes and/or options associated with a selected item. Additionally, or alternatively, the item information determined from the multimedia content may be utilized to prepopulate the item attributes. Additionally, payment information from past transactions associated with the user profile may be utilized to prepopulate payment options, delivery addresses, etc. on the purchasing user interface. In this way, upon selection of the interactive element(s), the purchasing user interface may be automatically displayed and prepopulated with item and payment instrument information such that a user may need to only confirm the purchase without providing any additional input to acquire the item. In some examples, the payment processing service provider system may be associated with the purchasing user interface, and in these examples, the system may allow for items the user has expressed interest in to be stored in association with one or more applications associated with the system. The application may allow for synchronization across multiple merchants and may allow for finalization of purchasing, even across multiple merchants, at a later time. The application may also provide various payment fulfillment options, which may be based at least in part on the item being purchased, the merchant(s) in question, user preferences, etc. In some examples, fulfillment options may include a lending option, where the payment processing service provider system provides an option to provide a loan, which may allow the user to purchase the item on conditions of the loan. The option to provide lending options may be based at least in part on historical data associated with the customer, the merchant, and/or based on coupons or other identifying information indicating that lending is available for a given transaction.

Figure 9:
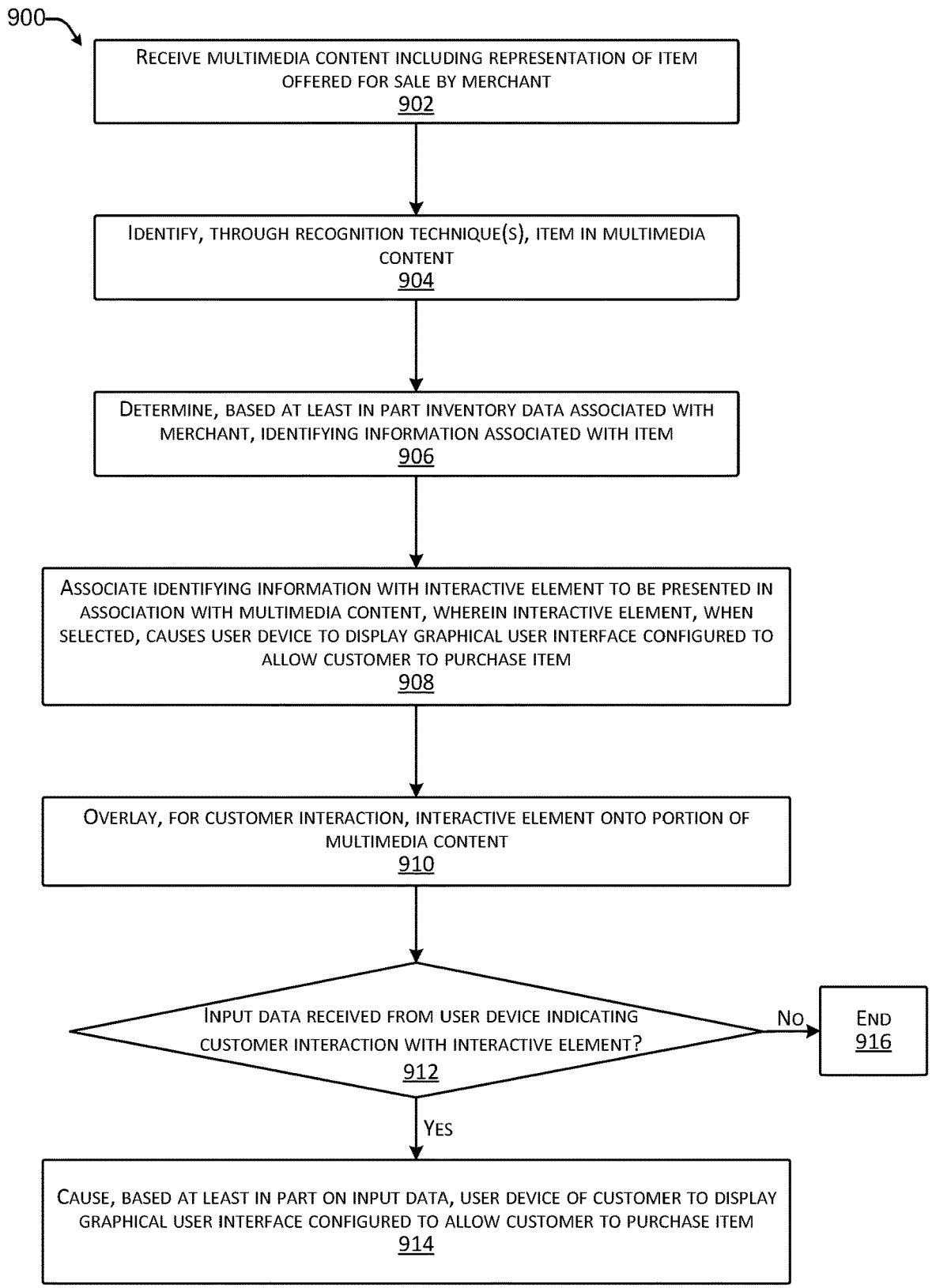
FIG. 9 illustrates an example process for e-commerce tags in multimedia content.

FIG. 9 illustrates an example process 900 for electronic commerce ("e-commerce") tags in multimedia content. The order in which the operations or steps are described is not intended to be construed as a limitation, and any number of the described operations may be combined in any order and/or in parallel to implement process 900.

At block 902, the process 900 may include receiving multimedia content including a representation of an item offered for sale by a merchant. For example, a content component of the payment processing service provider system may be configured to receive the multimedia content and/or to retrieve the multimedia content. For example, a merchant system or other system may push the multimedia content to the payment processing service provider system without a specific request for such content. In other examples, the content component may query one or more other systems for the multimedia content. In still other examples, the content component may receive an indication that multimedia content associated with a given merchant has been requested to be output on a user device associated with a customer. In these examples, the content component may query for an instance of the multimedia content and perform the techniques for generating an interactive element overlay, such as prior to the multimedia content being output on the user device.

At block 904, the process 900 may include identifying, through one or more recognition techniques, the item in the multimedia content. For example, an item-recognition component may utilize image data of the multimedia content to identify items depicted in the image data. Such analysis may include the use of computer vision techniques to identify the presence of objects in given image data and then to identify the objects themselves and/or object categories to which the objects belong (e.g., shirt, pants, hat, watch, etc.). Additional details on the use of computer vision techniques is provided below. Additionally, or alternatively, when the multimedia content includes user speech, speech recognition and natural language understanding techniques may be utilized to identify the speech, generate text data representing the speech, and then determine an intent and/or purpose of the speech.

By doing so, the item-recognition component may identify items referenced in the multimedia content as well as, in examples, attributes of the items (e.g., color, size, brand, etc.). Additionally, or alternatively, the item-recognition component may utilize metadata associated with the multimedia content and/or the merchant from which the content was provided to identify the items. For example, the merchant system may provide metadata indicating the items referenced in the multimedia content. In examples, one or more other users may have commented on or otherwise provided information in relation to the multimedia content. In these and other examples, some or all of this data may be utilized by the item-recognition component to identify the items and/or attributes associated with the items referenced in the multimedia content.

At block 906, the process 900 may include determining, based at least in part on inventory data associated with the merchant, identifying information associated with the item. For example, an item-information component of the payment processing service provider system may receive and/or determine item information associated with the items referenced in the multimedia content. For example, the merchant system may provide data indicating information associated with the referenced items. That information may include information related to attributes of the item (e.g., sizes, colors, brands, item types, item options, etc.). Additionally, or alternatively, the item-information component may query one or more systems for item information. By way of example, the item-information component may query the merchant system for inventory data indicating a current inventory of the item(s), such as at a time that the multimedia content is being output. In examples, the merchant system may return the inventory data and that inventory data may be utilized to inform a customer of a current inventory of items as available from the merchant. In other examples, such as where the inventory data indicates the item is out of stock and/or when user preferences indicate that a different merchant is preferred by the customer, an indication of the current inventory of one or more other merchants may be retrieved and displayed on the user device. The item-information component may also receive item information from the item-recognition component, such as when the item-recognition component determines one or more attributes of the item utilizing the techniques described herein. Some use cases may include modification when a user is purchasing antiques, jewelry, or gardening supplies. For example, when purchasing antiques, modifications to the display of information may be made based at least in part on the item being identified as unique or rare. In the jewelry example, item information associated with quality control of the item and/or certification of the item may be provided. In the gardening example, preferences based on location of items (such as for seasonal needs) may be utilized to determine what information will be displayed. In addition to item information display modification, the modifications based on item use case may include modifications to widgets that are displayed, types of interactions that are available, and/or modifications during the ordering process.

At block 908, the process 900 may include associating the identifying information with an interactive element to be presented in association with the multimedia content, wherein the interactive element, when selected, causes a user device to display a graphical user interface configured to allow a customer to purchase the item. For example, an interactive-element generator of the payment processing service provider system may be configured to utilize the data received and/or determined by the item-recognition component and/or the item-information component to generate data representing an interactive element. The interactive element may be configured such that, when the multimedia content is output on the user device, the interactive element is also presented, such as in the form of an overlay or other superimposition technique. The interactive element may be, in examples, specific to the multimedia content, the items referenced therein, the item attributes, and/or user preferences. For example, utilizing the data received and/or determined as described herein, the interactive-element generator may determine a type of interactive element to generate. Interactive element types may include, for example, a selectable link, a QR code, an indicator that voice input for selection of the interactive element is enabled, an indicator that gesture input for selection of the interactive element is enabled, etc. It should be understood that while several examples of element types have been provided herein, this disclosure includes any element type that allows user input to be received. Determining the type of interactive element to associate with given multimedia content may be based at least in part on a device type of the user device. For example, if the device type indicates that the device includes a camera, gesture-based interactive elements may be utilized, or if the device type indicates the device does not include a touchscreen, the interactive element may be configured to accept user input other than touchscreen input. Additionally, or alternatively, purchase history associated with a user profile that is being utilized to view the multimedia content may be utilized to determine past user input types, and that information may be utilized to determine the type of interactive element to be generated. When QR codes are utilized, the QR codes may have actions embedded therein, such as payment links, functionality to allow for adding of items to virtual carts, additional information regarding the item as issue, etc. The actions, which may be configured by the payment processing service provider system and/or the merchant, are embedded into the interactive element at issue. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example.

In addition to the type of interactive element, the interactive-element generator may be configured to determine one or more other aspects associated with the interactive element, such as when to display the interactive element with respect to the multimedia content, where to display the interactive element with respect to a viewable window of a user device, an amount and/or type of item detail to display, and/or functionality that occurs when the interactive element is selected, for example. By way of example, the interactive-element generator may determine when to display the interactive element based at least in part on data indicating when the item begins being referenced in the multimedia content and when the item ceases being referenced. For example, given content may be two minutes in length, but the item may not start being referenced until the 30-second mark and then ceases being referenced at the 1-minute mark. Utilizing the item-recognition data described herein, the interactive-element generator may generate the interactive element to be configured to be displayed only during the time frame when the item is referenced. With respect to determining where to display the interactive element, the interactive-element generator may determine, utilizing the item-recognition data, a relative location of the item as depicted in the multimedia content with respect to a viewable window of the user device. For example, the item-recognition data may indicate a location of the object as identified in the image data, and the interactive element may be generated such that, when displayed, the interactive element may be positioned near the object but not, in examples, over top of the object. This will allow a user to see both the object and the interactive element, and perceive that the object and the interactive element are associated with each other, while the multimedia content is output.

At block 910, the process 900 may include overlaying, for customer interaction, the interactive element onto a portion of the multimedia content. For example, the interactive element may be displayed, such as by way of an overlay, and may be displayed while the item is being referenced by the multimedia content, when output.

At block 912, the process 900 may include determining whether input data has been received indicating customer interaction with the interactive element. For example, the input data may correspond to user input to the customer device indicating selection of the interactive element.

At block 914, the process 900 may include, when the input data has been received, causing, based at least in part on the input data, the user device of the customer to display the graphical user interface configured to allow the customer to purchase the item. For example, a command generator of the payment processing service provider system may be configured to generate commands that, among other things, cause devices such as user devices to perform actions. For example, the command generator may also generate a command to cause the user device to display a purchasing user interface in response to selection of one or more interactive elements. The command generator may also generate a command to cause the user device to display information in the user interface. For example, one or more user-input fields of the purchasing user interface may be prepopulated based at least in part on some or all of the data discussed herein. For example, data from the user profile may be utilized to prepopulate attributes and/or options associated with a selected item. Additionally, or alternatively, the item information determined from the multimedia content may be utilized to prepopulate the item attributes. Additionally, payment information from past transactions associated with the user profile may be utilized to prepopulate payment options, delivery addresses, etc. on the purchasing user interface. In this way, upon selection of the interactive element(s), the purchasing user interface may be automatically displayed and prepopulated with item and payment instrument information such that a user may need to only confirm the purchase without providing any additional input to acquire the item.

At block 916, the process 900 may end if the input data is not received.

Additionally, or alternatively, the process 900 may include receiving inventory data from a system associated with the merchant, the inventory data indicating a current inventory of the item available for purchase from the merchant. The process 900 may also include associating a numerical representation of the current inventory with the interactive element, wherein overlaying the interactive element onto the portion of the multimedia content includes overlaying the numerical representation of the current inventory onto the portion of the multimedia content.

Additionally, or alternatively, the process 900 may include determining to refrain from causing display of the graphical user interface until the multimedia content ceases.

The process 900 may also include storing first data indicating that the interactive element was selected. The process 900 may also include receiving additional input data indicating customer interaction with an additional interactive element associated with an additional item in the multimedia content and storing second data indicating that the additional interactive element was selected. The process 900 may also include, based at least in part on the multimedia content ceasing and utilizing the first data and the second data, causing the graphical user interface to display purchase information for the item and the additional item.

Additionally, or alternatively, the process 900 may include determining an attribute of the item as presented in the multimedia content, the attribute including a selectable option associated with the item. The process 900 may also include receiving, from a system associated with the merchant, cost data indicating a cost of the item having the attribute. The process 900 may also include causing the graphical user interface to include the cost and causing the graphical user interface to include the attribute as prepopulated information in a user-input field.

Figure 10:
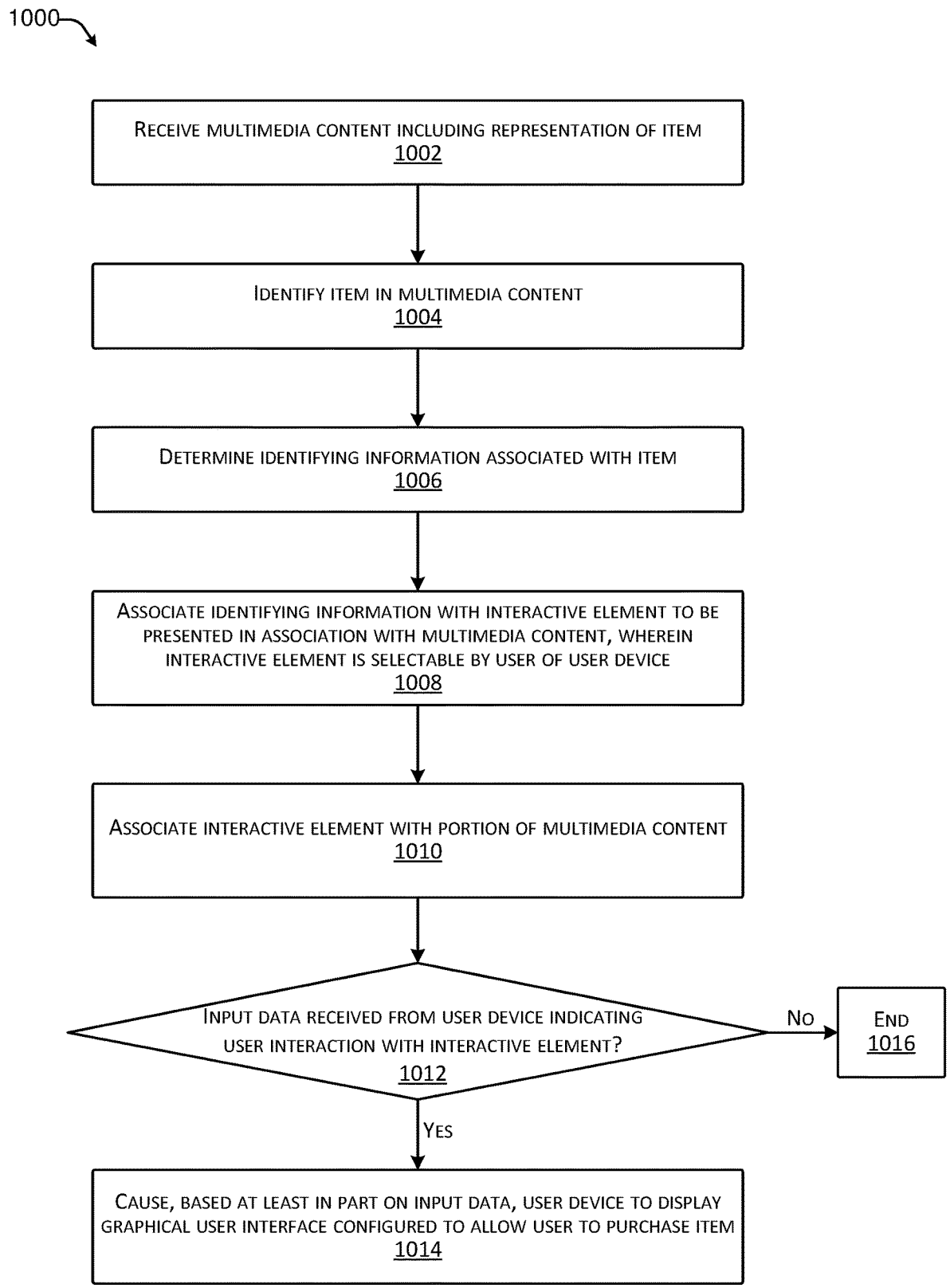
FIG. 10 illustrates another example process for e-commerce tags in multimedia content.

FIG. 10 illustrates another example process 1000 for electronic commerce ("e-commerce") tags in multimedia content. The order in which the operations or steps are described is not intended to be construed as a limitation, and any number of the described operations may be combined in any order and/or in parallel to implement process 1000.

At block 1002, the process 1000 may include receiving multimedia content including a representation of an item. For example, a content component of the payment processing service provider system may be configured to receive the multimedia content and/or to retrieve the multimedia content. For example, a merchant system or other system may push the multimedia content to the payment processing service provider system without a specific request for such content. In other examples, the content component may query one or more other systems for the multimedia content. In still other examples, the content component may receive an indication that multimedia content associated with a given merchant has been requested to be output on a user device associated with a customer. In these examples, the content component may query for an instance of the multimedia content and perform the techniques for generating an interactive element overlay, such as prior to the multimedia content being output on the user device.

At block 1004, the process 1000 may include identifying the item in the multimedia content. For example, an item-recognition component may utilize image data of the multimedia content to identify items depicted in the image data. Such analysis may include the use of computer vision techniques to identify the presence of objects in given image data and then to identify the objects themselves and/or object categories to which the objects belong (e.g., shirt, pants, hat, watch, etc.). Additional details on the use of computer vision techniques is provided below. Additionally, or alternatively, when the multimedia content includes user speech, speech recognition and natural language understanding techniques may be utilized to identify the speech, generate text data representing the speech, and then determine an intent and/or purpose of the speech. By doing so, the item-recognition component may identify items referenced in the multimedia content as well as, in examples, attributes of the items (e.g., color, size, brand, etc.). Additionally, or alternatively, the item-recognition component may utilize metadata associated with the multimedia content and/or the merchant from which the content was provided to identify the items. For example, the merchant system may provide metadata indicating the items referenced in the multimedia content. In examples, one or more other users may have commented on or otherwise provided information in relation to the multimedia content. In these and other examples, some or all of this data may be utilized by the item-recognition component to identify the items and/or attributes associated with the items referenced in the multimedia content.

At block 1006, the process 1000 may include determining identifying information associated with the item. For example, an item-information component of the payment processing service provider system may receive and/or determine item information associated with the items referenced in the multimedia content. For example, the merchant system may provide data indicating information associated with the referenced items. That information may include information related to attributes of the item (e.g., sizes, colors, brands, item types, item options, etc.). Additionally, or alternatively, the item-information component may query one or more systems for item information. By way of example, the item-information component may query the merchant system for inventory data indicating a current inventory of the item(s), such as at a time that the multimedia content is being output. In examples, the merchant system may return the inventory data and that inventory data may be utilized to inform a customer of a current inventory of items as available from the merchant. In other examples, such as where the inventory data indicates the item is out of stock and/or when user preferences indicate that a different merchant is preferred by the customer, an indication of the current inventory of one or more other merchants may be retrieved and displayed on the user device. The item-information component may also receive item information from the item-recognition component, such as when the item-recognition component determines one or more attributes of the item utilizing the techniques described herein.

At block 1008, the process 1000 may include associating the identifying information with an interactive element to be presented in association with the multimedia content, wherein the interactive element is selectable by a user of a user device. For example, an interactive-element generator of the payment processing service provider system may be configured to utilize the data received and/or determined by the item-recognition component and/or the item-information component to generate data representing an interactive element. The interactive element may be configured such that, when the multimedia content is output on the user device, the interactive element is also presented, such as in the form of an overlay. The interactive element may be, in examples, specific to the multimedia content, the items referenced therein, the item attributes, and/or user preferences. For example, utilizing the data received and/or determined as described herein, the interactive-element generator may determine a type of interactive element to generate. Interactive element types may include, for example, a selectable link, a quick response code ("QR code"), an indicator that voice input for selection of the interactive element is enabled, an indicator that gesture input for selection of the interactive element is enabled, etc. It should be understood that while several examples of element types have been provided herein, this disclosure includes any element type that allows user input to be received. Determining the type of interactive element to associate with given multimedia content may be based at least in part on a device type of the user device. For example, if the device type indicates that the device includes a camera, gesture-based interactive elements may be utilized, or if the device type indicates the device does not include a touchscreen, the interactive element may be configured to accept user input other than touchscreen input. Additionally, or alternatively, purchase history associated with a user profile that is being utilized to view the multimedia content may be utilized to determine past user input types, and that information may be utilized to determine the type of interactive element to be generated. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example.

In addition to the type of interactive element, the interactive-element generator may be configured to determine one or more other aspects associated with the interactive element, such as when to display the interactive element with respect to the multimedia content, where to display the interactive element with respect to a viewable window of a user device, an amount and/or type of item detail to display, and/or functionality that occurs when the interactive element is selected, for example. By way of example, the interactive-element generator may determine when to display the interactive element based at least in part on data indicating when the item begins being referenced in the multimedia content and when the item ceases being referenced. For example, given content may be two minutes in length, but the item may not start being referenced until the 30-second mark and then ceases being referenced at the 1-minute mark. Utilizing the item-recognition data described herein, the interactive-element generator may generate the interactive element to be configured to be displayed only during the time frame when the item is referenced. With respect to determining where to display the interactive element, the interactive-element generator may determine, utilizing the item-recognition data, a relative location of the item as depicted in the multimedia content with respect to a viewable window of the user device. For example, the item-recognition data may indicate a location of the object as identified in the image data, and the interactive element may be generated such that, when displayed, the interactive element may be positioned near the object but not, in examples, over top of the object. This will allow a user to see both the object and the interactive element, and perceive that the object and the interactive element are associated with each other, while the multimedia content is output. It should be understood that the interactive elements generated and utilized herein may be e-commerce tags. E-commerce tags can be selectable portions associated with multimedia content that may include e-commerce specific actions, such as purchasing actions, item information actions, and/or other shopping related actions, for example. Interactive elements may include any selectable element that may be presented to a user and be configured to receive user input indicating selection.

At block 1010, the process 1000 may include associating the interactive element with a portion of the multimedia content. For example, the item-recognition component and/or metadata may indicate when the item in question starts being referenced and when the item stops being referenced with respect to the multimedia content. The interactive element may be associated with that time frame.

At block 1012, the process 1000 may include determining whether input data has been received from the user device indicating user interaction with the interactive element. For example, the input data may correspond to user input to the customer device indicating selection of the interactive element.

At block 1014, the process 1000 may include, when the input data is received, causing, based at least in part on the input data, the user device to display the graphical user interface configured to allow the user to interact with the item. For example, a command generator of the payment processing service provider system may be configured to generate commands that, among other things, cause devices such as user devices to perform actions. For example, the command generator may also generate a command to cause the user device to display a purchasing user interface in response to selection of one or more interactive elements. The command generator may also generate a command to cause the user device to display information in the user interface. For example, one or more user-input fields of the purchasing user interface may be prepopulated based at least in part on some or all of the data discussed herein. For example, data from the user profile may be utilized to prepopulate attributes and/or options associated with a selected item. Additionally, or alternatively, the item information determined from the multimedia content may be utilized to prepopulate the item attributes. Additionally, payment information from past transactions associated with the user profile may be utilized to prepopulate payment options, delivery addresses, etc. on the purchasing user interface. In this way, upon selection of the interactive element(s), the purchasing user interface may be automatically displayed and prepopulated with item and payment instrument information such that a user may need to only confirm the purchase without providing any additional input to acquire the item.

At block 1016, the process 1000 may end if input data is not received.

Additionally, or alternatively, the process 1000 may include determining a first time indicator for when the representation of the item is referenced in the multimedia content. The process 1000 may also include determining a second time indicator for when the representation of the item ceases being referenced in the multimedia content. The process 1000 may also include causing the interactive element to be displayed in association with the multimedia content from the first time indicator to the second time indicator as the multimedia content is output via the user device.

Additionally, or alternatively, the process 1000 may include determining a location, on a viewable window of the user device, where the item is presented during output of the multimedia content by the user device. The process 1000 may also include causing the interactive element to be presented in association with the location as the multimedia content is output via the user device.

Additionally, or alternatively, the process 1000 may include determining a portion of the multimedia content where the representation is displayed. The process 1000 may also include identifying an attribute of the item utilizing image data from the portion of the multimedia content. The process 1000 may also include including the attribute as at least a portion of the identifying information.

Additionally, or alternatively, the process 1000 may include receiving text data representing one or more comments associated with the multimedia content. The process 1000 may also include identifying, from the text data, one or more keywords associated with the item. The process 1000 may also include modifying the identifying information based at least in part on the one or more keywords.

Additionally, or alternatively, the process 1000 may include determining, when the user input is received, that the item is unavailable from the first merchant. The process 1000 may also include identifying one or more second merchants from which the item is available. The process 1000 may also include causing the graphical user interface to include an identifier of the one or more second merchants.

Additionally, or alternatively, the process 1000 may include receiving inventory data from a system associated with a merchant that sells the item, the inventory data indicating a current inventory of the item available for purchase from the merchant. The process 1000 may also include determining that the current inventory is less than a threshold inventory value. The process 1000 may also include sending, based at least in part on the current inventory being less than the threshold inventory value, a recommendation for a substitute item that is currently in stock. The substitute item may include a variation on the item depicted in the multimedia content. For example, one or more attributes may differ such as the color, size, likeness, etc. The data indicating the substitute may be saved in a catalog such that the same interactive element, when selected, directs to the substitution instead of the original item. The catalog data may provide indications of associations between items, interactive elements, and substitute items and/or associations indicating substitute merchants.

Additionally, or alternatively, the process 1000 may include generating first data representing the interactive element, the first data being separate from the multimedia content. The process 1000 may also include receiving an indication that the multimedia content has been requested to be output on the user device. The process 1000 may also include in response to the indication, causing the first data to be overlaid on the multimedia content while the multimedia content is output on the user device. In this way, even when the multimedia content is changed and/or if the multimedia content becomes inoperable, the item information and link associated with the interactive element may be retained and utilized. In these examples, even in situations where item information changes, such as over time, the multimedia content and interactive element(s) associated therewith may be still associated with updated inventory information. This may decrease or eliminate the need for changes to the multimedia content itself. Additionally, metadata associated with user interactions with interactive elements and/or metadata associated with the items and/or interactive elements themselves may be separate from purchase data associated with purchasing of the items.

Additionally, or alternatively, the process 1000 may include receiving item information about the item from a system associated with a merchant. The process 1000 may also include receiving, via the graphical user interface, payment information from the user device. The process 1000 may also include initiating a payment transaction for purchase of the item utilizing the payment information and the item information.

Additionally, or alternatively, the process 1000 may include determining a geographic region associated with the user device when the user input data is received. The process 1000 may also include determining a current inventory for the item in the geographic region, wherein causing the interactive element to be displayed includes causing an indication of the current inventory to be displayed.

Additionally, or alternatively, the process 1000 may include analyzing, using one or more computer vision processes and prior to sending an instance of the multimedia content to the user device, image data of the multimedia content to identify objects depicted in the multimedia content. The process 1000 may also include generating, prior to sending the instance of the multimedia content, first data including the interactive element, wherein the interactive element is based at least in part on the objects as identified and sending, to the user device, the first data and the instance of the multimedia content.

Additionally, or alternatively, the process 1000 may include receiving, from the user device and while the multimedia content is being output, image data depicting a user of the user device making a gesture, the user input data including the image data. The process 1000 may also include determining a movement pattern of the gesture based at least in part on analysis of the image data. The process 1000 may also include determining that the movement pattern corresponds to a reference movement pattern indicating that the user has provided input to select the item for purchase. The process 1000 may also include causing the action to be performed based at least in part on the movement pattern corresponding to the reference movement pattern.

Additionally, or alternatively, the process 1000 may include determining, utilizing speech recognition processes performed on audio data of the multimedia content, text data indicating a speech portion of the multimedia content. The process 1000 may also include identifying one or more characteristics of the item based at least in part on the text data. The process 1000 may also include prepopulating at least one field of the graphical user interface with the one or more characteristics.

Figure 11:
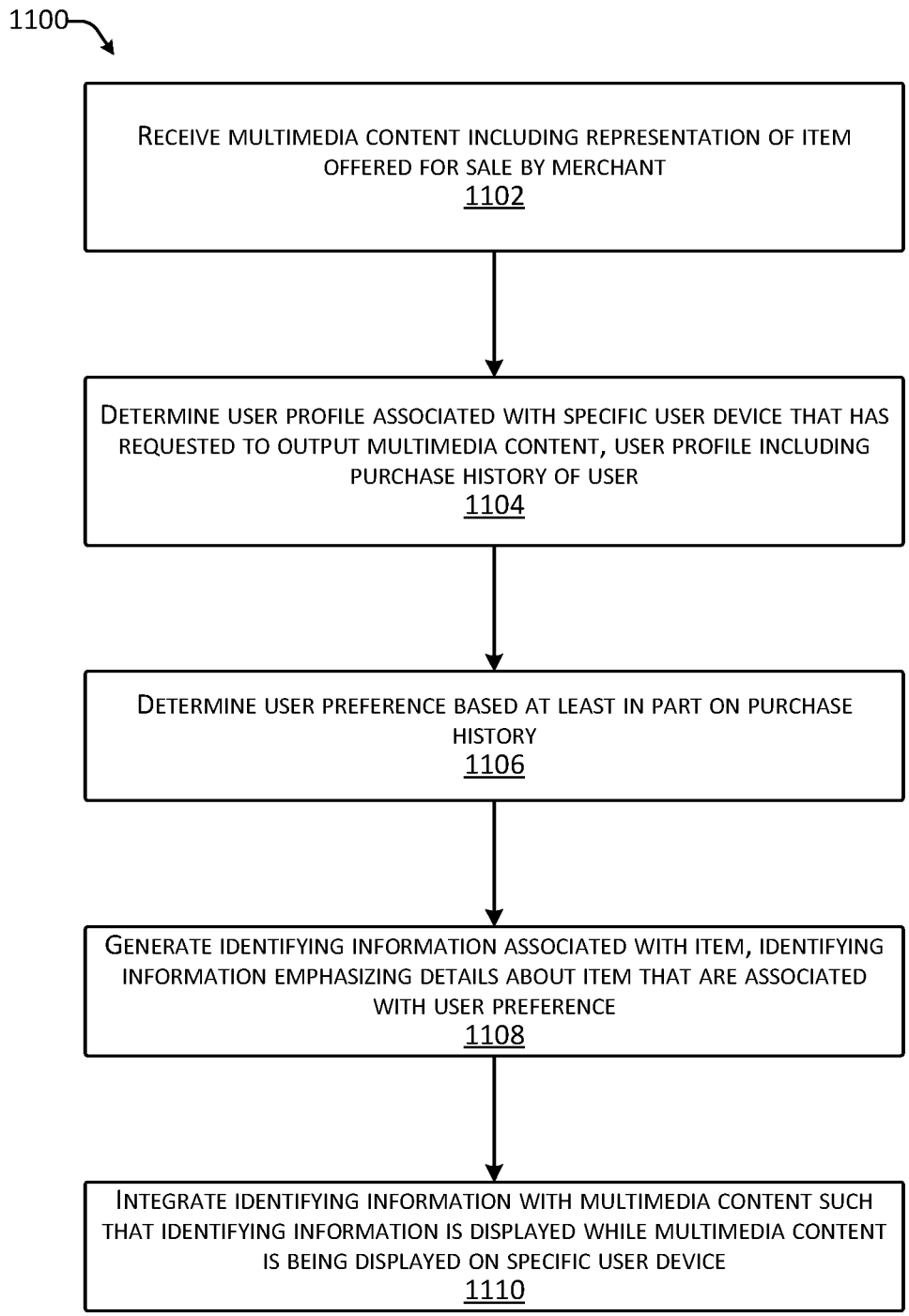
FIG. 11 illustrates an example process for customized e-commerce tags in real-time multimedia content.

FIG. 11 illustrates an example process 1100 for customized e-commerce tags in real-time multimedia content. The order in which the operations or steps are described is not intended to be construed as a limitation, and any number of the described operations may be combined in any order and/or in parallel to implement process 1100.

At block 1102, the process 1100 may include receiving multimedia content including a representation of an item offered for sale by a merchant. For example, a content component of the payment processing service provider system may be configured to receive the multimedia content and/or to retrieve the multimedia content. For example, a merchant system or other system may push the multimedia content to the payment processing service provider system without a specific request for such content. In other examples, the content component may query one or more other systems for the multimedia content. In still other examples, the content component may receive an indication that multimedia content associated with a given merchant has been requested to be output on a user device associated with a customer. In these examples, the content component may query for an instance of the multimedia content and perform the techniques for generating an interactive element overlay, such as prior to the multimedia content being output on the user device.

In instances where the multimedia content has been received, the process 1100 may include, at block 1104, determining a user profile associated with a specific user device that has requested to output the multimedia content, the user profile including a purchase history of a user. For example, the user device from which a request to view the multimedia content was received may be associated with a device identifier. The device identifier may be associated with a given user profile. In other examples, access information associated with the user profile may be utilized to log in or otherwise access a platform utilized for viewing the multimedia content, and that access information may be utilized to identify the user profile.

At block 1106, the process 1100 may include determining a user preference based at least in part on the purchase history. For example, the purchase history may indicate one or more aspects of the user profile and/or ways in which a user associated with the user profile interacts with devices and/or platforms. By way of example, purchase history may indicate typical sizes that have been ordered, item quantities, item colors, brands, item options, payment information, user inputs, user feedback, user associations with other accounts, discount information, loyalty membership, etc. Some or all of this information may be utilized to determine one or more user preferences.

At block 1108, the process 1100 may include generating identifying information associated with the item, the identifying information emphasizing details about the item that are associated with the user preference. For example, determining the type of interactive element to associate with given multimedia content may be based at least in part on the user preference. The purchase history associated with the user profile that is being utilized to view the multimedia content may be utilized to determine past user input types, and that information may be utilized to determine the type of interactive element to be generated. In addition to the type of interactive element, an interactive-element generator may utilize the item information from the item-information component to determine attributes associated with the referenced item. In some examples, all of the attributes may be included in the interactive element. However, in other examples, only a portion of the attributes may be included. For example, utilizing the historical data associated with the user profile, one or more user preferences may be received and/or determined, and those user preferences may inform the selection of which item information to include in the interactive element. For example, the historical data may indicate that the user associated with the user profile at issue purchases more items with a certain degree of item detail and/or certain types of item detail provided. By way of additional example, the historical data may be data associated with more than (or other than) the user profile at issue, such as historical data associated with customers of the merchant, customers of different merchants, and/or customers in general. Interactive elements may include any selectable element that may be presented to a user and be configured to receive user input indicating selection. E-commerce tags can be a type of interactive element and may be selectable portions associated with multimedia content that may include e-commerce specific actions, such as purchasing actions, item information actions, and/or other shopping related actions, for example.

With respect to determining the functionality that will occur upon selection of the interactive element, the interactive-element generator may receive and/or determine data indicating user preferences for selection functionality. Those user preferences may indicate that a user desires to have a purchasing user interface displayed upon selection of an interactive element. Those user preferences may, in other examples, indicate that a user desires to have the purchasing user interface displayed only after cessation of the multimedia content or otherwise at some time after selection of a given interactive element. This situation may allow the user to select multiple interactive elements corresponding each to different items before being presented with a purchasing user interface. In these examples, the interactive elements may be configured to be selected and then data indicating those selections may be saved until cessation of the multimedia content.

At block 1110, the process 1100 may include integrating the identifying information with the multimedia content such that the identifying information is displayed while the multimedia content is being displayed on the specific user device. For example, data representing the interactive element may be generated and may be associated with the multimedia content such that, when the multimedia content is displayed, the interactive element is also displayed. The identifying information may be a part of the interactive element such that the identifying information is displayed when the multimedia data is displayed. In other examples, the identifying information may not be included in the interactive element but may be associated with the interactive element such that, when a user interacts with the interactive element, the identifying information is displayed for the user.

Additionally, or alternatively, the process 1100 may include receiving transaction data associated with past transactions of the user profile. The process 1100 may also include utilizing the transaction data for processing past transactions and determining the purchase history based at least in part on the transaction data. The process 1100 may also include determining one or more attributes associated with the past transactions, the one or more attributes indicating purchasing trends of the user profile. The process 1100 may also include determining an attribute about the item that corresponds to the one or more attributes, wherein generating the identifying information emphasizing the details about the item includes emphasizing the attribute about the item that corresponds to the one or more attributes.

Additionally, or alternatively, the process 1100 may include determining that historical user input to the specific user device is of a specific input type, the specific input type selected from at least one of a touchscreen input type, a click input type, a quick response code input type, an audible input type, or a gesture input type, wherein the user preference includes the specific input type. The process 1100 may also include causing the identifying information to be presented as an interactive element configured to receive the specific input type.

Additionally, or alternatively, the process 1100 may include determining a degree of item detail associated with items purchased in past transactions associated with the user profile, wherein the user preference indicates the degree of item detail. The process 1100 may also include causing the identifying information to be displayed on the specific user device, the identifying information including the degree of item detail.

Additionally, or alternatively, the process 1100 may include determining, from the purchase history, one or more item categories of items previously purchased in association with the user profile, the user preference indicating the one or more item categories. The process 1100 may also include determining that the item corresponds to at least one of the one or more item categories, wherein generating the identifying information is based at least in part on determining that the item corresponds to the at least one of the one or more item categories.

Additionally, or alternatively, the process 1100 may include determining, from the purchase history of the user profile, an amount of time that a selectable element has been displayed previously prior to receiving user input indicating selection of the selectable element to purchase items. The process 1100 may also include causing an interactive element to be displayed for at least the historical amount of time while the multimedia content is output.

Additionally, or alternatively, the process 1100 may include determining, from the purchase history of the user profile, payment instrument information utilized in past payment transactions. The process 1100 may also include receiving input data indicating selection of the item to purchase and causing, based at least in part on the input data, a user device to display a graphical user interface configured to allow the user to purchase the item, the graphical user interface including an input field with the payment instrument information prepopulated.

Additionally, or alternatively, the process 1100 may include receiving first data corresponding to the purchase history from one or more merchants, the purchase history indicating items associated with past transactions of the user profile and determining one or more attributes associated with the items. The process 1100 may also include receiving input data indicating selection of the item to purchase and causing, based at least in part on the input data, a user device to display a graphical user interface configured to allow the user to purchase the item, the graphical user interface including an input field with one or more item-related options prepopulated based at least in part on the one or more attributes.

Additionally, or alternatively, the process 1100 may include determining, from the purchase history of the user profile, merchants that have provided items to a user associated with the user profile. The process 1100 may also include determining that a first quantity of transactions with a first merchant of the merchants exceeds a second quantity of transactions with a second merchant of the merchants. The process 1100 may also include determining that the first merchant offers the item for sale and determining that the second merchant offers the item for sale, and wherein the identifying information includes an identifier of the first merchant instead of the second merchant based at least in part on the first quantity of transactions exceeding the second quantity of transactions.

Additionally, or alternatively, the process 1100 may include receiving, from a user device associated with the user profile, feedback data indicating interaction of a user with the identifying information. The process 1100 may also include modifying the user preference based at least in part on the feedback data and causing modified identifying information to be displayed on the user device based on the user preference as modified.

Additionally, or alternatively, the process 1100 may include determining that historical user input associated with the user profile indicates that multiple items represented in other multimedia data are purchased together. The process 1100 may also include, based at least in part on determining that the multiple items are purchased together, refraining from causing display of a graphical user interface configured to allow purchasing of the item until the multimedia content ceases being output. The process 1100 may also include, in response to the multimedia content ceasing being output, causing display of the graphical user interface.

Additionally, or alternatively, the process 1100 may include determining a device type of a device being utilized in association with the user profile to output the multimedia content. The process 1100 may also include determining one or more user input types that the device is capable of accepting based at least in part on the device type. The process 1100 may also include generating an interactive element including the identifying information, the interactive element configured to be displayed when the multimedia content is displayed, and the interactive element configured to accept the one or more user input types.

Additionally, or alternatively, the process 1100 may include determining, from the purchase history, that the user profile has been involved in at least a threshold number of past purchases where items were purchased from interacting with other multimedia content. The process 1100 may also include determining a discount value to associate with the user profile based at least in part on the user profile being involved in the at least the threshold number of past purchases. The process 1100 may also include, in response to user input to select the item for purchasing, causing a graphical user interface to be displayed, the graphical user interface indicating that the discount value is to be applied to a payment transaction for the item.

Additionally, or alternatively, the process 1100 may include storing data indicating historical interaction with other multimedia content to purchase items and determining one or more characteristics of the other multimedia content. The process 1100 may also include identifying content that has not been viewed in association with the user profile and that is associated with the one or more characteristics of the other multimedia content. The process 1100 may also include sending, to a user device associated with the user profile, a recommendation for viewing the content.

Figure 12:
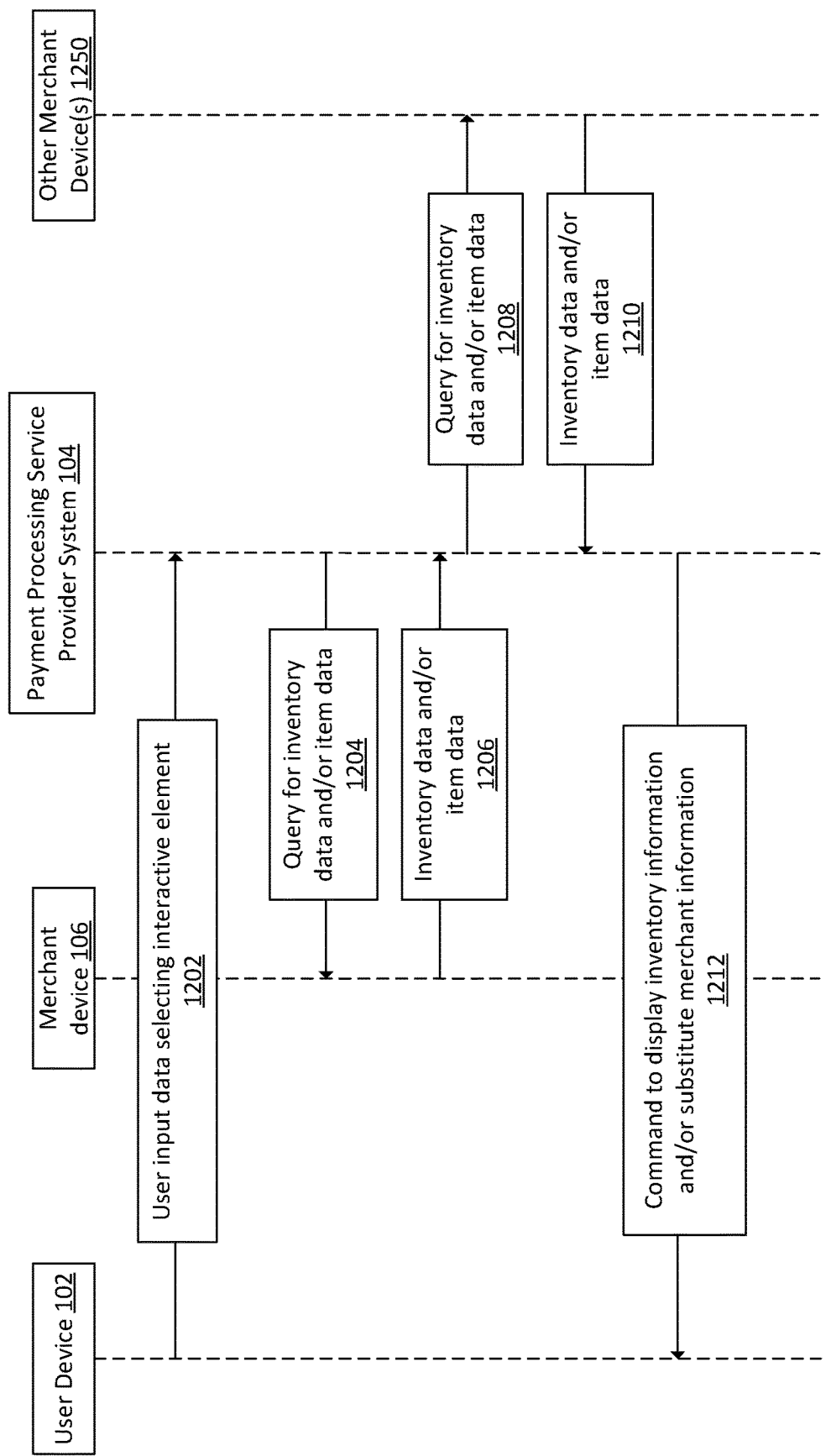
FIG. 12 illustrates a sequence diagram of a process for customized e-commerce tags in real-time multimedia content.

FIG. 12 illustrates another example sequence diagram showing a process 1200 for customized e-commerce tags in real-time multimedia content. The order in which the operations or steps are described is not intended to be construed as a limitation, and any number of the described operations may be combined in any order and/or in parallel to implement process 1200.

At block 1202, the process 1200 may include the user device 102 sending user input data indicating selection of an interactive element during display of multimedia content. For example, an interactive element may be displayed on the user device 102 while the user device 102 is outputting multimedia content including an item associated with the interactive element. A user of the user device 102 may select the interactive element, and user input data indicating that selection may be sent to the payment processing service provider system 104.

At block 1204, the process 1200 may include the payment processing service provider system 104 sending a query for inventory data and/or item data to a merchant device 106. For example, the payment processing service provider system 104 may inquire as to the current inventory of the item associated with the interactive element and/or for information associated with the item, such as sizes that are currently available, colors, types, options, in-stock status, etc.

At block 1206, the process 1200 may include the merchant device 106 sending the requested inventory data and/or item data to the payment processing service provider system 104. The inventory data and/or item data may be utilized to determine whether the item and/or the item having particular attributes (such as color and size) are currently in stock and available from the merchant at issue. In situations where the inventory data and/or item data indicates that the item is available with desired item attributes, an indication of the inventory count and/or some or all of the item information may be displayed on the user device 102. In instances where the inventory data and/or item data indicates that the item is not available from the merchant, additional operations may be performed to provide the user with other information on other items and/or items available from other merchants.

At block 1208, the process 1200 may include the payment processing service provider system 104 sending a query for inventory data and/or item data to one or more other merchant devices 1250. The query may be similar to the query described with respect to block 1204, above.

At block 1210, the process 1200 may include the one or more other merchant devices sending the requested inventory data and/or item data to the payment processing service provider system 104. The inventory data and/or item data may be sent in a similar manner as the inventory data and/or item data sent with respect to block 1206.

At block 1212, the process 1200 may include the payment processing service provider system 104 sending a command to the user device 102 to display inventory information and/or substitute merchant information. For example, one or more indicators may be displayed. Those indicators may identify other merchants from which the item is available, inventory data from the other merchants, item options available from the other merchants, pricing information, etc.

Figure 13:
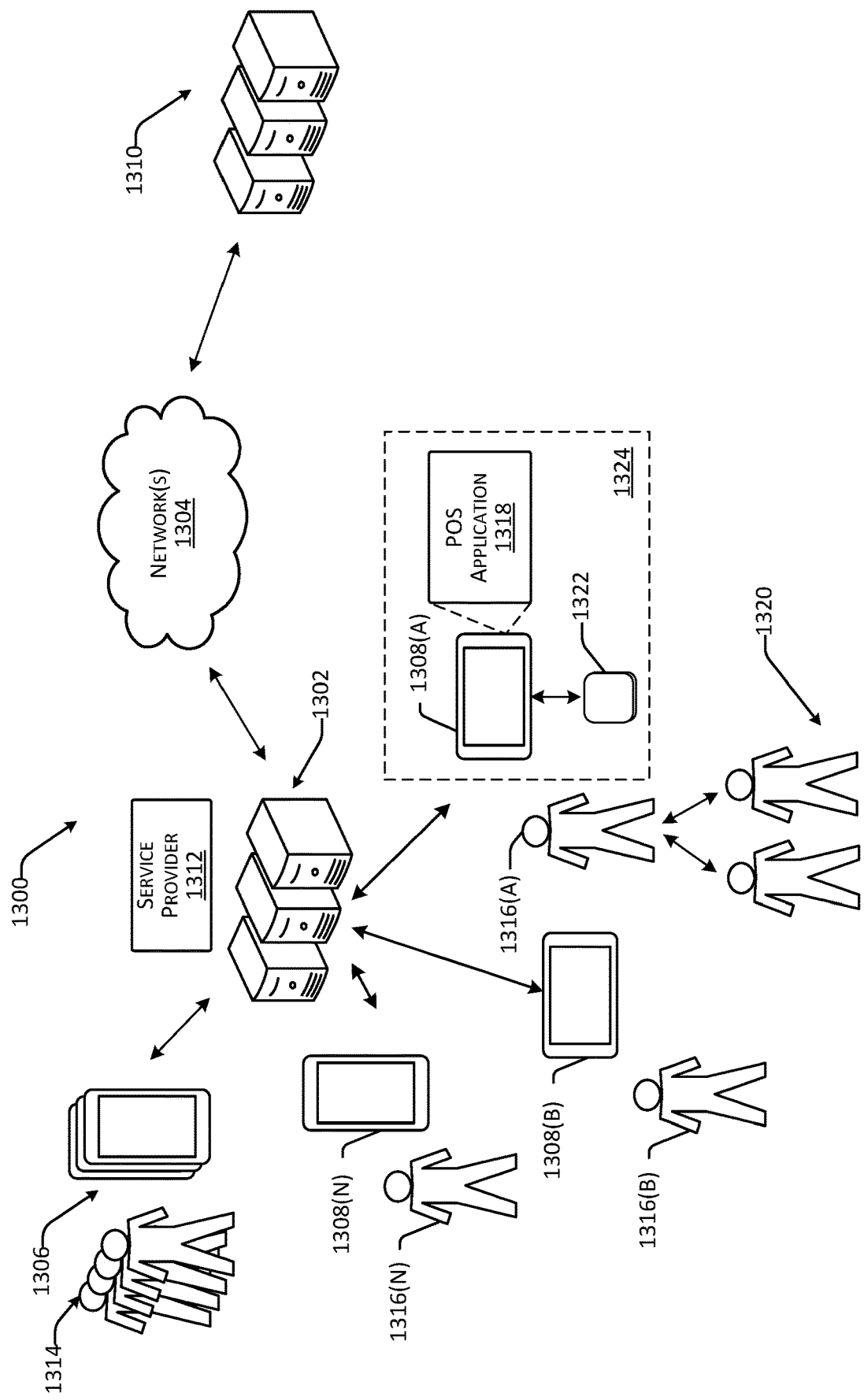
FIG. 13 illustrates an example merchant ecosystem for facilitating, among other things, techniques described herein.

FIG. 13 illustrates an example environment 1300. The environment 1300 includes server computing device(s) 1302 that can communicate over a network 1304 with user devices 1306 (which, in some examples can be merchant devices 1308 (individually, 1308(A)-1308(N))) and/or server computing device(s) 1310 associated with third-party service provider(s). The server computing device(s) 1302 can be associated with a service provider 1312 that can provide one or more services for the benefit of users 1314, as described below. Actions attributed to the service provider 1312 can be performed by the server computing device(s) 1302.

In at least one example, the service provider 1312 can correspond to the payment processing service provider described above. In at least one example, the server computing device(s) 1302 can correspond to the server(s) 102 and the network(s) 1304 can correspond to the network(s) 108 described above with reference to FIG. 1. In at least one example, the multimedia content service providers described above with reference to FIG. 1 can be associated with the server computing device(s) 1310 associated with third-party service provider(s).

The environment 1300 can facilitate the generation and use of interactive elements in association with multimedia content. As described above, a content provider such as a merchant may post or otherwise provide multimedia content. Such content can depict and/or discuss (e.g., reference) item(s) (e.g., goods and/or services). In some examples, the content can be associated with an intent to sell an item depicted in the content (e.g., text associated with an image indicating that the user is looking to sell an item depicted in the content). In other examples, the content may not be associated with an intent to sell (e.g., no explicit or implicit indication that the user desires to sell anything depicted in the content). The service provider 1312 can identify an item referenced in the multimedia content and generate an interactive element to be overlaid on the content while output. The interactive element may be selectable and may, when selected, cause a purchasing user interface to be presented.

In at least one example, techniques performed by the environment 1300 can alleviate the need for users interested in selling via platforms that output multimedia content to perform any action that they usually wouldn't perform prior to posting content to the platforms. That is, users interested in selling via such platforms can simply post content to one or more platforms and techniques described herein are directed to creating selling opportunities and facilitating transactions based on such content.

As described above, components of the environment 1300 can create a selling opportunity even when one did not originally exist (e.g., at the time the content was posted).

That is, if a user posts content without an interactive element to allows for purchasing, the service provider 1312 can nevertheless create an interactive element on the fly and cause that element to be displayed along with the multimedia content to allow a customer to purchase an item referenced in the content.

As described above, users of platforms (e.g., websites, applications, and other network-based communication tools provided by service providers) leverage tools for online commerce ("ecommerce"). However, current technology has limitations, as described above. In some examples, a user interested in purchasing an item posted via such a platform is required to follow-up with the merchant via another communication tool (e.g., email, text message, private message, etc.) to coordinate the purchase. Such systems introduce unnecessary lag due to response times associated with the users. Furthermore, the current infrastructure does not allow automatic filtering of the users and puts the onus on the merchant on whether or not to initiate a conversation with the interested users, engage in a financial transaction with them, and so on. In other examples, a user is directed to a webpage (usually different from the webpage or platform where the interaction originated) where the user is then required to add an item to a virtual cart and provide payment data to complete an online transaction. As such, a platform has to establish communication interfaces between disparate platforms, for example between a content platform (that allows interaction between two users) and a payment platform (that facilitates payment transactions). These communication interfaces have to meet security protocols to allow secure communications, such as exchange of financial data. Existing technology also introduces friction when users intend to purchase items via content-providing platforms. That is, users—both buyers and merchants—are required to perform multiple actions to facilitate a transaction, which can include multiple exchanges of communications, multiple clicks through multiple web pages, interactions or sign-ups with multiple platforms, or the like. As such, current technology is inefficient and is not user friendly. The environment 1300 described herein enables frictionless (or near-frictionless) transactions via interactions with the multimedia content. Thus, techniques described herein offer improvements to existing technology.

The environment 1300 can include a plurality of user devices 1306, as described above. Each one of the plurality of user devices 1306 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1314. The users 1314 can be referred to as buyers, customers, sellers, merchants, borrowers, employees, employers, payors, payees, couriers and so on. The users 1314 can interact with the user devices 1306 via user interfaces presented via the user devices 1306. In at least one example, a user interface can be presented via a web browser, or the like. In other examples, a user interface can be presented via an application, such as a mobile application or desktop application, which can be provided by the service provider 1312 or which can be an otherwise dedicated application. In some examples, individual of the user devices 1306 can have an instance or versioned instance of an application, which can be downloaded from an application store, for example, which can present the user interface(s) described herein. In at least one example, a user 1314 can interact with the user interface via touch input, spoken input, or any other type of input.

In at least one example, the merchant device 104 and the buyer device 102 described above in FIG. 1 can comprise user devices 1306 as described herein. Similarly, the merchant and the buyer can comprise users 1314 as used herein.

In at least one example, the users 1314 can include merchants 1316 (individually, 1316(A)-1316(N)). In an example, the merchants 1316 can operate respective merchant devices 1308, which can be user devices 1306 configured for use by merchants 1316. For the purpose of this discussion, a "merchant" can be any entity that offers items (e.g., goods or services) for purchase or other means of acquisition (e.g., rent, borrow, barter, etc.). The merchants 1316 can offer items for purchase or other means of acquisition via brick-and-mortar stores, mobile stores (e.g., pop-up shops, food trucks, etc.), online stores, combinations of the foregoing, and so forth. In some examples, at least some of the merchants 1316 can be associated with a same entity but can have different merchant locations and/or can have franchise/franchisee relationships. In additional or alternative examples, the merchants 1316 can be different merchants. That is, in at least one example, the merchant 1316(A) is a different merchant than the merchant 1316(B) and/or the merchant 1316(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN)s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 1308 can have an instance of a POS application 1318 stored thereon. The POS application 1318 can configure the merchant device 1308 as a POS terminal, which enables the merchant 1316(A) to interact with one or more buyers 1320. As described above, the users 1314 can include buyers, such as the buyers 1320 shown as interacting with the merchant 1316(A). For the purpose of this discussion, a "buyer" can be any entity that acquires items from merchants. While only two buyers 1320 are illustrated in FIG. 13, any number of buyers 1320 can interact with the merchants 1316. Further, while FIG. 13 illustrates the buyers 1320 interacting with the merchant 1316(A), the buyers 1320 can interact with any of the merchants 1316.

In at least one example, interactions between the buyers 1320 and the merchants 1316 that involve the exchange of funds (from the buyers 1320) for items (from the merchants 1316) can be referred to as "POS transactions" and/or "transactions." In at least one example, the POS application 1318 can determine transaction data associated with the POS transactions. Transaction data can include payment information, which can be obtained from a reader device 1322 associated with the merchant device 1308(A), user authentication data, purchase amount information, point-of-purchase information (e.g., item(s) purchased, date of purchase, time of purchase, etc.), etc. The POS application 1318 can send transaction data to the server computing device(s) 1302. Furthermore, the POS application 1318 can present a UI to enable the merchant 1316(A) to interact with the POS application 1318 and/or the service provider 1312 via the POS application 1318.

In at least one example, the merchant device 1308(A) can be a special-purpose computing device configured as a POS terminal (via the execution of the POS application 1318). In at least one example, the POS terminal may be connected to a reader device 1322, which is capable of accepting a variety of payment instruments, such as credit cards, debit cards, gift cards, short-range communication-based payment instruments, and the like, as described below. In at least one example, the reader device 1322 can plug in to a port in the merchant device 1308(A), such as a microphone port, a headphone port, an audio-jack, a data port, or other suitable port. In additional or alternative examples, the reader device 1322 can be coupled to the merchant device 1308(A) via another wired or wireless connection, such as via a Bluetooth®, BLE, and so on. Additional details are described below with reference to FIG. 14. In some examples, the reader device 1322 can read information from alternative payment instruments including, but not limited to, wristbands and the like.

In some examples, the reader device 1322 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 1322, and communicate with the server computing device(s) 1302, which can provide, among other services, a payment processing service. The server computing device(s) 1302 associated with the service provider 1312 can communicate with server computing device(s) 1310, as described below. In this manner, the POS terminal and reader device 1322 may collectively process transaction(s) between the merchants 1316 and buyers 1320. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While, the POS terminal and the reader device 1322 of the POS system 1324 are shown as separate devices, in additional or alternative examples, the POS terminal and the reader device 1322 can be part of a single device. In some examples, the reader device 1322 can have a display integrated therein for presenting information to the buyers 1320. In additional or alternative examples, the POS terminal can have a display integrated therein for presenting information to the buyers 1320. POS systems, such as the POS system 1324, may be mobile, such that POS terminals and reader devices may process transactions in disparate locations across the world. POS systems can be used for processing card-present transactions and card-not-present (CNP) transactions, as described below.

A card-present transaction is a transaction where both a buyer 1320 and his or her payment instrument are physically present at the time of the transaction. Card-present transactions may be processed by swipes, dips, taps, or any other interaction between a physical payment instrument (e.g., a card), or otherwise present payment instrument, and a reader device 1322 whereby the reader device 1322 is able to obtain payment data from the payment instrument. A swipe is a card-present transaction where a buyer 1320 slides a card, or other payment instrument, having a magnetic strip through a reader device 1322 that captures payment data contained in the magnetic strip. A dip is a card-present transaction where a buyer 1320 inserts a payment instrument having an embedded microchip (i.e., chip) into a reader device 1322 first. The dipped payment instrument remains in the payment reader until the reader device 1322 prompts the buyer 1320 to remove the card, or other payment instrument. While the payment instrument is in the reader device 1322, the microchip can create a one-time code which is sent from the POS system 1324 to the server computing device(s) 1310 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a buyer 1320 may tap or hover his or her payment instrument (e.g., card, electronic device such as a smart phone running a payment application, etc.) over a reader device 1322 to complete a transaction via short-range communication (e.g., NFC, RFID, Bluetooth®, BLE, etc.). Short-range communication enables the payment instrument to exchange information with the reader device 1322. A tap may also be called a contactless payment.

A CNP transaction is a transaction where a card, or other payment instrument, is not physically present at the POS such that payment data is required to be manually keyed in (e.g., by a merchant, buyer, etc.), or payment data is required to be recalled from a card-on-file data store, to complete the transaction.

The POS system 1324, the server computing device(s) 1302, and/or the server computing device(s) 1310 may exchange payment information and transaction data to determine whether transactions are authorized. For example, the POS system 1324 may provide encrypted payment data, user authentication data, purchase amount information, point-of-purchase information, etc. (collectively, transaction data) to server computing device(s) 1302 over the network(s) 1304. The server computing device(s) 1302 may send the transaction data to the server computing device(s) 1310. As described above, in at least one example, the server computing device(s) 1310 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server computing device(s) 1310 associated therewith) can send a fund transfer request to a server computing device of a card payment network (e.g., Mastercard®, VISA®, etc.) to determine whether the transaction is authorized or deficient. In at least one example, the service provider 1312 can serve as an acquirer and connect directly with the card payment network.

The card payment network (e.g., the server computing device(s) 1310 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server computing device(s) 1310 associated therewith) can make a determination as to whether the buyer has the capacity to absorb the relevant charge associated with the payment transaction. In at least one example, the service provider 1312 can serve as an issuer and/or can partner with an issuer. The transaction is either approved or rejected by the issuer and/or the card payment network (e.g., the server computing device(s) 1310 associated therewith), and a payment authorization message is communicated from the issuer to the POS device via a path opposite of that described above, or via an alternate path.

As described above, the server computing device(s) 1310, which can be associated with payment service provider(s), may determine whether the transaction is authorized based on the transaction data, as well as information relating to parties to the transaction (e.g., the buyer 1320 and/or the merchant 1316(A)). The server computing device(s) 1310 may send an authorization notification over the network(s) 1304 to the server computing device(s) 1302, which may send the authorization notification to the POS system 1324 over the network(s) 1304 to indicate whether the transaction is authorized. The server computing device(s) 1302 may also transmit additional information such as transaction identifiers to the POS system 1324. In one example, the server computing device(s) 1302 may include a merchant application and/or other functional components for communicating with the POS system 1324 and/or the server computing device(s) 1310 to authorize or decline transactions.

Based on the authentication notification that is received by the POS system 1324 from server computing device(s) 1302, the merchant 1316(A) may indicate to the buyer 1320 whether the transaction has been approved. In some examples, approval may be indicated at the POS system 1324, for example, at a display of the POS system 1324. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider 1312 can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, peer-to-peer payment services, onboarding services, identity verification (IDV) services, and so on. In some examples, the users 1314 can access all of the services of the service provider 1312. In other examples, the users 1314 can have gradated access to the services, which can be based on risk tolerance, IDV outputs, subscriptions, and so on. In at least one example, access to such services can be availed to the merchants 1316 via the POS application 1318. In additional or alternative examples, each service can be associated with its own access point (e.g., application, web browser, etc.).

The service provider 1312 can offer payment processing services for processing payments on behalf of the merchants 1316, as described above. For example, the service provider 1312 can provision payment processing software, payment processing hardware and/or payment processing services to merchants 1316, as described above, to enable the merchants 1316 to receive payments from the buyers 1320 when conducting POS transactions with the buyers 1320. For instance, the service provider 1312 can enable the merchants 1316 to receive cash payments, payment card payments, and/or electronic payments from buyers 1320 for POS transactions and the service provider 1312 can process transactions on behalf of the merchants 1316.

As the service provider 1312 processes transactions on behalf of the merchants 1316, the service provider 1312 can maintain accounts or balances for the merchants 1316 in one or more ledgers. For example, the service provider 1312 can analyze transaction data received for a transaction to determine an amount of funds owed to a merchant 1316(A) for the transaction. In at least one example, such an amount can be a total purchase price less fees charged by the service provider 1312 for providing the payment processing services. Based on determining the amount of funds owed to the merchant 1316(A), the service provider 1312 can deposit funds into an account of the merchant 1316(A). The account can have a stored balance, which can be managed by the service provider 1312. The account can be different from a conventional bank account at least because the stored balance is managed by a ledger of the service provider 1312 and the associated funds are accessible via various withdrawal channels including, but not limited to, scheduled deposit, same-day deposit, instant deposit, and a linked payment instrument.

A scheduled deposit can occur when the service provider 1312 transfers funds associated with a stored balance of the merchant 1316(A) to a bank account of the merchant 1316(A) that is held at a bank or other financial institution (e.g., associated with the server computing device(s) 1310). Scheduled deposits can occur at a prearranged time after a POS transaction is funded, which can be a business day after the POS transaction occurred, or sooner or later. In some examples, the merchant 1316(A) can access funds prior to a scheduled deposit. For instance, the merchant 1316(A) may have access to same-day deposits (e.g., wherein the service provider 1312 deposits funds from the stored balance to a linked bank account of the merchant on a same day as POS transaction, in some examples prior to the POS transaction being funded) or instant deposits (e.g., wherein the service provider 1312 deposits funds from the stored balance to a linked bank account of the merchant on demand, such as responsive to a request). Further, in at least one example, the merchant 1316(A) can have a payment instrument that is linked to the stored balance that enables the merchant to access the funds without first transferring the funds from the account managed by the service provider 1312 to the bank account of the merchant 1316(A).

In at least one example, the service provider 1312 may provide inventory management services. That is, the service provider 1312 may provide inventory tracking and reporting. Inventory management services may enable the merchant 1316(A) to access and manage a database storing data associated with a quantity of each item that the merchant 1316(A) has available (i.e., an inventory). Furthermore, in at least one example, the service provider 1312 can provide catalog management services to enable the merchant 1316(A) to maintain a catalog, which can be a database storing data associated with items that the merchant 1316(A) has available for acquisition (i.e., catalog management services). In at least one example, the catalog may include a plurality of data items and a data item of the plurality of data items may represent an item that the merchant 1361(A) has available for acquisition. The service provider 1312 can offer recommendations related to pricing of the items, placement of items on the catalog, and multi-party fulfilment of the inventory.

In at least one example, the service provider 1312 can provide business banking services, which allow the merchant 1316(A) to track deposits (from payment processing and/or other sources of funds) into an account of the merchant 1316(A), payroll payments from the account (e.g., payments to employees of the merchant 1316(A)), payments to other merchants (e.g., business-to-business) directly from the account or from a linked debit card, withdrawals made via scheduled deposit and/or instant deposit, etc. Furthermore, the business banking services can enable the merchant 1316(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 1316 to visualize their cash flow to track their financial health, set aside money for upcoming obligations (e.g., savings), organize money around goals, etc.

In at least one example, the service provider 1312 can provide financing services and products, such as via business loans, consumer loans, fixed term loans, flexible term loans, and the like. In at least one example, the service provider 1312 can utilize one or more risk signals to determine whether to extend financing offers and/or terms associated with such financing offers.

In at least one example, the service provider 1312 can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider 1312 can offer different types of capital loan products. For instance, in at least one example, the service provider 1312 can offer a daily repayment loan product, wherein a capital loan is repaid daily, for instance, from a portion of transactions processed by the payment processing service on behalf of the borrower. Additionally and/or alternatively, the service provider 1312 can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider 1312 can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 1316. The service provider 1312 can create the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider 1312 (e.g., from payments owed to the merchant from payments processed on behalf of the merchant, funds transferred to the merchant, etc.). The service provider 1312 can offer specific financial products, such as payment instruments, tied specifically to the loan products. For example, in one implementation, the server provider 1312 associates capital to a merchant or buyer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider 1312 can provide web-development services, which enable users 1314 who are unfamiliar with HTML, XML, JavaScript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 1316. In at least one example, the service provider 1312 can recommend and/or create content items to supplement omni-channel presences of the merchants 1316. That is, if a merchant of the merchants 1316 has a web page, the service provider 1312—via the web-development or other services—can recommend and/or create additional content items to be presented via other channel(s), such as social media, email, etc.

Furthermore, the service provider 1312 can provide payroll services to enable employers to pay employees for work performed on behalf of employers. In at least one example, the service provider 1312 can receive data that includes time worked by an employee (e.g., through imported timecards and/or POS interactions), sales made by the employee, gratuities received by the employee, and so forth. Based on such data, the service provider 1312 can make payroll payments to employee(s) on behalf of an employer via the payroll service. For instance, the service provider 1312 can facilitate the transfer of a total amount to be paid out for the payroll of an employee from the bank of the employer to the bank of the service provider 1312 to be used to make payroll payments. In at least one example, when the funds have been received at the bank of the service provider 1312, the service provider 1312 can pay the employee, such as by check or direct deposit, often a day, a week, or more after when the work was actually performed by the employee. In additional or alternative examples, the service provider 1312 can enable employee(s) to receive payments via same-day or instant deposit based at least in part on risk and/or reliability analyses performed by the service provider 1312.

Moreover, in at least one example, the service provider 1312 can provide employee management services for managing schedules of employees. Further, the service provider 1312 can provide appointment services for enabling users 1314 to set schedules for scheduling appointments and/or users 1314 to schedule appointments.

In some examples, the service provider 1312 can provide restaurant management services to enable users 1314 to make and/or manage reservations, to monitor front-of-house and/or back-of-house operations, and so on. In such examples, the merchant device(s) 1308 and/or server computing device(s) 1302 can be configured to communicate with one or more other computing devices, which can be located in the front-of-house (e.g., POS device(s)) and/or back-of-house (e.g., kitchen display system(s) (KDS)). In at least one example, the service provider 1312 can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider 1312 can provide fulfilment services, which can use couriers for delivery, wherein couriers can travel between multiple locations to provide delivery services, photography services, etc. Couriers can be users 1314 who can travel between locations to perform services for a requesting user 1314 (e.g., deliver items, capture images, etc.). In some examples, the courier can receive compensation from the service provider 1312. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider 1312 can receive requests for courier services, automatically assign the requests to active couriers, and communicate dispatch instructions to couriers via user interface (e.g., application, web browser, or other access point) presented via respective devices 1306.

In some examples, the service provider 1312 can provide omni-channel fulfillment services. For instance, if a buyer places an order with a merchant and the merchant cannot fulfill the order because one or more items are out of stock or otherwise unavailable, the service provider 1312 can leverage other merchants and/or sales channels that are part of the platform of the service provider 1312 to fulfill the buyer's order. That is, another merchant can provide the one or more items to fulfill the order of the buyer. Furthermore, in some examples, another sales channel (e.g., online, brick-and-mortar, etc.) can be used to fulfill the order of the buyer.

In some examples, the service provider 1312 can enable conversational commerce via conversational commerce services, which can use one or more machine learning mechanisms to analyze messages exchanged between two or more users 1314, voice inputs into a virtual assistant or the like, to determine intents of user(s) 1314. In some examples, the service provider 1312 can utilize determined intents to automate buyer service, offer promotions, provide recommendations, or otherwise interact with buyers in real-time. In at least one example, the service provider 1312 can integrate products and services, and payment mechanisms into a communication platform (e.g., messaging, etc.) to enable buyers to make purchases, or otherwise transact, without having to call, email, or visit a web page or other channel of a merchant. That is, conversational commerce alleviates the need for buyers to toggle back and forth between conversations and web pages to gather information and make purchases.

In at least one example, the service provider 1312 can provide a peer-to-peer payment service that enables peer-to-peer payments between two or more users 1314. In at least one example, the service provider 1312 can communicate with instances of a payment application (or other access point) installed on devices 1306 configured for operation by users 1314. In an example, an instance of the payment application executing on a first device operated by a payor can send a request to the service provider 1312 to transfer an amount of funds (e.g., fiat currency or non-fiat currency such as cryptocurrency, securities, and related assets) from an account of the payor to an account of a payee (e.g., a peer-to-peer payment). The service provider 1312 can facilitate the transfer and can send a notification to an instance of the payment application executing on a second mobile device operated by the payee that the transfer is in process (or has been completed). In some examples, the service provider 1312 can send additional or alternative information to the instances of the payment application (e.g., low balance to the payor, current balance to the payor or the payee, etc.). In some implementations, the payor and/or payee can be identified automatically, e.g., based on context, proximity, prior transaction history, and so on. In other examples, the payee can send a request for funds to the payor prior to the payor initiating the transfer of funds. The funds transferred can be associated with any digital currency type, including, but not limited to, cash, cryptocurrency, etc. In some embodiments, the service provider 1312 funds the request to payee on behalf of the payor, to speed up the transfer process and compensate for any lags that may be attributed to payor's financial network.

In some implementations, the service provider 1312 can trigger the peer-to-peer payment process through identification of a "payment proxy" having a particular syntax. For example, the syntax includes a monetary currency indicator prefixing one or more alphanumeric characters (e.g., $Cash). The currency indicator operates as the tagging mechanism that indicates to a computer system to treat the inputs as a request from the sender to transfer cash, where detection of the syntax (which includes one or more alphanumeric characters tagged by a monetary currency indicator) triggers a transfer of cash. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. The peer-to-peer process can be initiated through a particular application executing on the user devices 1306.

In some embodiments, the peer-to-peer process can be implemented within a forum context. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. The forum can be employed by a content provider to enable users of the forum to interact with one another, (e.g., through creating messages, posting comments, etc.). In some embodiments, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application context, such as a messaging application context. The term "messaging application," as used here, refers to any messaging application that enables communication between users (e.g., sender and recipient of a message) over a wired or wireless communications network, through use of a communication message. The messaging application can be employed by the service provider 1312. For instance, the service provider 1312 can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1306 (e.g., mobile device or conventional personal computer (PC)) based on instructions transmitted to and from the server computing device(s) 1302 (which, in such an example can be called a "messaging server"). In some instances, the messaging application can include a payment application with messaging capability that enables users of the payment application to communicate with one another. In such instances, the payment application can be executed on the user device 1306 based on instructions transmitted to and from the server computing device(s) 1302 (e.g., the payment service discussed in this description or another payment service that supports payment transactions).

In at least some embodiments, the peer-to-peer process can be implemented within a landing page context. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider 1312 can create the landing page to enable the recipient to conveniently receive one or more payments from one or more senders. In some embodiments, the personalized location address identifying the landing page is a uniform resource locator (URL) that incorporates the payment proxy. In such embodiments, the landing page is a web page, e.g., www.cash.me/$Cash.

In at least one example, a user 1314 may be new to the service provider 1312 such that the user 1314 that has not registered (e.g., subscribed to receive access to one or more services offered by the service provider) with the service provider 1312. The service provider 1312 can offer onboarding services for registering a potential user 1314 with the service provider 1312. In some examples, onboarding can involve presenting various questions, prompts, and the like to a potential user 1314 to obtain information that can be used to create a profile for the potential user 1314. In at least one example, the service provider 1312 can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 1314 providing all necessary information, the potential user 1314 can be onboarded to the service provider 1312. In such an example, any limited or short-term access to services of the service provider 1312 can be transitioned to more permissive (e.g., less limited) or longer-term access to such services.

The service provider 1312 can be associated with IDV services, which can be used by the service provider 1312 for compliance purposes and/or can be offered as a service, for instance to third-party service providers (e.g., associated with the server computing device(s) 1310). That is, the service provider 1312 can offer IDV services to verify the identity of users 1314 seeking to use or using their services. Identity verification requires a buyer (or potential buyer) to provide information that is used by compliance departments to prove that the information is associated with an identity of a real person or entity. In at least one example, the service provider 1312 can perform services for determining whether identifying information provided by a user 1314 accurately identifies the buyer (or potential buyer) (i.e., Is the buyer who they say they are?).

The service provider 1312 is capable of providing additional or alternative services and the services described above are offered as a sampling of services. In at least one example, the service provider 1312 can exchange data with the server computing device(s) 1310 associated with third-party service providers. Such third-party service providers can provide information that enables the service provider 1312 to provide services, such as those described above. In additional or alternative examples, such third-party service providers can access services of the service provider 1312. That is, in some examples, the third-party service providers can be subscribers, or otherwise access, services of the service provider 1312.

Techniques described herein can be configured to operate in both real-time/online and offline modes. "Online" modes refer to modes when devices are capable of communicating with the service provider 1312 (e.g., the server computing device(s) 1302) and/or the server computing device(s) 1310 via the network(s) 1304. In some examples, the merchant device(s) 1308 are not capable of connecting with the service provider 1312 (e.g., the server computing device(s) 1302) and/or the server computing device(s) 1310, due to a network connectivity issue, for example. In additional or alternative examples, the server computing device(s) 1302 are not capable of communicating with the server computing device(s) 1310 due to network connectivity issue, for example. In such examples, devices may operate in "offline" mode where at least some payment data is stored (e.g., on the merchant device(s) 1308) and/or the server computing device(s) 1302 until connectivity is restored and the payment data can be transmitted to the server computing device(s) 1302 and/or the server computing device(s) 1310 for processing.

In at least one example, the service provider 1312 can be associated with a hub, such as an order hub, an inventory hub, a fulfillment hub and so on, which can enable integration with one or more additional service providers (e.g., associated with the additional server computing device(s) 1310). In some examples, such additional service providers can offer additional or alternative services and the service provider 1312 can provide an interface or other computer-readable instructions to integrate functionality of the service provider 1312 into the one or more additional service providers.

Techniques described herein are directed to services provided via a distributed system of user devices 1306 that are in communication with one or more server computing devices 1302 of the service provider 1312. That is, techniques described herein are directed to a specific implementation—or, a practical application—of utilizing a distributed system of user devices 1306 that are in communication with one or more server computing devices 1302 of the service provider 1312 to perform a variety of services, as described above. The unconventional configuration of the distributed system described herein enables the server computing device(s) 1302 that are remotely-located from end-users (e.g., users 1314) to intelligently offer services based on aggregated data associated with the end-users, such as the users 1314 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider 1312, and those outside of the control of the service provider 1312, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 1314 and user devices 1306. Furthermore, such features are changed dynamically based on the profiles of the users involved interacting with the GUIs. As such, techniques described herein are directed to improvements to computing systems.

Figure 14:
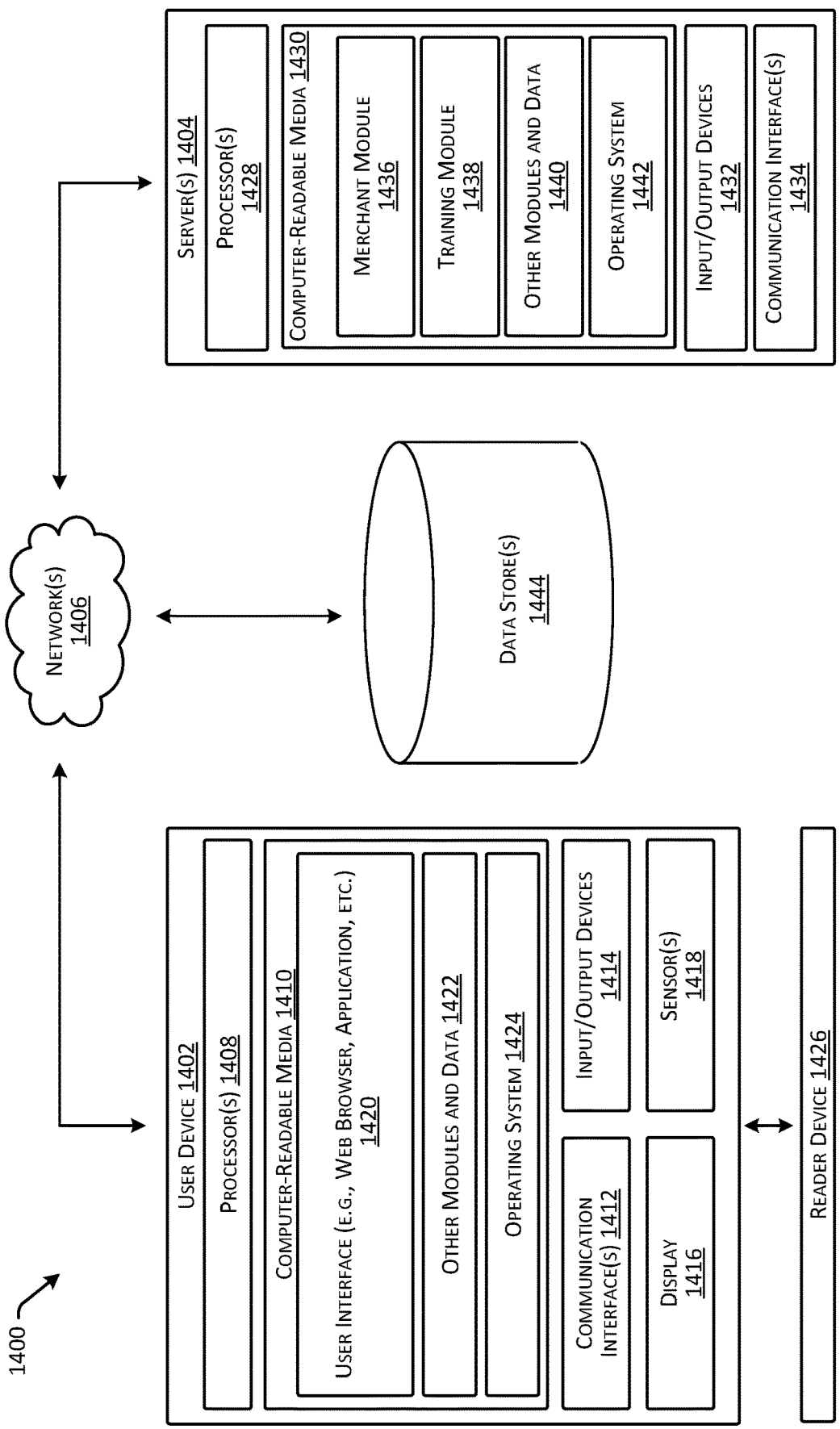
FIG. 14 illustrates additional details associated with individual components of the merchant ecosystem described above in FIG. 13.

FIG. 14 depicts an illustrative block diagram illustrating a system 1400 for performing techniques described herein. The system 1400 includes a user device 1402, that communicates with server computing device(s) (e.g., server(s) 1404) via network(s) 1406 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1402 is illustrated, in additional or alternate examples, the system 1400 can have multiple user devices, as described above with reference to FIG. 13.

The environment 1400 can facilitate the generation and use of interactive elements in association with multimedia content. As described above, a content provider such as a merchant may post or otherwise provide multimedia content. Such content can depict and/or discuss (e.g., reference) item(s) (e.g., goods and/or services). In some examples, the content can be associated with an intent to sell an item depicted in the content (e.g., text associated with an image indicating that the user is looking to sell an item depicted in the content). In other examples, the content may not be associated with an intent to sell (e.g., no explicit or implicit indication that the user desires to sell anything depicted in the content). The service provider 1312 can identify an item referenced in the multimedia content and generate an interactive element to be overlaid on the content while output. The interactive element may be selectable and may, when selected, cause a purchasing user interface to be presented.

In at least one example, techniques performed by the environment 1400 can alleviate the need for users interested in selling via platforms that output multimedia content to perform any action that they usually wouldn't perform prior to posting content to the platforms. That is, users interested in selling via such platforms can simply post content to one or more platforms and techniques described herein are directed to creating selling opportunities and facilitating transactions based on such content.

As described above, components of the environment 1400 can create a selling opportunity even when one did not originally exist (e.g., at the time the content was posted). That is, if a user posts content without an interactive element to allows for purchasing, the service provider 1412 can nevertheless create an interactive element on the fly and cause that element to be displayed along with the multimedia content to allow a customer to purchase an item referenced in the content.

As described above, users of platforms (e.g., websites, applications, and other network-based communication tools provided by service providers) leverage tools for online commerce ("ecommerce"). However, current technology has limitations, as described above. In some examples, a user interested in purchasing an item posted via such a platform is required to follow-up with the merchant via another communication tool (e.g., email, text message, private message, etc.) to coordinate the purchase. Such systems introduce unnecessary lag due to response times associated with the users. Furthermore, the current infrastructure does not allow automatic filtering of the users and puts the onus on the merchant on whether or not to initiate a conversation with the interested users, engage in a financial transaction with them, and so on. In other examples, a user is directed to a webpage (usually different from the webpage or platform where the interaction originated) where the user is then required to add an item to a virtual cart and provide payment data to complete an online transaction. As such, a platform has to establish communication interfaces between disparate platforms, for example between a content platform (that allows interaction between two users) and a payment platform (that facilitates payment transactions). These communication interfaces have to meet security protocols to allow secure communications, such as exchange of financial data. Existing technology also introduces friction when users intend to purchase items via content-providing platforms. That is, users—both buyers and merchants—are required to perform multiple actions to facilitate a transaction, which can include multiple exchanges of communications, multiple clicks through multiple web pages, interactions or sign-ups with multiple platforms, or the like. As such, current technology is inefficient and is not user friendly. The environment 1400 described herein enables frictionless (or near-frictionless) transactions via interactions with the multimedia content. Thus, techniques described herein offer improvements to existing technology.

In at least one example, the user device 1402 can be any suitable type of computing device, e.g., portable, semi-portable, semi-stationary, or stationary. Some examples of the user device 1402 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1402 can be any computing device capable of sending communications and performing the functions according to the techniques described herein. The user device 1402 can include devices, e.g., payment card readers, or components capable of accepting payments, as described below.

In the illustrated example, the user device 1402 includes one or more processors 1408, one or more computer-readable media 1410, one or more communication interface(s) 1412, one or more input/output (I/O) devices 1414, a display 1416, and sensor(s) 1418.

In at least one example, each processor 1408 can itself comprise one or more processors or processing cores. For example, the processor(s) 1408 can be implemented as one or more microprocessors, microcomputers, microcontrollers, digital signal processors, central processing units, state machines, logic circuitries, and/or any devices that manipulate signals based on operational instructions. In some examples, the processor(s) 1408 can be one or more hardware processors and/or logic circuits of any suitable type specifically programmed or configured to execute the algorithms and processes described herein. The processor(s) 1408 can be configured to fetch and execute computer-readable processor-executable instructions stored in the computer-readable media 1410.

Depending on the configuration of the user device 1402, the computer-readable media 1410 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 1410 can include, but is not limited to, RAM, ROM, EEPROM, flash memory, solid-state storage, magnetic disk storage, optical storage, and/or other computer-readable media technology. Further, in some examples, the user device 1402 can access external storage, such as RAID storage systems, storage arrays, network attached storage, storage area networks, cloud storage, or any other medium that can be used to store information and that can be accessed by the processor(s) 1408 directly or through another computing device or network. Accordingly, the computer-readable media 1410 can be computer storage media able to store instructions, modules or components that can be executed by the processor(s) 1408. Further, when mentioned, non-transitory computer-readable media exclude media such as energy, carrier signals, electromagnetic waves, and signals per se.

The computer-readable media 1410 can be used to store and maintain any number of functional components that are executable by the processor(s) 1408. In some implementations, these functional components comprise instructions or programs that are executable by the processor(s) 1408 and that, when executed, implement operational logic for performing the actions and services attributed above to the user device 1402. Functional components stored in the computer-readable media 1410 can include a user interface 1420 to enable users to interact with the user device 1402, and thus the server(s) 1404 and/or other networked devices. In at least one example, the user interface 1420 can be presented via a web browser, or the like. In other examples, the user interface 1420 can be presented via an application, such as a mobile application or desktop application, which can be provided by a service provider 1312 associated with the server(s) 1404, or which can be an otherwise dedicated application. In some examples, the user interface 1420 can be one of the user interface(s) 122 described above with reference to FIG. 1. In at least one example, a user can interact with the user interface via touch input, spoken input, gesture, or any other type of input. The word "input" is also used to describe "contextual" input that may not be directly provided by the user via the user interface 1420. For example, user's interactions with the user interface 1420 are analyzed using, e.g., natural language processing techniques, to determine context or intent of the user, which may be treated in a manner similar to "direct" user input.

Depending on the type of the user device 1402, the computer-readable media 1410 can also optionally include other functional components and data, such as other modules and data 1422, which can include programs, drivers, etc., and the data used or created by the functional components. In addition, the computer-readable media 1410 can also store data, data structures and the like, that are used by the functional components. Further, the user device 1402 can include many other logical, programmatic and physical components, of which those described are merely examples that are related to the discussion herein.

In at least one example, the computer-readable media 1410 can include additional functional components, such as an operating system 1424 for controlling and managing various functions of the user device 1402 and for enabling basic user interactions.

The communication interface(s) 1412 can include one or more interfaces and hardware components for enabling communication with various other devices, such as over the network(s) 1406 or directly. For example, communication interface(s) 1412 can enable communication through one or more network(s) 1406, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1406 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1402 can further include one or more input/output (I/O) devices 1414. The I/O devices 1414 can include speakers, a microphone, a camera, and various user controls (e.g., buttons, a joystick, a keyboard, a keypad, etc.), a haptic output device, and so forth. The I/O devices 1414 can also include attachments that leverage the accessories (audio-jack, USB-C, Bluetooth, etc.) to connect with the user device 1402.

In at least one example, user device 1402 can include a display 1416. Depending on the type of computing device(s) used as the user device 1402, the display 1416 can employ any suitable display technology. For example, the display 1416 can be a liquid crystal display, a plasma display, a light emitting diode display, an OLED (organic light-emitting diode) display, an electronic paper display, or any other suitable type of display able to present digital content thereon. In at least one example, the display 1416 can be an augmented reality display, a virtually reality display, or any other display able to present and/or project digital content. In some examples, the display 1416 can have a touch sensor associated with the display 1416 to provide a touchscreen display configured to receive touch inputs for enabling interaction with a graphic interface presented on the display 1416. Accordingly, implementations herein are not limited to any particular display technology. Alternatively, in some examples, the user device 1402 may not include the display 1416, and information can be presented by other means, such as aurally, haptically, etc.

In addition, the user device 1402 can include sensor(s) 1418. The sensor(s) 1418 can include a GPS device able to indicate location information. Further, the sensor(s) 1418 can include, but are not limited to, an accelerometer, gyroscope, compass, proximity sensor, camera, microphone, and/or a switch.

In some example, the GPS device can be used to identify a location of a user. In at least one example, the location of the user can be used by the service provider 1312, described above, to provide one or more services. That is, in some examples, the service provider 1312 can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 1314 and/or for sending users 1314 notifications regarding available appointments with merchant(s) located proximate to the users 1314. In at least one example, location can be used for taking payments from nearby buyers when they leave a geofence, or location can be used to initiate an action responsive to users 1314 enter a brick-and-mortar store of a merchant. Location can be used in additional or alternative ways as well.

Additionally, the user device 1402 can include various other components that are not shown, examples of which include removable storage, a power source, such as a battery and power control unit, a barcode scanner, a printer, a cash drawer, and so forth.

In addition, in some examples, the user device 1402 can include, be connectable to, or otherwise be coupled to a reader device 1426, for reading payment instruments and/or identifiers associated with payment objects. In some examples, as described above, the reader device 1426 can plug in to a port in the user device 1402, such as a microphone port, a headphone port, an audio-jack, a data port, or other suitable port. In additional or alternative examples, the reader device 1426 can be coupled to the user device 1402 via another wired or wireless connection, such as via a Bluetooth®, BLE, and so on. The reader device 1426 can include a read head for reading a magnetic strip of a payment card, and further can include encryption technology for encrypting the information read from the magnetic strip. Additionally or alternatively, the reader device 1426 can be an EMV payment reader, which in some examples, can be embedded in the user device 1402. Moreover, numerous other types of readers can be employed with the user device 1402 herein, depending on the type and configuration of the user device 1402.

The reader device 1426 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1426 may include hardware implementation, such as slots, magnetic tracks, and rails with one or more sensors or electrical contacts to facilitate detection and acceptance of a payment instrument. That is, the reader device 1426 may include hardware implementations to enable the reader device 1426 to interact with a payment instrument via a swipe (i.e., a card-present transaction where a buyer slides a card having a magnetic strip through a payment reader that captures payment data contained in the magnetic strip), a dip (i.e., a card-present transaction where a buyer inserts a card having an embedded microchip (i.e., chip) into a payment reader first until the payment reader prompts the buyer to remove the card), or a tap (i.e., a card-present transaction where a buyer may tap or hover his or her electronic device such as a smart phone running a payment application over a payment reader to complete a transaction via short-range communication) to obtain payment data associated with a buyer. Additionally or optionally, the reader device 1426 may also include a biometric sensor to receive and process biometric characteristics and process them as payment instruments, given that such biometric characteristics are registered with the payment processing service provider and connected to a financial account with a bank server.

The reader device 1426 may include processing unit(s), computer-readable media, a reader chip, a transaction chip, a timer, a clock, a network interface, a power supply, and so on. The processing unit(s) of the reader device 1426 may execute one or more modules and/or processes to cause the reader device 1426 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program modules, program data, and/or one or more operating systems. Depending on the exact configuration and type of the reader device 1426, the computer-readable media may include volatile memory (such as RAM), non-volatile memory (such as ROM, flash memory, miniature hard drive, memory card, or the like), or some combination thereof. In at least one example, the computer-readable media of the reader device 1426 may include at least one module for performing various functions as described herein.

The reader chip may perform functionalities to control the operations and processing of the reader device 1426. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control a clock, which may provide a clock signal indicating a time. Furthermore, the reader chip may perform functionality to control the network interface, which may interface with the network(s) 1406, as described below.

Additionally, the reader chip may perform functionality to control the power supply. The power supply may include one or more power supplies such as a physical connection to AC power or a battery. Power supply may include power conversion circuitry for converting AC power and creating a plurality of DC voltages for use by components of reader device 1426. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the buyer, an address of the buyer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the buyer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1402, which can be a POS terminal, and the reader device 1426 are shown as separate devices, in additional or alternative examples, the user device 1402 and the reader device 1426 can be part of a single device, which may be a battery-operated device. In such an example, components of both the user device 1402 and the reader device 1426 may be associated with the single device. In some examples, the reader device 1426 can have a display integrated therewith, which can be in addition to (or as an alternative of) the display 1416 associated with the user device 1402.

The server(s) 1404 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1404 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1404 can be located together or separately, and organized, for example, as virtual servers, server banks and/or server farms. The described functionality can be provided by the servers of a single merchant or enterprise or can be provided by the servers and/or services of multiple different buyers or enterprises.

In the illustrated example, the server(s) 1404 can include one or more processors 1428, one or more computer-readable media 1430, one or more I/O devices 1432, and one or more communication interfaces 1434. Each processor 1428 can be a single processing unit or a number of processing units and can include single or multiple computing units or multiple processing cores. The processor(s) 1428 can be implemented as one or more microprocessors, microcomputers, microcontrollers, digital signal processors, central processing units, state machines, logic circuitries, and/or any devices that manipulate signals based on operational instructions. For example, the processor(s) 1428 can be one or more hardware processors and/or logic circuits of any suitable type specifically programmed or configured to execute the algorithms and processes described herein. The processor(s) 1428 can be configured to fetch and execute computer-readable instructions stored in the computer-readable media 1430, which can program the processor(s) 1428 to perform the functions described herein.

The computer-readable media 1430 can include volatile and nonvolatile memory and/or removable and non-removable media implemented in any type of technology for storage of information, such as computer-readable instructions, data structures, program modules, or other data. Such computer-readable media 1430 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1404, the computer-readable media 1430 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1430 can be used to store any number of functional components that are executable by the processor(s) 1428. In many implementations, these functional components comprise instructions or programs that are executable by the processors 1428 and that, when executed, specifically configure the one or more processors 1428 to perform the actions attributed above to the service provider 1312 and/or payment processing service. Functional components stored in the computer-readable media 1430 can optionally include a merchant module 1436, a training module 1438, and one or more other modules and data 1440.

The merchant module 1436 can be configured to receive transaction data from POS systems, such as the POS system 1324 described above with reference to FIG. 13. The merchant module 1436 can transmit requests (e.g., authorization, capture, settlement, etc.) to payment service server computing device(s) to facilitate POS transactions between merchants and buyers. The merchant module 1436 can communicate the successes or failures of the POS transactions to the POS systems. The payment processing module 116 described above with reference to FIGS. 1 and 2 can correspond to the merchant module 1436.

The training module 1438 can be configured to train models using machine-learning mechanisms. For example, a machine-learning mechanism can analyze training data to train a data model that creates an output, which can be a recommendation, a score, and/or another indication. Machine-learning mechanisms can include, but are not limited to supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc.), statistical models, etc. In at least one example, machine-trained data models can be stored in a data store(s) associated with the user device(s) 1402 and/or the server(s) 1404 for use at a time after the data models have been trained (e.g., at runtime).

The one or more other modules and data 1440 can include the interactive-element generator 138 and/or the command generator 140, the functionality of which is described, at least partially, above. Further, the one or more other modules and data 1440 can include programs, drivers, etc., and the data used or created by the functional components. Further, the server(s) 1404 can include many other logical, programmatic and physical components, of which those described above are merely examples that are related to the discussion herein.

The one or more "modules" and/or "components" referenced herein may be implemented as more modules or as fewer modules, and functions described for the modules may be redistributed depending on the details of the implementation. The term "module," as used herein, refers broadly to software stored on non-transitory storage medium (e.g., volatile or non-volatile memory for a computing device), hardware, or firmware (or any combination thereof) modules. Modules are typically functional such that they that may create useful data or other output using specified input(s). A module may or may not be self-contained. An application program (also called an "application") may include one or more modules, or a module may include one or more application programs that can be accessed over a network or downloaded as software onto a device (e.g., executable code causing the device to perform an action). An application program (also called an "application") may include one or more modules, or a module may include one or more application programs. In additional and/or alternative examples, the module(s) may be implemented as computer-readable instructions, various data structures, and so forth via at least one processing unit to configure the computing device(s) described herein to execute instructions and to perform operations as described herein.

In some examples, a module may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa. The API(s) 148, described above, can correspond to such.

The computer-readable media 1430 can additionally include an operating system 1442 for controlling and managing various functions of the server(s) 1404.

The communication interface(s) 1434 can include one or more interfaces and hardware components for enabling communication with various other devices, such as over the network(s) 1406 or directly. For example, communication interface(s) 1434 can enable communication through one or more network(s) 1406, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1402 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1404 can further be equipped with various I/O devices 1432. Such I/O devices 1432 can include a display, various user interface controls (e.g., buttons, joystick, keyboard, mouse, touch screen, biometric or sensory input devices, etc.), audio speakers, connection ports and so forth.

In at least one example, the system 1400 can include data store(s) 1444 that can be configured to store data that is accessible, manageable, and updatable. In some examples, the data store(s) 1444 can be integrated with the user device 1402 and/or the server(s) 1404. In other examples, as shown in FIG. 14, the data store(s) 1444 can be located remotely from the server(s) 1404 and can be accessible to the server(s) 1404. The data store(s) 1444 can comprise multiple databases and/or servers connected locally and/or remotely via the network(s) 1406. The data store(s) 150, described above with reference to FIG. 1, can correspond to the data store(s) 1444.

In at least one example, the data store(s) 1444 can store user profiles, which can include merchant profiles, buyer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, buyer service data, etc. The merchant profile can securely store bank account information as provided by the merchant. Further, the merchant profile can store payment information associated with a payment instrument linked to a stored balance of the merchant, such as a stored balance maintained in a ledger by the service provider 1312.

Buyer profiles can store buyer data including, but not limited to, buyer information (e.g., name, phone number, address, banking information, etc.), buyer preferences (e.g., learned or buyer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, buyer service data, etc.

In at least one example, the account(s), described above with reference to FIG. 1, can include or be associated with the merchant profiles and/or buyer profiles described above.

Furthermore, in at least one example, the data store(s) 1444 can store inventory database(s) and/or catalog database(s). As described above, an inventory can store data associated with a quantity of each item that a merchant has available to the merchant. The records described above can be stored in the inventory data store. Furthermore, a catalog can store data associated with items that a merchant has available for acquisition. The data store(s) 1444 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to FIGS. 5-12 for convenience and ease of understanding. However, the methods illustrated are not limited to being performed using components described in FIGS. 1-4D, 13, and 14, and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

The foregoing is merely illustrative of the principles of this disclosure and various modifications can be made by those skilled in the art without departing from the scope of this disclosure. The above described examples are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process limitations (e.g., dimensions, configurations, components, process step order, etc.) can be made to further optimize the provided structures, devices and methods, as shown and described herein. In any event, the structures and devices, as well as the associated methods, described herein have many applications. Therefore, the disclosed subject matter should not be limited to any single example described herein, but rather should be construed in breadth and scope in accordance with the appended claims.

What is claimed is:

1. A method comprising:
sending, by at least one server computing device and to a user device of a user, multimedia content, wherein the multimedia content includes a representation of an item;
receiving, by the at least one server computing device, audio data generated by the user device from a first time to a second time during playback of the multimedia content, wherein the first time is associated with display of the representation of the item by the user device;
processing, by an automatic speech recognition component associated with the at least one server computing device, the audio data to generate text data representing one or more words spoken from the first time to the second time;
determining, by a natural language component associated with the at least one server computing device via natural language processing of the text data, a purchase intent to purchase the item;
responsive to determining the purchase intent to purchase the item, causing display, by the at least one server computing device and via the user device, of an interactive element selectable to purchase the item;
detecting, by the at least one server computing device, an interaction with the interactive element; and
based at least in part on detecting the interaction with the interactive element, causing display, by the at least one server computing device, of a graphical user interface comprising a selectable icon selectable to initiate payment for the item, wherein the graphical user interface is customized based at least in part on a user profile of the user.

2. The method as claim 1 recites, wherein the second time is at least one of an end of the playback or an offset from the first time.

3. The method as claim 1 recites, wherein the purchase intent comprises an intent to purchase an instance of the item with a particular attribute.

4. The method as claim 1 recites, wherein the one or more words spoken from the first time to the second time comprise one or more trigger words, and wherein determining the purchase intent comprises determining that the one or more trigger words were spoken.

5. The method as claim 4 recites, wherein the one or more trigger words are predefined by a merchant or at least one user of a plurality of users associated with the user device, and wherein the one or more trigger words are stored in respective user profiles of the plurality of users.

6. The method as claim 4 recites, wherein the one or more trigger words are associated with another platform.

7. The method as claim 1 recites, wherein the first time is further associated with an indication that audio input can be accepted, and wherein the indication is displayed at a point in the playback when the representation of the item is being displayed.

8. The method as claim 7 recites, further comprising:
generating, by the at least one server computing device, the indication; and
embedding, by the at least one server computing device, the indication in the multimedia content at a point in the playback when the representation of the item is being displayed.

9. The method as claim 1 recites, further comprising:
identifying, by the at least one server computing device, the user profile based at least in part on at least one of a device identifier of the user device or access information used to access a platform associated with viewing the multimedia content.

10. The method as claim 1 recites, wherein the user profile includes a purchase history of the user, and wherein content of the graphical user interface is based at least in part on at least on the purchase history.

11. A system comprising:
one or more processors, and
one or more non-transitory computer-readable media storing instructions executable by the one or more processors, wherein the instructions cause the one or more processors to perform acts comprising:
sending, by at least one server computing device and to a user device of a user, multimedia content, wherein the multimedia content includes a representation of an item;
receiving, by the at least one server computing device, audio data generated by the user device from a first time to a second time during playback of the multimedia content, wherein the first time is associated with display of the representation of the item by the user device;
processing, by an automatic speech recognition component associated with the at least one server computing device, the audio data to generate text data representing one or more words spoken from the first time to the second time;
determining, by a natural language component associated with the at least one server computing device via natural language processing of the text data, a purchase intent to purchase the item;
responsive to determining the purchase intent to purchase the item, causing display, by the at least one server computing device and via the user device, of an interactive element selectable to purchase the item;
detecting, by the at least one server computing device, an interaction with the interactive element; and
based at least in part on detecting the interaction with the interactive element, causing display, by the at least one server computing device, of a graphical user interface comprising a selectable icon selectable to initiate payment for the item, wherein the graphical user interface is customized based at least in part on a user profile of the user.

12. The system as claim 11 recites, wherein the second time is at least one of an end of the playback or an offset from the first time.

13. The system as claim 11 recites, wherein the purchase intent comprises an intent to purchase an instance of the item with a particular attribute.

14. The system as claim 11 recites, wherein the first time is further associated with an indication that audio input can be accepted, and wherein the indication is displayed at a point in the playback when the representation of the item is being displayed.

15. The system as claim 14 recites, the acts further comprising:
   generating, by the at least one server computing device, the indication; and
   embedding, by the at least one server computing device, the indication in the multimedia content at a point in the playback when the representation of the item is being displayed.

16. One or more non-transitory computer-readable media storing instructions executable by one or more processors that, when executed by the one or more processors, cause the one or more processors to perform acts comprising:
   sending, by at least one server computing device and to a user device of a user, multimedia content, wherein the multimedia content includes a representation of an item;
   receiving, by the at least one server computing device, audio data generated by the user device from a first time to a second time during playback of the multimedia content, wherein the first time is associated with display of the representation of the item by the user device;
   processing, by an automatic speech recognition component associated with the at least one server computing device, the audio data to generate text data representing one or more words spoken from the first time to the second time;
   determining, by a natural language component associated with the at least one server computing device via natural language processing of the text data, a purchase intent to purchase the item;
   responsive to determining the purchase intent to purchase the item, causing display, by the at least one server computing device and via the user device, of an interactive element selectable to purchase the item;
   detecting, by the at least one server computing device, an interaction with the interactive element; and
   based at least in part on detecting the interaction with the interactive element, causing display, by the at least one server computing device, of a graphical user interface comprising a selectable icon selectable to initiate payment for the item, wherein the graphical user interface is customized based at least in part on a user profile of the user.

17. The one or more non-transitory computer-readable media as claim 16 recites, wherein the second time is at least one of an end of the playback or an offset from the first time.

18. The one or more non-transitory computer-readable media as claim 16 recites, wherein the purchase intent comprises an intent to purchase an instance of the item with a particular attribute.

19. The one or more non-transitory computer-readable media as claim 16 recites, wherein the first time is further associated with an indication that audio input can be accepted, and wherein the indication is displayed at a point in the playback when the representation of the item is being displayed.

20. The one or more non-transitory computer-readable media as claim 19 recites, the acts further comprising:
   generating, by the at least one server computing device, the indication; and
   embedding, by the at least one server computing device, the indication in the multimedia content at a point in the playback when the representation of the item is being displayed.

* * * * *